US012267621B2

(12) United States Patent
Tang et al.

(10) Patent No.: US 12,267,621 B2
(45) Date of Patent: *Apr. 1, 2025

(54) VIDEO INTEGRATION

(71) Applicant: LiTL LLC, Boston, MA (US)

(72) Inventors: Aaron Tang, Boston, MA (US); John H. Chuang, Brookline, MA (US); Robert Sanford Havoc Pennington, Asheville, NC (US); Chris Bambacus, Framingham, MA (US); Eben Eliason, Providence, RI (US); Chris Moody, Boulder, CO (US); Johan Bilien, Belmont, MA (US)

(73) Assignee: LiTL LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,207

(22) Filed: Jan. 14, 2022

(65) Prior Publication Data

US 2022/0353460 A1 Nov. 3, 2022

Related U.S. Application Data

(63) Continuation of application No. 16/682,579, filed on Nov. 13, 2019, now Pat. No. 11,265,510, which is a (Continued)

(51) Int. Cl.
*H04N 7/14* (2006.01)
*G06F 3/04847* (2022.01)
(Continued)

(52) U.S. Cl.
CPC ............. *H04N 7/147* (2013.01); *G06F 40/14* (2020.01); *G06F 40/154* (2020.01); *H04N 7/142* (2013.01); *H04N 7/148* (2013.01); *G06F 3/04847* (2013.01)

(58) Field of Classification Search
CPC ........ H04N 7/147; H04N 7/142; H04N 7/148; H04N 21/431; H04N 21/4788;
(Continued)

(56) References Cited

U.S. PATENT DOCUMENTS 5,436,954 A 7/1995 Nishiyama et al.
5,559,670 A 9/1996 Flint et al.
(Continued)

FOREIGN PATENT DOCUMENTS

DE 10314554 A1 10/2004
GB 2449632 A 12/2008
(Continued)

OTHER PUBLICATIONS

International Search Report and Written Opinion for International Application No. PCT/US2011/057298 mailed Apr. 24, 2012.
(Continued)

*Primary Examiner* — Phung-Hoang J Nguyen
(74) *Attorney, Agent, or Firm* — Wolf, Greenfield & Sacks, P.C.

(57) ABSTRACT

According to one aspect, a web optimized user device is provided. The web optimized device reduces complexity and facilitates interaction with web-based services and content. The web optimized device can be configured without a hard drive, facilitating integration of web-based services into a computing experience. The web optimized device presents a user interface that integrates video functionality into every aspect of the computer content accessed. In particular, a display manager manages the user interface presented and integrates video displays and features into the content displays in a content and/or context aware manner. These displays permit a user to intuitively interact with the video content and features while the user changes content, for example, web-based services, web-based applications,
(Continued)

and other media content, without interruption of or interference from the video content.

24 Claims, 27 Drawing Sheets

Related U.S. Application Data continuation-in-part of application No. 15/262,970, filed on Sep. 12, 2016, now Pat. No. 10,701,309, which is a continuation-in-part of application No. 14/313,431, filed on Jun. 24, 2014, now Pat. No. 9,473,739, said application No. 16/682,579 is a continuation-in-part of application No. 13/108,451, filed on May 16, 2011, now abandoned, said application No. 15/262,970 is a continuation-in-part of application No. 13/108,451, filed on May 16, 2011, now abandoned, said application No. 14/313,431 is a continuation of application No. 13/108,467, filed on May 16, 2011, now abandoned.

(60) Provisional application No. 61/405,745, filed on Oct. 22, 2010.

(51) Int. Cl.
*G06F 40/14* (2020.01)
*G06F 40/154* (2020.01)

(58) Field of Classification Search
CPC .... G06F 40/14; G06F 40/154; G06F 3/04847; G06F 1/1616; G06F 1/169; G06F 1/1694; G06F 3/0362; G06F 3/04817; G06F 3/0482; G06F 3/0485; G06F 3/04883; G06F 1/1677
See application file for complete search history.

(56) References Cited

U.S. PATENT DOCUMENTS

| | | |
|---|---|---|
| 5,610,992 A | 3/1997 | Hickman |
| 5,646,820 A | 7/1997 | Honda et al. |
| 5,682,290 A | 10/1997 | Markow et al. |
| 5,903,723 A | 5/1999 | Beck et al. |
| 6,243,258 B1 | 6/2001 | Paratore |
| 6,266,236 B1 | 7/2001 | Ku et al. |
| 6,396,419 B1 | 5/2002 | Yeh |
| 6,449,146 B1 | 9/2002 | Ryuuzaki |
| 6,493,216 B1 | 12/2002 | Lin |
| 6,704,007 B1 | 3/2004 | Clapper |
| 6,724,365 B1 | 4/2004 | Escamilla et al. |
| 6,760,721 B1 | 7/2004 | Chasen et al. |
| 6,771,494 B2 | 8/2004 | Shimano |
| 6,798,897 B1 | 9/2004 | Rosenberg |
| 6,807,053 B2 | 10/2004 | An et al. |
| 6,882,335 B2 | 4/2005 | Saarinen |
| 6,918,159 B2 | 7/2005 | Choi |
| 7,058,902 B2 | 6/2006 | Iwema et al. |
| 7,061,472 B1 | 6/2006 | Schweizer et al. |
| 7,243,079 B1 | 7/2007 | Manolis et al. |
| 7,631,039 B2 | 12/2009 | Eisenberg |
| 7,631,309 B2 | 12/2009 | Wilt et al. |
| 7,778,973 B2 | 8/2010 | Choi et al. |
| 7,877,445 B2 | 1/2011 | Komine et al. |
| 7,970,240 B1 | 6/2011 | Chao et al. |
| 8,145,222 B2 | 3/2012 | Wormald et al. |
| 8,151,105 B2 | 4/2012 | Park et al. |
| 8,284,714 B2 | 10/2012 | Ray |
| 8,289,688 B2 | 10/2012 | Behar et al. |
| 8,385,950 B1 | 2/2013 | Wagner et al. |
| 8,577,957 B2 | 11/2013 | Behar et al. |
| 8,612,888 B2 | 12/2013 | Pennington et al. |
| 8,619,116 B2 | 12/2013 | Pennington et al. |
| 8,619,119 B2 | 12/2013 | Hwang |
| 8,624,844 B2 | 1/2014 | Behar et al. |
| 8,760,488 B2 | 6/2014 | Tang et al. |
| 8,928,725 B2 | 1/2015 | Pennington et al. |
| 9,473,739 B2 | 10/2016 | Tang et al. |
| 9,563,229 B2 | 2/2017 | Behar et al. |
| 9,880,715 B2 | 1/2018 | Behar et al. |
| 9,927,835 B2 | 3/2018 | Behar et al. |
| 10,108,970 B2 | 10/2018 | Relyea, Jr. et al. |
| 10,289,154 B2 | 5/2019 | Behar et al. |
| 10,701,309 B2 | 6/2020 | Tang et al. |
| 11,265,510 B2 | 3/2022 | Tang et al. |
| 2001/0014906 A1 | 8/2001 | Yamada et al. |
| 2004/0172451 A1 | 9/2004 | Biggs et al. |
| 2004/0189694 A1 | 9/2004 | Kurtz et al. |
| 2004/0230663 A1 | 11/2004 | Ackerman |
| 2005/0062715 A1 | 3/2005 | Tsuji et al. |
| 2005/0110880 A1 | 5/2005 | Parulski et al. |
| 2005/0122318 A1 | 6/2005 | Tonouchi et al. |
| 2005/0134717 A1 | 6/2005 | Misawa |
| 2005/0193062 A1 | 9/2005 | Komine et al. |
| 2005/0221865 A1 | 10/2005 | Nishiyama et al. |
| 2006/0007503 A1 | 1/2006 | Nakamura |
| 2006/0034042 A1 | 2/2006 | Hisano et al. |
| 2006/0082554 A1 | 4/2006 | Caine et al. |
| 2006/0209016 A1 | 9/2006 | Fox et al. |
| 2006/0265390 A1 | 11/2006 | Aldrich et al. |
| 2007/0013674 A1 | 1/2007 | Woolley |
| 2007/0013682 A1 | 1/2007 | Lin et al. |
| 2007/0118525 A1 | 5/2007 | Svendsen |
| 2007/0198674 A1 | 8/2007 | Li et al. |
| 2007/0214238 A1 | 9/2007 | Coppens et al. |
| 2007/0226761 A1 | 9/2007 | Zalewski et al. |
| 2008/0059580 A1 | 3/2008 | Kalinowski et al. |
| 2008/0059888 A1 | 3/2008 | Dunko |
| 2008/0115087 A1 | 5/2008 | Rollin et al. |
| 2008/0209194 A1 | 8/2008 | Prabakaran et al. |
| 2008/0235594 A1 | 9/2008 | Bhumkar et al. |
| 2008/0248845 A1 | 10/2008 | Morgan |
| 2008/0259155 A1 | 10/2008 | McLelland et al. |
| 2008/0278487 A1 | 11/2008 | Gobert |
| 2008/0295022 A1* | 11/2008 | Valdes ................ G06F 16/972 715/781 |
| 2009/0009586 A1 | 1/2009 | Cassanova |
| 2009/0019383 A1 | 1/2009 | Riley et al. |
| 2009/0037826 A1 | 2/2009 | Bennetts |
| 2009/0049395 A1 | 2/2009 | Lee et al. |
| 2009/0092234 A1 | 4/2009 | St. Onge et al. |
| 2009/0204906 A1* | 8/2009 | Irving .................... H04N 7/15 715/753 |
| 2009/0244012 A1* | 10/2009 | Behar ................... G06F 1/1681 345/184 |
| 2009/0244832 A1 | 10/2009 | Behar et al. |
| 2009/0300511 A1 | 12/2009 | Behar et al. |
| 2009/0303676 A1 | 12/2009 | Behar et al. |
| 2009/0322714 A1* | 12/2009 | Lee .................... H04N 21/4433 345/204 |
| 2009/0322790 A1 | 12/2009 | Behar et al. |
| 2010/0174993 A1 | 7/2010 | Pennington et al. |
| 2010/0199340 A1 | 8/2010 | Jonas et al. |
| 2010/0250327 A1* | 9/2010 | Relyea, Jr. ............ G06Q 30/02 705/14.66 |
| 2010/0269158 A1 | 10/2010 | Ehler et al. |
| 2010/0299628 A1 | 11/2010 | Har'El et al. |
| 2011/0022464 A1 | 1/2011 | Dunn et al. |
| 2011/0023117 A1 | 1/2011 | Brown et al. |
| 2011/0029907 A1 | 2/2011 | Bakhash |
| 2011/0055735 A1 | 3/2011 | Wood et al. |
| 2011/0093784 A1 | 4/2011 | Kiraz |
| 2011/0107368 A1 | 5/2011 | Rouse et al. |
| 2011/0113486 A1 | 5/2011 | Hunt et al. |
| 2011/0173068 A1 | 7/2011 | O'Hanlon |
| 2011/0191593 A1* | 8/2011 | Cheng ................ G06F 21/126 713/189 |
| 2011/0225417 A1* | 9/2011 | Maharajh ............ G06Q 10/06 713/150 |
| 2011/0247031 A1 | 10/2011 | Jacoby |
| 2011/0279354 A1 | 11/2011 | Tang et al. |
| 2011/0279376 A1 | 11/2011 | Tang et al. |

(56) References Cited

U.S. PATENT DOCUMENTS

| | | | |
|---|---|---|---|
| 2011/0283314 | A1 | 11/2011 | Tang et al. |
| 2011/0285658 | A1 | 11/2011 | Homma et al. |
| 2011/0302614 | A1 | 12/2011 | Padmanabhan et al. |
| 2011/0320529 | A1 | 12/2011 | Mentchoukov et al. |
| 2012/0016708 | A1* | 1/2012 | Dheap ............... G06Q 10/1095 705/7.19 |
| 2012/0098919 | A1 | 4/2012 | Tang et al. |
| 2012/0098920 | A1 | 4/2012 | Pennington et al. |
| 2012/0098922 | A1 | 4/2012 | Pennington et al. |
| 2012/0102403 | A1 | 4/2012 | Pennington et al. |
| 2012/0287224 | A1 | 11/2012 | Paris |
| 2013/0088565 | A1 | 4/2013 | Buckler |
| 2014/0376785 | A1 | 12/2014 | Bathiche et al. |
| 2015/0029298 | A1 | 1/2015 | Tang et al. |
| 2017/0099456 | A1 | 4/2017 | Tang et al. |
| 2017/0105053 | A1* | 4/2017 | Todd ................... H04N 21/482 |

FOREIGN PATENT DOCUMENTS

| | | | |
|---|---|---|---|
| JP | 1994-242853 | A | 9/1994 |
| JP | H08-179851 | A | 7/1996 |
| JP | 2001-298514 | A | 10/2001 |
| JP | 2002-258982 | A | 9/2002 |
| JP | 2005-168036 | A | 6/2005 |

OTHER PUBLICATIONS

[No Author Listed] Dell Latitude XT Tablet. Dell. Dec. 2007, 17 pages.
[No Author Listed] Environment Variable. Wikipedia. https://en.wikipedia.org/w/index.php?title=Environment_variable&oldid=160-448946. Last accessed Mar. 19, 2021, 6 pages.
[No Author Listed] HP Compaq Tablet PC TC1100 QuickSpecs. Hewlett-Packard. Aug. 5, 2005, 24 pages.
[No Author Listed] Is Your "Show Desktop Icon" in XP Missing? WaybackMachine Archive of https://www.windows-help-central.com/show-desktop-icon-in-xp-missing.html-. Captured Mar. 2, 2007, 1 page.
[No Author Listed] Lenovo ThinkPad X61 Tablet Service and Troubleshooting Guide. Lenovo. Apr. 2007, 80 pages.
[No Author Listed] Microsoft Digital Image Suite User's Manual. Microsoft Corporation. 2005.
[No Author Listed] Motion Computing M1400 Tablet PC Addendum. Motion Computing, Inc. Jul. 2004; 5 pages.
[No Author Listed] Motion Computing M1400 Tablet PC User Guide. Motion Computing, Inc. Mar. 2004, 89 pages.
[No Author Listed] Windows Special Folder. Wikipedia. https://en.wikipedia.org/w/index.php?title=Special_folder&oldid=77102597. Last accessed Mar. 17, 2021, 4 pages.
[No Author Listed], All-New Litl Webbook Debuts at 2010 CES. Cision. Jan. 5, 2010. URL:https://www.prnewswire.com/news-releases/all-new-litl-webboo-k-debuts-at-2010-ces-80716797.html [last accessed Jun. 25, 2021].
[No Author Listed], Dell Latitude XT Quick Reference Guide. Dec. 2007; 234 pages.
[No Author Listed], Dell Latitude XT User's Guide. May 2008; 248 pages.
[No Author Listed], Designing for Direct Manipulation. Microsoft Corporation. Mar. 3, 2008; 4 pages.
[No Author Listed], Litl Webbook Beats ChromeOS, Becomes First Cloud Computer. CoolThings. Nov. 16, 2009. URL:https://www.coolthings.com/litl-webbook-beats-chromeos-becomes-first--cloud-computer/ [last accessed Jun. 25, 2021].
[No Author Listed], Microsoft Computer Dictionary Fifth Edition. Microsoft Press. 2002; 648 pages.
[No Author Listed], The Litl webbook. European Consumers Choice. URL=https://www.europeanconsumerschoice.org/hi-tech/litl-webbook-computer--test-and-reviews/ [last accessed Jun. 25, 2021].
[No Author Listed], The Windows Interface Guidelines for Software Design. Microsoft Press. 1995.
[No Author Listed], The Windows Interface Guidelines—A Guide for Designing Software. Microsoft Windows. Microsoft Corporation. Feb. 1995.
[No Author Listed], Toshiba Satellite A300/A300D Satellite Pro A300/A300D Portable Person Computer User's Manual. Toshiba Corporation. 2008; 226 pages.
[No Author Listed] Panasonic CF-19 Operating Instructions. Panasonic. 2006, 40 pages.
[No Author Listed] Panasonic CF-T8 Operating Instructions. Panasonic. 2008, 40 pages.
[No Author Listed] Sony Vaio VGN-UX280P (UX Series MicroPC) Spec Sheet. Sony Corporation. Aug. 2, 2006, 2 pages.
Bartlett, Rock 'n' Scroll is Here to Stay. Compaq. Western Research Laboratory. 2000; 9 pages.
Clifford et al., Measuring Tilt with Low-g Accelerometers. Sensors. Freescale Semiconductor. Application Note. AN3107. May 2005; 8 pages.
Demonstration of Tokbox Broadcast Video Chat. 2010. http://www.youtube.com/watch?v=fw5KkNLrSiU.
Franks et al., HTTP Authentication: Basic and Digest Access Authentication. The Internet Society. 1999.
Hardy, Lenovo ThinkPad X61 Tablet PC Review. Jun. 12, 2007; 12 pages. tabletpcreview.com/tabletreview/lenovo-thinkpad-x61-tablet-pc-review.
Hinckley et al., Sensing Techniques for Mobile Interaction. ACM UIST 2000. Symposium on User Interface Software and Technology. CHI Letters. 2000; 2(2): 91-100.
Karp et al., Excerpts of Windows XP in a Nutshell Second Edition. O'Reilly Media, Inc. Feb. 2005, 14 pages.
Leonhard, Excerpts of Windows XP Hacks & Mods: For Dummies. Wiley Publishing, Inc. 2005, 46 pages.
Mcdonald, LiTL Webbook Review. Little Tech Girl. Aug. 31, 2010. URL:https://littletechgirl.com/2010/08/31/litl-webbook-review/ [last accessed Jun. 25, 2021].
Noe, The Litl Webbook: A more social computing device. Nov. 5, 2009. Core77. URL:https://www.core77.com/posts/15122/The-Litl-Webbook-A-more-so-cial-computing- device [last accessed Jun. 25, 2021].
Tokbox walkthrough. 2008. http://www.youtube.com/watch?v=QIQA9eAxqdM.
Video Conferencing using Tokbox. 2010. http://youtube.com/watch?v=IOZJ4SeIZjg.
WebEx Meeting Center User Guide. 2007. 365 Pages.
Patent Owner's Preliminary Response. *Lenovo v. Litl LLC*. IPR Case No. IPR2021-00681. U.S. Pat. No. 8,289,688. Jun. 25, 2021.
Petition for Inter Partes Review. *Lenovo vs. Litl LLC*. IPR Case No. IPR2021-00681. U.S. Pat. No. 8,289,688. Dated Mar. 18, 2021.
Petition for Inter Partes Review. *Lenovo (United States) Inc. v. Litl LLC*. IPR Case No. IPR2021-00821/U.S. Pat. No. 8,612,888. Apr. 27, 2021.
Petition for Inter Partes Review. *Lenovo (United States) Inc. v. Litl LLC*. IPR Case No. IPR2021-00786/U.S. Pat. No. 9,880,715. May 4, 2021.
Petition for Inter Partes Review. *Lenovo (United States) Inc. v. Litl LLC*. IPR Case No. IPR2021-00800/U.S. Pat. No. 10,289,154. May 4, 2021.
Petition for Inter Partes Review. *Lenovo (United States) Inc. v. Litl LLC*. IPR Case No. IPR2021-00822/U.S. Pat. No. 8,624,844. May 4, 2021.
Petition for Inter Partes Review. *Microsoft Corporation v. Litl LLC*. PTAB Case No. IPR2021-01011. U.S. Pat. No. 8,577,957. May 25, 2021.
Pogue, Windows XP Home Edition: The Missing Manual, Second Edition. O'Reilly Media, Inc. Dec. 2004.
Ride, MIT's $100 Laptop. TechPowerUp. Sep. 29, 2005; 4 pages. https://www.techpowerup.com/5512/mits-uds-100-laptop.
Russinovich et al., Microsoft Windows Internals 4th Edition. Microsoft Press. 2005.
Saxena, Ces 2010: All New Litl Webbook Makes Its Debut Appearance. Elite Choice. URL:https://elitechoice.org/luxury/ces-2010-all-new-litl-webbook-- makes-its-debut-appearance [last accessed Jun. 25, 2021].

(56) References Cited

OTHER PUBLICATIONS

Schwartz, Organizing and Editing Your Photos with Picasa. Visual QuickProject Guide. 2005.

Scinto, Introducing The Litl WebBook. The Gadgeteer. Nov. 19, 2009. URL:https://the-gadgeteer.com/2009/11/19/introducing-the-litl-webbook/ [last accessed Jun. 25, 2021].

Strauss, Litl Webbook Re-Defines Computing. ABC News. Dec. 14, 2009. URL:https://abcnews.go.com/Technology/GadgetGuide/litl-webbook-defines-co-mputing/story?id-9311095 [last accessed Jun. 25, 2021].

* cited by examiner

GMail  Welcome to Gmail

A Google approach to email.

Gmail is built on the idea that email can be more intuitive, efficient, and useful. And maybe even fun. After all, Gmail has:

- Less spam
  Keep unwanted messages out of your inbox with Google's innovative technology.
- Mobile access
  Read Gmail on your mobile phone by pointing your phone's web browser to http://gmail.com/app.
  Learn more
- Lots of space
  Over 7452.239264 megabytes (and counting) of free storage.

Latest News from the Gmail Blog

Google Mail is becoming Gmail in the UK
Mon May 03, 2010

As a Brit, my friends and family often tell me they are miffed that they get an @googlemail.com address instead... 3204

More posts>>

Sign in with your Google Account
Username: ci
Password:
☐ Stay signed in
[Sign in]
Can't access your account?

New to Gmail? It's free and easy
[Create an account>>]
About Gmail  New features!

@2010  Google Gmail for business Gmail Blog Terms Help
                                    3206

FIG. 32

VIDEO INTEGRATION

RELATED APPLICATIONS

This Application is a Continuation of U.S. application Ser. No. 16/682,579, filed Nov. 13, 2019, entitled "VIDEO INTEGRATION", which is a Continuation-in-part of U.S. application Ser. No. 15/262,970, filed Sep. 12, 2016, entitled "VIDEO INTEGRATION", which is a Continuation-in-part of U.S. application Ser. No. 14/313,431, filed Jun. 24, 2014, entitled "VIDEO INTEGRATION", which is a Continuation of U.S. application Ser. No. 13/108,467, filed May 16, 2011, entitled "VIDEO INTEGRATION", which is a Non-Provisional of Provisional (35 USC 119(e)) of U.S. Application Ser. No. 61/405,745, filed Oct. 22, 2010, entitled "VIDEO INTEGRATION". Application Ser. No. 15/262,970 is a Continuation-in-part of U.S. application Ser. No. 13/108,451, filed May 16, 2011, entitled "SYSTEMS AND METHODS FOR VIDEO CHAT INTEGRATION AS PERSISTENT DISPLAYS", which is a Non-Provisional of Provisional (35 USC 119(e)) of U.S. Application Ser. No. 61/405,745, filed Oct. 22, 2010, entitled "VIDEO INTEGRATION". Application Ser. No. 16/682,579 is a Continuation-in-part of U.S. application Ser. No. 13/108,451, filed May 16, 2011, entitled "SYSTEMS AND METHODS FOR VIDEO CHAT INTEGRATION AS PERSISTENT DISPLAYS". The entire contents of these applications are incorporated herein by reference in their entirety.

BACKGROUND

Video enabled chatting and other video enabled services have not reached their full potential, nor have live video functions been widely adopted by the computer using community. The lack of adoption is due in some part to a user perceived difficulty in establishing video chat accounts, configuring cameras, and the associated operations typically associated with enabling video chat, including for example, the need to manage contacts. Furthermore, most video enabled services provide overly complex platforms that intimidate a conventional computer user. While there exists well known providers, for example SKYPE, the user base for existing services has not grown as expected. Nor have video enabled interactions been widely adopted beyond commercial settings that typically employ hardware specially configured to deliver live video services.

SUMMARY

Computing in a social context provides richer and fuller experiences to computer users, and it is appreciated that consistent with various principles related to the present invention, video integration can become an essential aspect of that experience. Computer users can target various social experiences to share on a given computing device once the features and the hardware that enables them are presented to the users in a meaningful way. In one implementation, a family is enabled to share a social computing experience together through integration of live video service. The social experience can also extend outward to incorporate friends and other families enriching computer interaction for all the participants. In one embodiment, a family is an example of a "social unit" that can participate in computing experiences together through, for example, integrated video services. In another example, by integrating video chat into standard computer operations, the users can experience social computing and that leads to greater adoption and use of video chat features. In another embodiment, the use and configuration of the video chat features are transparent to the user, which facilitates social computing and adoption of the technology.

According to one aspect, persistent video chat features are provided throughout a user interface. Video features are integrated into the content accessed by a user, applications initiated, and web sources/applications accessed. By providing video chat features is more apt to fully utilize video chat features. Further, having a live video connection to another user during normal computer operation allows the other user to participate in the first user's experience. Video chat and other video services can also be used to extend the operation of web-based applications and other application types to include video functionality without modification of accessed web-based content or their associated applications.

Integration of video chat services can also provide for web optimized computing platforms that are not limited to conventional configurations. For example, a web optimized device can be configured to integrate video chat services even in the absence of hard drives or other mass media storage devices that would permit installation of local applications to handle video chat and/or live video services. For example, integration of video services can include incorporating video services from a source in the cloud (e.g., the Internet) into the user interface display on a web optimized device. Further, cloud based video services can be integrated at the operating system level to provide an easily used platform for the user of a web optimized device. Integration of video services made available from third party providers over the Internet can present unique challenges to providing, for example, video chat features seamlessly to the end user.

According to one aspect, a web optimized user device is provided. In one embodiment, the web optimized device is specially configured to provide a platform that reduces complexity and that facilitates interaction with web-based services and web content. In some settings, the web optimized device is configured without a hard drive, permitting, and in some instances requiring, integration of web-based services into a user's computer experience. The web optimized device presents a user interface that integrates video chat functionality in every aspect of the content viewed by the user. In particular, a shell process may be provided that manages the user interface presented to the user. The shell process can be configured to manage display of content and manage any communication, internal and external, required to render the display of the content. The shell process is configured to integrate video chat displays and features in a content aware manner. Content aware displays may be provided that permit a user to intuitively interact with the video chat content and features, while at the same time, permit the user to change content, for example, web-based services, web-based applications, and other media content, without interruption of or interference from the video chat content that continues to display during and after content transitions.

According to another aspect, the shell process can be configured to present video chat content responsive to device configurations. For example, some web optimized devices can be physically manipulatable to alter display configuration and even physically manipulatable to transform the hardware with which a user interacts with the device. In such a setting, the shell process can invoke video integration objects that identify content and/or device configurations in order to integrate video chat content and features into any user displayed content. The video chat content and features can be provided regardless of the content view or device configuration change that result from user manipulation of the web optimized device, as the system can be configured to adapted to video chat content and features into the display based on the current view and/or the present content being accessed on the web optimized device.

According to one aspect of the present invention, a system is provided comprising a display manager configured to manage a plurality of views of computer content in a user interface, wherein the display manager further comprises a rendering engine configured to render content in the plurality of views, and wherein the display manager is further configured to provide and respond to computer controls displayed in the plurality of views, a communication component configured to access a web-based content, a user interface configured to display web-based content in the plurality of views, a video chat integration component configured to initiate a connection to a video service provider using the communication component, manage video chat content received over the connection, integrate the video chat content with the web-based content currently displayed by the user interface, wherein the video chat content is further configured to remain persistent throughout the plurality of views of the content.

According to one embodiment of the present invention, the video chat integration component is further configured to initiate a dynamic display of a video chat session in response to a selection of one of the plurality of views of the content. According to another embodiment of the invention, the system further comprises a registration component configured to establish device configurations associated with a video chat service provider. According to another embodiment of the invention, the registration component is further configured to automatically trigger a registration process to establish the device configuration associated with a video chat service provider. According to another embodiment of the invention, the display manager is further configured to generate a user interface display for rendering in the plurality of views, wherein the user interface display is configured to execute a video chat session with a contact established with the video chat service provider upon selection by a user.

According to one embodiment of the present invention, the display manager is further configured to render the user interface display responsive to a mode of operation of the computer device. According to another embodiment of the invention, the display manager is further configured to modify the user interface display responsive to status information received from the video chat service provider associated with the contact. According to another embodiment of the invention, the display manager is configured to generate a user interface display of the video chat session in a header portion of one of the plurality of content views. According to another embodiment of the invention, the display manager is configured to generate a user interface display of the video chat session in a body portion of one of the plurality of content views. According to another embodiment of the invention, the display manager is configured to execute a transition between a first one of the plurality of views and a second one of the plurality of views.

According to another embodiment of the invention, the first one of the plurality of views includes a user interface display of the video chat session in a header portion of one of the plurality of content views and the second one of the plurality of views includes a user interface display of the video chat session in a body portion of one of the plurality of content views. According to another embodiment of the invention, the display manager is configured to execute the transition in response to a change in a mode of the computer device. According to another embodiment of the invention, the display manager is further configured to render video chat controls in a user interface display of a video chat session. According to another embodiment of the invention, the video chat controls include user interface control display configured to perform video chat operations, wherein the video chat operations include at least one of hold, pause, block, call, accept, resume, message, redial, camera on, camera off, sound on, and sound off.

According to one aspect of the present invention, a computer implemented method for providing integrated video chat features throughout digital content displayed on a computer device is provided. The method comprises managing, by a computer, a plurality of views of computer content rendered in a user interface, compositing, by a display manager, computer controls into the rendered content displayed in the plurality of views, accessing, over a communication network, web-based content, displaying, in a user interface, the web-based content in the plurality of views, integrating, by a integration component, a video chat session into the web-based content currently displayed by the user interface, and rendering the video chat session throughout the plurality of views of the web-based content. According to one embodiment of the present invention, the act of rendering the video chat session includes an act of providing a dynamic display of a video chat session in response to a selection of one of the plurality of views of the content.

According to another embodiment of the invention, the method further comprises an act of establishing device configurations associated with a video chat service provider. According to another embodiment of the invention, the method further comprises an act of automatically executing a registration process to establish the device configuration associated with a video chat service provider. According to another embodiment of the invention, the method further comprises acts of generating a user interface display for rendering in the plurality of views associated with a contact established with the video chat service provider, and executing a video chat session in response to user selection of the user interface display.

According to one embodiment of the present invention, the act of rendering the video chat session throughout the plurality of views of the web-based content includes an act of rendering the user interface display responsive to a mode of operation of the computer device. According to another embodiment of the invention, the method further comprises an act of modifying the user interface display responsive to status information received from the video chat service provider associated with the contact. According to another embodiment of the invention, the act of rendering the video chat session throughout the plurality of views of the web-based content includes an act of generating a user interface display of the video chat session in a header portion of one of the plurality of content views. According to another embodiment of the invention, the act of rendering the video chat session throughout the plurality of views of the web-based content includes generating a user interface display of the video chat session in a body portion of one of the plurality of content views. According to another embodiment of the invention, the method further comprises an act of executing a transition between a first one of the plurality of views and a second one of the plurality of views.

According to another embodiment of the invention, the first one of the plurality of views includes a user interface display of the video chat session in a header portion of one of the plurality of content views and the second one of the plurality of views includes a user interface display of the video chat session in a body portion of one of the plurality of content views. According to another embodiment of the invention, the act of act of executing the transition between the first one of the plurality of views and the second one of the plurality of views occurs in response to a change in a mode of the computer device. According to another embodiment of the invention, the act of compositing, by the display manager, computer controls into the rendered content includes rendering video chat controls in a user interface display of a video chat session. According to another embodiment of the invention, the video chat controls include a user interface control display configured to perform video chat operations, wherein the video chat operations include at least one of hold, pause, block, call, accept, resume, message, redial, camera on, camera off, sound on, and sound off.

According to one aspect of the present invention, a non-transitory computer-readable medium is provided, having computer-readable signals stored thereon that define instructions that, as a result of being executed by a computer, instruct the computer to perform a computer implemented method for providing integrated video chat features throughout digital content displayed on a computer device. The method comprises managing a plurality of views of computer content rendered in a user interface, compositing computer controls into the rendered content displayed in the plurality of views, accessing over a communication network web-based content, displaying, in a user interface, the web-based content in the plurality of views, integrating a video chat session into the web-based content currently displayed by the user interface, and rendering the video chat session throughout the plurality of views of the web-based content. According to one embodiment of the present invention, the act of rendering the video chat session includes an act of providing a dynamic display of a video chat session in response to a selection of one of the plurality of views of the content.

According to another embodiment of the invention, the method further comprises an act of establishing device configurations associated with a video chat service provider. According to another embodiment of the invention, the method further comprises an act of automatically executing a registration process to establish the device configuration associated with a video chat service provider. According to another embodiment of the invention, the method further comprises acts of generating a user interface display for rendering in the plurality of views associated with a contact established with the video chat service provider, and executing a video chat session in response to user select of the user interface display.

According to one embodiment of the present invention, the act of rendering the video chat session throughout the plurality of views of the web-based content includes an act of rendering the user interface display responsive to a mode of operation of the computer device. According to another embodiment of the invention, the method further comprises an act of modifying the user interface display responsive to status information received from the video chat service provider associated with the contact. According to another embodiment of the invention, the act of rendering the video chat session throughout the plurality of views of the web-based content includes an act of generating a user interface display of the video chat session in a header portion of one of the plurality of content views. According to another embodiment of the invention, the act of rendering the video chat session throughout the plurality of views of the web-based content includes generating a user interface display of the video chat session in a body portion of one of the plurality of content views. According to another embodiment of the invention, the method further comprises an act of executing a transition between a first one of the plurality of views and a second one of the plurality of views.

According to another embodiment of the invention, the first one of the plurality of views includes a user interface display of the video chat session in a header portion of one of the plurality of content views and the second one of the plurality of views includes a user interface display of the video chat session in a body portion of one of the plurality of content views. According to another embodiment of the invention, the act of act of executing the transition between the first one of the plurality of views and the second one of the plurality of views occurs in response to a change in a mode of the computer device. According to another embodiment of the invention, the act of compositing, by the display manager, computer controls into the rendered content includes rendering video chat controls in a user interface display of a video chat session. According to another embodiment of the invention, the video chat controls include a user interface control display configured to perform video chat operations, wherein the video chat operations include at least one of hold, pause, block, call, accept, resume, message, redial, camera on, camera off, sound on, and sound off.

According to one aspect of the present invention, a system configured to video enable web-based applications is provided. The system comprises a display management component configured to render a plurality of views of computer content in a user interface, wherein the display management component is further configured to provide and respond to computer controls displayed in the plurality of views, a communication component configured to access a web-based application, the user interface configured to display content associated with the web-based application, a video integration component configured to access a live video service provider separate from the web-based application, and communicate live video content to the display management component to composite the live video content, wherein the display management component is further configured to optimize a position of a display of the composited video content located in the display of the content associated with the web-based application.

According to one embodiment of the present invention, the display management component is further configured to identify a portion of the content display associated with the web-based application, and render the live video content in the identified portion of the content display associated with the web-based application. According to another embodiment of the invention, the video integration component further comprises a video service daemon, and the video integration component is configured to establish access to the video chat service provider through the video service daemon. According to another embodiment of the invention, the display management component composites content provided from the video service daemon with the control displays provided by the display management component to render the live video content in the identified portion of the content display. According to another embodiment of the invention, the control displays are configured to display in a focus and unfocused state.

According to one embodiment of the present invention, the control displays are responsive to a visual representation of a pointing device, and the presence of the visual representation of the pointing device within the boundary associated with the displayed controls triggers the focus state. According to another embodiment of the invention, the control displays are not visualized in the rendered live video content in response to the controls display being in the unfocused state. According to another embodiment of the invention, the control displays are visible in the rendered live video content in response to the controls displays being in the focused state. According to another embodiment of the invention, the video integration component further comprises a browser engine, and the video integration component is configured to establish access to the live video service provider through the browser engine. According to another embodiment of the invention, the display management component composites content provided from the browser engine with the control displays provided by the display management component to render the live video content in the optimized display position.

According to another embodiment of the invention, the web-based application is associated with a respective browser engine for accessing the web-based application, and wherein display management component is further configured to composite the content rendered by the respective browser process and the controls provided by the display management component to generate a view of the content associated with the web-based application. According to another embodiment of the invention, the web-based application is associated with a respective browser engine for accessing the web-based application, and wherein display management component is further configured to composite the content rendered by the respective browser process and the controls provided by the display management component to generate a view of the content associated with the web-based application.

According to one embodiment, the video integration component is further configured to incorporate the live video content into any web-based application accessed by the communication component. According to another embodiment, incorporating occurs as at least part of the compositing the live video content with the web-based application content. According to another embodiment, video integration component is further configured to incorporate the live video content into any web-based application accessed by the communication component being actively displayed by the display management component. According to another embodiment, the video integration component is further configured to transition the incorporated live video content from a first displayed web-based application to a second displayed web-based application in response to a transition in the display management component from the first displayed web-based application to the second displayed web-based application. According to another embodiment, the web-based application is a stand-alone application. According to another embodiment, the web-based application does not include video services. According to another embodiment, the video component composites live video content into an active display of the web-based content. According to another embodiment, compositing the live video content with the web-based application content includes modifying the existing display of the web-based content to include the live video content. According to another embodiment, the live video content is received from a communication source external to the web-based application content and/or a communication source of the web-based content. According to another embodiment, the video integration component is instantiated separately from the web-based application. According to another embodiment, the video integration component is further configured to incorporate the live video content into a plurality of separate web-based applications currently executed by the processor.

According to one aspect of the present invention, a computer implemented method for video enabling web-based applications is provided. The method comprises displaying a managed user interface to a user of a computing device, accessing, by the computing device, a web-based application over a communication network, receiving, by the computing device, content associated with the web-based application, accessing, by the computing device, a live video service provider, receiving, by the computing device, from the live video service provider live video content, compositing, by the computing device, the live video content and video controls, optimizing, by the computing device, a display position of the composited video content in the display of the content associated with the web-based application. According to one embodiment of the present invention, the computing device further comprises a video service daemon and the video service daemon is configured to perform the act of accessing the live video service provider. According to another embodiment of the invention, the method further comprises an act of communicating, by the video service daemon, the received live video content to a display management component. According to another embodiment of the invention, the method further comprises acts of compositing, by the display management component, the live video content with content controls, communicating over a communication engine the composited live video content to a display engine, rendering, by the display engine in a user interface, a visual display of the composited live video content. According to another embodiment of the invention, the method further comprises acts of identifying, by the display management a portion of the content display associated with the web-based application, and rendering the live video content in the identified portion of the content display associated with the web-based application.

According to one embodiment of the present invention, the computing device further comprises a browser engine and the browser engine is configured to perform the act of accessing the live video service provider. According to another embodiment of the invention, the method further comprises an act of communicating, by the browser engine, the received live video content to a display management component. According to another embodiment of the invention, the method further comprises acts of compositing, by the display management component, the live video content with content controls, communicating over a communication engine the composited live video content to a display engine, and rendering, by the display engine in a user interface, a visual display of the composited live video content. According to another embodiment of the invention, the method further comprises acts of identifying, by the display management a portion of the content display associated with the web-based application, and rendering the live video content in the identified portion of the content display associated with the web-based application.

According to another embodiment of the invention, the computing device further comprises a video integration component including a video service daemon, a browser engine, and a display manager, wherein the act of accessing the web-based application is performed by the browser engine and the act of accessing the live video service provider is performed by the video service daemon. According to another embodiment of the invention, the method further comprises acts of compositing, by the video integration component, content controls into content associated with the web-based application and wherein the act of compositing the live video content and the video controls is performed by the video integration component. According to another embodiment of the invention, the act of optimizing, the display position of the composited video content, includes an act of identifying by the management component a portion of the content display associated with the web-based application; and the method further comprises rendering the live video content in the identified portion of the content display associated with the web-based application.

According to another embodiment, the act of optimizing the display position of the composited video content in the display of the content associated with the web-based application includes an act of incorporating the live video content into the display of the web-based application. According to another embodiment, the act of incorporating the video content occurs on any web-based application accessed by the computing device. According to another embodiment, the act of incorporating occurs as at least part of the optimizing the display position. According to another embodiment, the act of incorporating the live video content into any web-based application accessed by the communication component, includes integrating the live video content into the web-based application actively displayed on the computing device. According to another embodiment, the method further comprising an act of transitioning the incorporated live video content from a first displayed web-based application to a second displayed web-based application in response to a transition on the computing device from the first displayed web-based application to the second displayed web-based application. According to another embodiment, the web-based application is a stand-alone application. According to another embodiment, the web-based application does not include video services. According to another embodiment, the act of optimizing include incorporating the live video content into an existing display of the web-based content. According to another embodiment, the live video content is received from a communication source external to the web-based application content. According to another embodiment, the live video content is received from a communication source external to the web-based application content and the web-based content. According to another embodiment, the live video content is received from a communication source external to the web-based content. According to another embodiment, method further comprises an act of separately instantiating the web-based application from the live video service. According to another embodiment, the method further comprises an act of incorporating the live video content into a plurality of separate web-based applications currently executed by the processor.

According to one aspect of the present invention, a non-transitory computer-readable medium is provided having computer-readable signals stored thereon that define instructions that, as a result of being executed by a computer, instruct the computer to perform a computer implemented method for video enabling web-based applications. The method comprises displaying a managed user interface to a user of a computing device, accessing a web-based application over a communication network, receiving content associated with the web-based application, accessing a live video service provider, receiving from the live video service provider live video content, compositing the live video content and video controls, optimizing a display position of the composited video content in the display of the content associated with the web-based application.

According to one embodiment of the present invention, the computing device further comprises a video service daemon and the video service daemon is configured to perform the act of accessing the live video service provider. According to another embodiment of the invention, the method further comprises an act of communicating, by the video service daemon, the received live video content to a display management component. According to another embodiment of the invention, the method further comprises acts of compositing, by the display management component, the live video content with content controls, communicating over a communication engine the composited live video content to a display engine, rendering, by the display engine in a user interface, a visual display of the composited live video content. According to another embodiment of the invention, the method further comprises acts of identifying, by the display management a portion of the content display associated with the web-based application, and rendering the live video content in the identified portion of the content display associated with the web-based application.

According to one embodiment of the present invention, the computing device further comprises a browser engine and the browser engine is configured to perform the act of accessing the live video service provider. According to another embodiment of the invention, the method further comprises an act of communicating, by the browser engine, the received live video content to a display management component. According to another embodiment of the invention, the method further comprises acts of compositing, by the display management component, the live video content with content controls, communicating over a communication engine the composited live video content to a display engine, and rendering, by the display engine in a user interface, a visual display of the composited live video content. According to another embodiment of the invention, the method further comprises acts of identifying, by the display management a portion of the content display associated with the web-based application, and rendering the live video content in the identified portion of the content display associated with the web-based application.

According to another embodiment of the invention, the computing device further comprises a video integration component including a video service daemon, a browser engine, and a display manager, wherein the act of accessing the web-based application is performed by the browser engine and the act of accessing the live video service provider is performed by the video service daemon. According to another embodiment of the invention, the method further comprises acts of composting, by the video integration component, content controls into content associated with the web-based application and wherein the act of compositing the live video content and the video controls is performed by the video integration component. According to another embodiment of the invention, the act of optimizing, the display position of the composited video content, includes an act of identifying by the management component a portion of the content display associated with the web-based application; and the method further comprises rendering the live video content in the identified portion of the content display associated with the web-based application.

According to another embodiment, the act of optimizing the display position of the composited video content in the display of the content associated with the web-based application includes an act of incorporating the live video content into the display of the web-based application. According to another embodiment, the act of incorporating the video content occurs on any web-based application accessed by the computing device. According to another embodiment, the act of incorporating occurs as at least part of the optimizing the display position. According to another embodiment, the act of incorporating the live video content into any web-based application accessed by the communication component, includes integrating the live video content into the web-based application actively displayed on the computing device. According to another embodiment, the method further comprising an act of transitioning the incorporated live video content from a first displayed web-based application to a second displayed web-based application in response to a transition on the computing device from the first displayed web-based application to the second displayed web-based application. According to another embodiment, the web-based application is a stand-alone application. According to another embodiment, the web-based application does not include video services. According to another embodiment, the act of optimizing include incorporating the live video content into an existing display of the web-based content. According to another embodiment, the live video content is received from a communication source external to the web-based application content. According to another embodiment, the live video content is received from a communication source external to the web-based application content and the web-based content. According to another embodiment, the live video content is received from a communication source external to the web-based content. According to another embodiment, method further comprises an act of separately instantiating the web-based application from the live video service. According to another embodiment, the method further comprises an act of incorporating the live video content into a plurality of separate web-based applications currently executed by the processor.

According to one aspect of the present invention, a system for providing content integrated video features is provided. The system comprises a user interface configured to render web-based computer content in a graphical user interface displayed to a user on a computer device according to a plurality of views of the content, a communication component configured to connect the computer device to a communication network to access web-based content for display to the user, and a video content integration engine configured to integrate live video content into the web-based content shown in an existing content display on the user interface, access a web-based video service provider, receive the live video content from the web-based video service provider, and modify the web-based content shown in the existing content display to accept integration of the live video content. According to one embodiment of the present invention, the video content integration engine is further configured to processes the web-based content shown in the existing display to identify at least one portion within the web-based content that can include live video content.

According to another embodiment of the invention, the video content integration engine is further configured to processes the live video content to identify at least one portion within the live video content to integrate with the web-based content shown in the existing display. According to another embodiment of the invention, the video content integration engine is further configured to process the web-based content for background subtraction, and identify the at least one portion within the web-based content based on the at least one portion appearing in the foreground of the existing display. According to another embodiment of the invention, the video content integration engine is further configured to process the web-based content for object identification within the existing display, and further configured to identify the at least one portion within the existing display based on an identified object within the web-based content. According to another embodiment of the invention, the identified object includes a head of a figure displayed in the content. According to another embodiment of the invention, the video content integration engine is configured to perform at least one of replace the identified at least one portion with live video content, and integrate the live video content into the identified portion.

According to one embodiment of the present invention, the video content integration engine is further configured to process the live video content for background subtraction, and identify the at least one portion within the live video content based on the at least one portion appearing in the foreground of the live video content. According to another embodiment of the invention, the video content integration engine is further configured to process the live video content for object identification within the live video content, and further configured to identify the at least one portion within the live video content based on an identified object within the displayed content. According to another embodiment of the invention, the identified object includes a head of a figure displayed in the live video content. According to another embodiment of the invention, the video content integration engine is further configured to perform at least one of integrate the at least one portion of the live video content into the content shown in the existing display, and replace a portion of the content shown in the existing display with the identified portion.

According to one aspect of the present invention, a computer implemented method for providing content integrated live video features throughout digital content is provided. The method comprises rendering, by a computer device, web-based content in a graphical user interface displayed to a user according to a plurality of views of the web-based content, accessing, over a communication network, the web-based content for display to the user, integrating live video content into the web-based content shown in an existing content display on the user interface, accessing, over the communication network, a web-based video service provider, receiving the live video content from the web-based video service provider, and modifying the web-based content shown in the existing content display to include the live video content. According to one embodiment of the present invention, the method further comprises an act of processing the web-based content shown in the existing display to identify at least one portion within the web-based content that can include the live video content. According to another embodiment of the invention, the method further comprises an act of processing the live video content to identify at least one portion within the live video content to integrate with the web-based content shown in the existing display.

According to another embodiment of the invention, the act of processing the web-based content shown in the existing display to identify the at least one portion within the web-based content that can include the live video content includes acts of processing the displayed content for background subtraction, and identifying the at least one portion within the displayed content based on the at least one portion appearing in the foreground of the displayed content. According to another embodiment of the invention, the act of processing the web-based content shown in the existing display to identify the at least one portion within the web-based content that can include the live video content includes processing the displayed content for object identification within the displayed content, and identifying the at least one portion within the displayed content based on an identified object within the displayed content.

According to one embodiment of the present invention, the identified object includes a head of a figure displayed in the content. According to another embodiment of the invention, the method further comprises an act of replacing the identified at least one portion with the live video content. According to another embodiment of the invention, the method further comprises an act of integrating the live video content into the identified portion. According to another embodiment of the invention, the method further comprising acts of processing the live video content for background subtraction, and identifying the at least one portion within the live video content based on the at least one portion appearing in the foreground of the live video content. According to another embodiment of the invention, the method further comprises processing the live video content for object identification within the live video content, and further configured to identify the at least one portion within the live video content based on an identified object within the displayed content. According to another embodiment of the invention, the identified object includes a head of a figure displayed in the live video content. According to another embodiment of the invention, the method further comprises an act of integrating the at least one portion of the live video content into the web-based content shown in the existing display. According to another embodiment of the invention, the method further comprises an act of replacing a portion of the content shown in the existing display with the identified portion.

According to one aspect of the present invention, a non-transitory computer-readable medium having computer-readable signals stored thereon that define instructions that, as a result of being executed by a computer, instruct the computer to perform a computer implemented method for providing content integrated live video features throughout digital content is provided. The method comprises rendering web-based content in a graphical user interface displayed to a user according to a plurality of views of the web-based content, accessing, over a communication network, the web-based content for display to the user, integrating live video content into the web-based content shown in an existing content display on the user interface, accessing, over the communication network, a web-based video service provider, receiving the live video content from the web-based video service provider, and modifying the web-based content shown in the existing content display to include the live video content. According to one embodiment of the present invention, the method further comprises an act of processing the web-based content shown in the existing display to identify at least one portion within the web-based content that can include the live video content. According to another embodiment of the invention, the method further comprises an act of processing the live video content to identify at least one portion within the live video content to integrate with the web-based content shown in the existing display.

According to another embodiment of the invention, the act of processing the web-based content shown in the existing display to identify the at least one portion within the web-based content that can include the live video content includes acts of processing the displayed content for background subtraction, and identifying the at least one portion within the displayed content based on the at least one portion appearing in the foreground of the displayed content. According to another embodiment of the invention, the act of processing the web-based content shown in the existing display to identify the at least one portion within the web-based content that can include the live video content includes processing the displayed content for object identification within the displayed content, and identifying the at least one portion within the displayed content based on an identified object within the displayed content.

According to one embodiment of the present invention, the identified object includes a head of a figure displayed in the content. According to another embodiment of the invention, the method further comprises an act of replacing the identified at least one portion with the live video content. According to another embodiment of the invention, the method further comprises an act of integrating the live video content into the identified portion. According to another embodiment of the invention, the method further comprising acts of processing the live video content for background subtraction, and identifying the at least one portion within the live video content based on the at least one portion appearing in the foreground of the live video content. According to another embodiment of the invention, the method further comprises processing the live video content for object identification within the live video content, and further configured to identify the at least one portion within the live video content based on an identified object within the displayed content. According to another embodiment of the invention, the identified object includes a head of a figure displayed in the live video content. According to another embodiment of the invention, the method further comprises an act of integrating the at least one portion of the live video content into the web-based content shown in the existing display. According to another embodiment of the invention, the method further comprises an act of replacing a portion of the content shown in the existing display with the identified portion.

According to one aspect of the present invention, a system for providing dynamically loaded video services is provided. The system comprises a user interface management component configured to manage rendering of computer content in a graphical user interface displayed to a user on a computer device, a communication component configured to connect the computer device to a communication network, a video service handler configured to access a web-based live video service provider, dynamically load a web-based live video service over the communication component from the live video service provider, manage transmitted and received live video content, and communicate live video content to the user interface management component, wherein the user interface management component is further configured to manage the display of the live video content in the graphical user interface displayed to the user.

According to another embodiment of the invention, the video service handler is configured to operate using local device memory for caching information. According to another embodiment of the invention, the video service handler is configured to operate using local device memory for dynamic loading of the web-based live video service. According to another embodiment of the invention, the computer device is constructed with RAM and Flash memory. According to another embodiment of the invention, the computer device is constructed without hard drives. According to another embodiment of the invention, the video service handler is further configured to communicate authentication information to the live video service provider.

According to one embodiment of the present invention, the system further comprises a profile component configured to store device configuration in a cloud based storage location. According to another embodiment of the invention, the profile component is configured to access the device configuration upon activation of the computer device. According to another embodiment of the invention, the video service handler is configured to access the device configuration to obtain account information for the web-based live video service provider. According to another embodiment of the invention, the video service handler is further configured to provide authentication information to the live video service provider. According to another embodiment of the invention, the video service handler is further configured to generate authentication tokens configured to maintain an active session with the live video service provider. According to another embodiment of the invention, the video service handler is further configured to receive authentication tokens from the live video service provider.

According to another embodiment of the invention, the video service handler is further configured to communicate live video session requests to the user interface management component. According to another embodiment of the invention, the user interface management component is further configured to render notifications within a user interface display based on state information associated with at least one of current content, a current view of content, and a mode of operation of the system. According to another embodiment of the invention, the system further comprises a registration component configured to establish the device configuration associated with the web-based live video service provider.

According to one embodiment of the present invention, the registration component is further configured to determine if an account for the web-based live video service provider is configured. According to another embodiment of the invention, the registration component is configured to automatically display a registration interface to the user. According to another embodiment of the invention, the registration component is further configured to connect to a live video service provider, and generate an account with the live video service provider. According to another embodiment of the invention, the registration component is further configured to establish the device configuration for an existing live video service provider account. According to another embodiment of the invention, the system further comprises a user interface component configured to execute a video chat session with a video chat contact upon selection in the user interface. According to another embodiment of the invention, the system further comprises a plurality of user interface components, wherein the plurality of user interface components are configured to execute a video chat session with a respective video chat contact. According to another embodiment of the invention, the video service handler further comprises a video service manager, wherein the video service manager is configured to manage settings associated with the live video service provider, including management of settings associated with a plurality of video contacts. According to another embodiment of the invention, video service manager is further configured to manage video session requests from video contacts not associated with the user's video service account.

According to another embodiment of the invention, the video service manager is configured to generate a user interface component associated with a new video contact, configured to permit the user to add the new video contact to the managed settings associated with the live video service provider. According to another embodiment of the invention, the user interface component is further configured to permit the user to execute a video chat session with the new video chat contact upon selection in the user interface. According to another embodiment of the invention, the video service manager is configured to generate a user interface component associated with a new video contact, configured to permit the user remove the user interface component associated with the new video contact. According to another embodiment of the invention, the video service manager is further configured to block the new video contact in the managed settings associated with the live video service provider in response to a user selection.

According to one embodiment the system is further configured to maintain a connection to a video service provider continuously upon start of the system. According to one embodiment, the system is further configured to maintain the connection and/or reconnect to the video service provider as needed to provide continuous or nearly continuous video service access. According to one embodiment, the system further comprises at least a second video service handler configured to access another web-based live video service provider, dynamically load another web-based live video service over the communication component from the another live video service provider, manage transmitted and received live video content, and communicate live video content to the user interface management component wherein the interface management component is further configured to bridge the live content delivered from the video service handler and the second video service handler. According to one embodiment, the registration component is further configured to connect, automatically, to a live video service provider, and generate, automatically, an account with the live video service provider. According to one embodiment, the user interface component comprises a video chat card. According to one embodiment, the user interface component is configured to execute a video chat session with a video chat contact.

According to one aspect of the present invention, a computer implemented method for dynamically loading live video services is provided. The method comprises managing, by a user interface management component, a display of rendered computer content in a graphical user interface to a user on a computer device, connecting, by the computer device, to web-based content over a communication network, accessing, by a video service handler, a live video service provider, loading, dynamically by the video service handler, a web-based live video service over the communication network, managing, by the video service handler, transmitted and received live video content, communicating the live video content to the user interface management component, and rendering, by a rendering engine, the live video content received from the user interface management component. According to one embodiment of the present invention, the act of loading, dynamically by the video service handler, the web-based live video service, includes an act of loading, dynamically, the web-based live video service into local device memory from the internet. According to another embodiment of the invention, the computer device is constructed without a hard drive. According to another embodiment of the invention, the method further comprises an act of authenticating, by the video handler, the computer device with the live video service provider. According to another embodiment of the invention, the method further comprises an act of automatically initiating a registration processes for registering the computer device for a live video service provider.

According to another embodiment of the invention, the method further comprises acts of generating, automatically, a user interface component in the graphical user interface, and associating the user interface component with a video contact subscribed to the live video service provider. According to another embodiment of the invention, the method further comprises an act of executing a live video session with the video contact in response to user selection of the user interface component. According to another embodiment of the invention, the user interface component is a video chat card.

According to one aspect of the present invention, a non-transitory computer-readable medium having computer-readable signals stored thereon that define instructions that, as a result of being executed by a computer, instruct the computer to perform a method for dynamically loading live video services is provided. The method comprises managing a display of rendered computer content in a graphical user interface to a user on a computer device, connecting to web-based content over a communication network, accessing a live video service provider, loading dynamically a web-based live video service over the communication network, managing transmitted and received live video content, communicating the live video content to the user interface management component, and rendering the live video content received from the user interface management component.

According to one embodiment of the present invention, the act of loading, dynamically by the video service handler, the web-based live video service, includes an act of loading, dynamically, the web-based live video service into local device memory from the internet. According to another embodiment of the invention, the computer device is constructed without a hard drive. According to another embodiment of the invention, the method further comprises an act of authenticating, by the video handler, the computer device with the live video service provider. According to another embodiment of the invention, the method further comprises an act of automatically initiating a registration processes for registering the computer device for a live video service provider.

According to another embodiment of the invention, the method further comprises acts of generating, automatically, a user interface component in the graphical user interface, and associating the user interface component with a video contact subscribed to the live video service provider. According to another embodiment of the invention, the method further comprises an act of executing a live video session with the video contact in response to user selection of the user interface component. According to another embodiment of the invention, the user interface component is a video chat card.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 32 illustrates an example user interface display, according to aspects of the invention.

DETAILED DESCRIPTION

Figure 1:
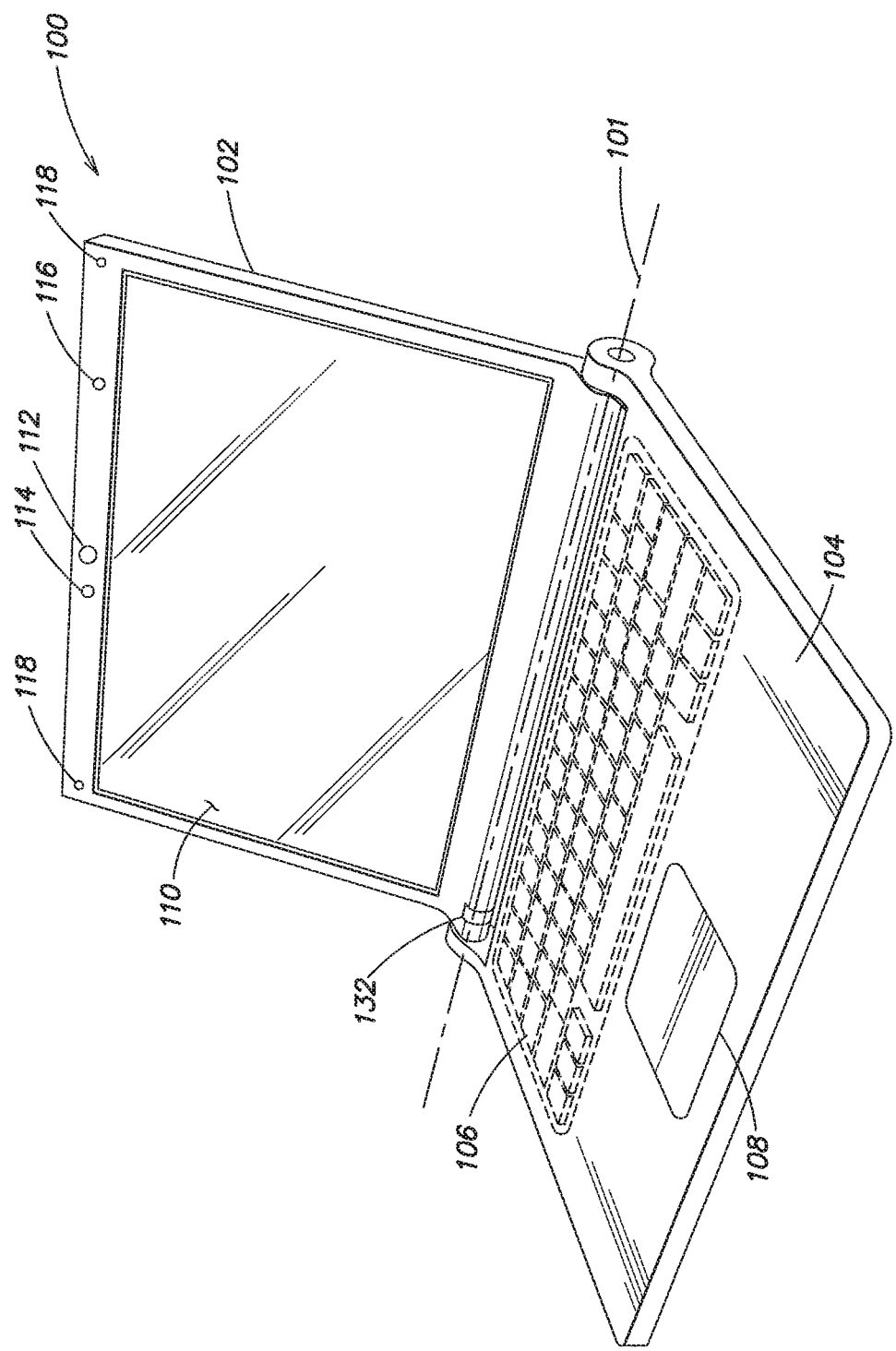
FIG. 1 is an illustration of one example of a portable computer on which various aspects of the present invention may be practiced.

Aspects and embodiments are directed to a web optimized computing device that integrates video chat objects into content displayed to a user of the web optimized device. The integrated video chat content can be configured to persist throughout the user's experience and interaction with the web optimized device. According to one embodiment, the web optimized device provides video integration at the operating system level through a shell process configured for window management, application execution, inter-process communication, and cloud application instantiation.

The shell is further configured to permit video chat persistence through computing activity on the web optimized device. The persistence permits a video chat session to follow the user through accessed content, changes in views on the web optimized device, execution of different application, among other options. The shell can also be configured to render video chat objects responsive to the current content being viewed by the user to, for example, prevent interference with any computing operation being performed by the user. Video chat object displays can also be provided customized to the viewed content so as to minimize any interference between viewed content and the video chat object. Additionally, device specific configurations can also be used to modify the presentation of video chat objects.

Synergy between web-based content, web-based content providers, and video chat features can be found and exploited by even the most novice user when provided an intuitive interface that integrates the displayed video chat into any accessed content. For example, the streamlined computing systems and user interface presentations discussed, for example, in U.S. patent application Ser. No. 12/416,479 filed on Apr. 1, 2009 and entitled "SYSTEM AND METHOD FOR STREAMLINING USER INTERACTION WITH ELECTRONIC CONTENT," and U.S. patent application Ser. No. 12/611,282 filed on Nov. 3, 2009 entitled "METHOD AND APPARATUS FOR MANAGING DIGITAL MEDIA CONTENT," which applications are incorporated herein by reference in their entirety, can be specially configured to operate as web optimized devices that integrate video chat operations. According to one aspect, the interaction between various web-based content, computer features and displays, and in particular video chat operations and displays can be readily integrated to enhance the user's computing experience.

Methods and apparatuses are provided to facilitate users leveraging video chat services by integrating video chat content into any web-based content and/or web-based services displayed on a web optimized device through the operating system executed on the web optimized device. In some settings, web optimized devices can be constructed to use local memory only for caching and rely on, for example, cloud based storage, for permanent storage. In some embodiments, the web optimized device is constructed without hard drives or other traditional mass media storage devices, and instead employs Flash and RAM based memory to provide for the local caching of data. The shell can be configured to access a cloud based storage account to obtain a profile for the device containing specific configurations. Profiles can be configured to be device specific or user specific. In some embodiments, the profile includes information for configuring video chat services on the web optimized device. Typically, a web optimized device can be configured to execute a video chat configuration process at first boot that prompts a user to configure and/or create a video chat account with a third party provider. The set up information is then stored for use on the device.

It is to be appreciated that embodiments of the methods and apparatus discussed herein are not limited in application to the details of construction and the arrangement of components set forth in the following description or illustrated in the accompanying figures. Methods and apparatus as disclosed herein are capable of implementation in other embodiments and are also capable of being practiced or carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

According to one embodiment, methods and apparatus are provided for creating and managing video chat objects in content displayed to user on a web optimized device in a graphical user interface. In particular, video chat objects can be created and rendered on a user interface in the form of cards. Cards can be viewed as the building blocks of the user interface with which a user interacts with the web optimized device. Cards render computer content (e.g., web-based, application specific, etc.) depending on a particular view that is currently active on the web optimized device. Cards present a consistent and intuitive interface between a user and the computer content associated with a particular card. For example, web cards permit viewing of web-based content, channel cards present dynamic views of content and can include summary views of content for easier interaction as each card represents a unit of computer content that can be selected by an end user. In addition, the video chat objects can be rendered as cards themselves, and in another example can be integrated into the presentation of other computer content referenced by other cards. A particular view of the cards, represents the organization of the displayed cards. For example, a home view (also referred to herein as a "Card View") presents an organization of the cards that exist on the web optimized device. The home view can be likened to a conventional desktop view on a conventional computer system.

The tools and capability for creating and managing these video chat objects are provided via a computing device, for example, a streamlined device specially configured to integrate video chat objects, having a graphical user interface, as discussed below. For example, various aspects may be implemented as specialized software executing in one or more computer systems. In one embodiment, the video chat objects incorporate an online component, and the graphical user interface provides the user with access to those online components displayed, for example, within other content on the web optimized device, as discussed below.

Figure 7A:
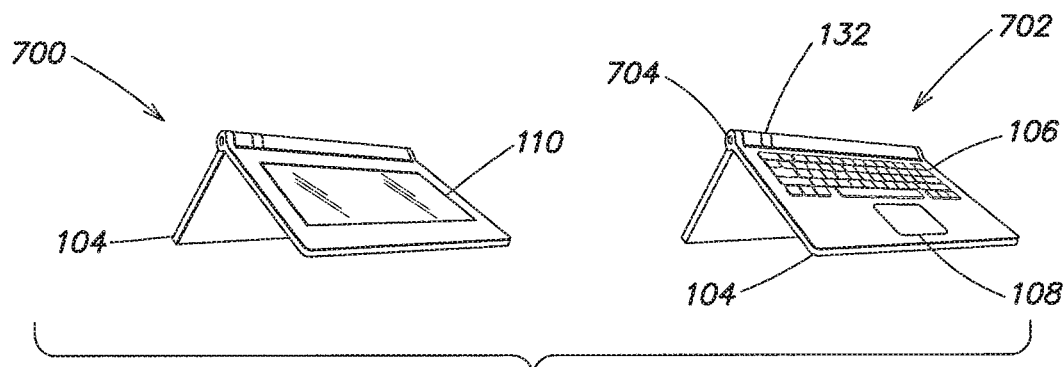
FIGS. 7A-D illustrate example configuration of a portable computer, according to aspects of the invention.

One example of a device that can be specially configured to provide integrated video chat services includes a portable computer that is configurable between a laptop mode (in which the portable computer has a conventional laptop appearance) and an easel mode in which the base of the computer and its display component stand upright forming an inverted "V," as discussed further herein. Certain aspects and embodiments are directed to a portable computer that is configurable between different operating modes, including a laptop mode (in which the portable computer has a conventional laptop appearance—FIG. 7B), a flat mode (a base and a display of the device are configured at approximately 180 degrees relative to each other—FIG. 7C), a frame mode (a base and a display are configured at greater than approximately 180 degrees relative to each other—FIG. 7D), a TV mode (the device may be connected to an HDMI input or other TV input type), and an easel mode in which the base of the computer and its display component stand vertically forming an inverted "V," shown in FIG. 7A, at 700 display side view and at 702 keyboard side view, as discussed further herein.

The displayed cards and the views of the cards provided can be configured to be responsive to a mode of operation for the device, under the control of a shell process that among other functions manages the display of cards in the user interface. The particular visualization of the card and/or the view of multiple cards can be transitioned to another view based on changes of the mode of operation. Reference to modes of the computer and modes of the device can include aspects of the physical configuration of the portable computer/device, as illustrated. The portable computer is capable of different display formats and functionality in the different modes, and includes a graphical user interface that can work seamlessly with the computer hardware to provide a unified, comfortable, holistic user experience.

Referring to FIG. 1, there is illustrated one example of a portable computer according to aspects of the invention upon which methods and apparatus for integrating video chat objects can be implemented. In FIG. 1, the portable computer 100 is illustrated in the "laptop" mode, with the display component 102 inclined at a viewing angle from the base 104. The display component 102 is pivotably coupled to the base 104 by a hinge assembly (not shown) that allows the display component to be rotated with respect to the base. The hinge assembly may include a single or multiple hinges, which may be any of a variety of hinge types, including, but not limited to, single-axis hinges, multiple-axis hinges, geared hinges, etc. In one example, the hinge assembly allows the display component 102 to be rotated (or tilted) about a longitudinal axis 101 running along an interface between the display component 102 and the base 104, as illustrated in FIG. 1 and discussed further below. The base 104 includes a keyboard 106 and internal electronic components (not shown), such as a central processing unit, memory, and other components necessary to operate the portable computer, as known to those skilled in the art. In some embodiments, the base 104 may also include a touch pad 108 or trackball (not shown) for receiving user commands, as known to those skilled in the art. Shown at 132 is an integrated scroll wheel that can be used to interact with content displayed on display screen 110. In one particular example, scroll wheel 132 provides for user input when portable computer 100 is in an easel mode (FIG. 7A) and may be used in conjunction with selector button 704.

In one embodiment, the display component 102 includes a display screen 110, and may also include a camera 112, microphone 114, and infrared receiver 116, as discussed further below. It is to be appreciated that the locations of the camera 112, microphone 114 and infrared receiver 116 are not limited to the example illustrated in FIG. 1, and may be placed in other locations on the display component 102 and/or base 104, as would be recognized by those skilled in the art. The display component 102 may also include cushions 118 that provide soft contact points between the base 104 and the display component 102 when the portable computer is closed. In one example, the cushions 118 are made of rubber. However, it is to be appreciated that the invention is not so limited, and the cushions 118 may comprise materials other than rubber, including, for example, a polymer, felt, or other suitable materials as would be recognized by those skilled in the art.

Figure 2:
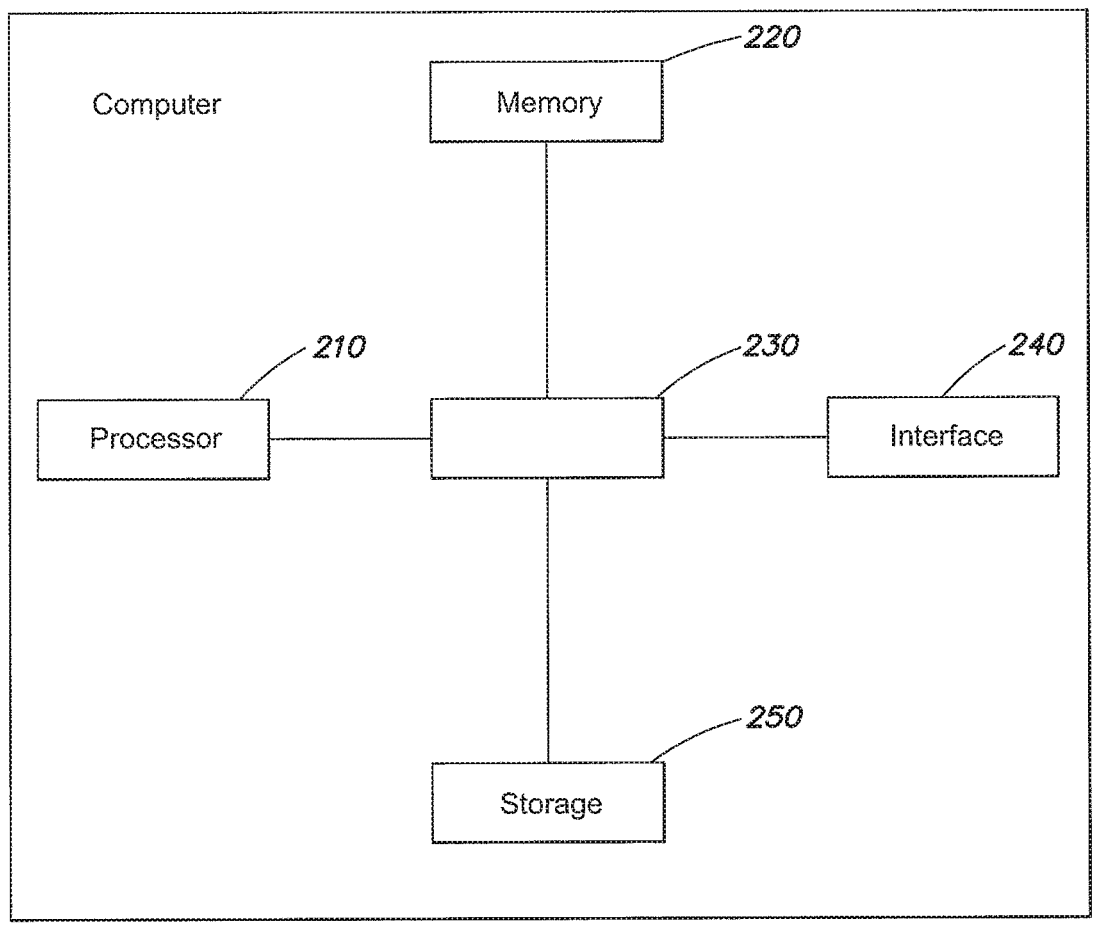
FIG. 2 is a block diagram of one example of a computer system, according to aspects of the invention.

FIG. 2 illustrates a block diagram of some components of an example of the portable computer 100, in which various aspects of the present invention may be practiced. For example, various aspects of the invention may be implemented as specialized software executing in one or more computer systems including multiple computer systems communicating over network. As depicted in FIG. 2, the computer 100 includes a processor 210, a memory 220, an interface 240 and a storage system 250. Components of the portable computer 100 may be coupled by an interconnection element 230. The interconnection mechanism 230 enables communications (e.g., data, instructions) to be exchanged between system components of the computer system 100. The interconnection mechanism 230 may include one or more physical busses (for example, busses between components that are integrated within a same machine), or may include any communication coupling between system elements including specialized or standard computing bus technologies such as IDE, SCSI, PCI and InfiniBand. In one example, computer system 100 is implemented without hard drive devices.

The processor 210, which may include one or more microprocessors or other types of controllers, can perform a series of instructions that result in manipulated data. The processor 210 may be a commercially available processor such as an Intel PENTIUM, Motorola PowerPC, SGI MIPS, Sun UltraSPARC, or Hewlett-Packard PA-RISC processor, but may be any type of processor or controller as many other processors and controllers are available. The processor may also execute a shell process that manages at least a portion of the hardware elements included in computer 100. The shell may be provided in addition to or integrated with a conventional operating system which can include, among others options, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems and/or shell processes can be used, and embodiments are not limited to any particular operating system or shell process. As shown, the processor 210 is connected to other system elements, including a memory 220, by the interconnection mechanism 230.

The memory 220 may be used for storing programs and data during operation of the computer system 100. Thus, the memory 220 may be a relatively high performance, volatile, random access memory such as a dynamic random access memory (DRAM) static memory (SRAM), or Flash memory; however, the memory 220 may include any device for storing data, including a non-volatile storage device. Various embodiments in accord with the present invention can organize the memory 220 into particularized and, in some cases, unique structures to perform the aspects and functions disclosed herein.

Still referring to FIG. 2, the computer 100 also includes one or more interface devices 240 such as input devices, output devices and combination input/output devices. The interface devices 240 may receive input and/or provide output. More particularly, output devices may render information for external presentation. Input devices may accept information from external sources. Examples of interface devices include, among others, the keyboard 106, mouse devices, trackballs, microphone 114, touch screens, printing devices, display screen 110, speakers, network interface cards, etc. The interface devices 240 allow the computer system 100 to exchange information and communicate with external entities, such as users and other systems. In some embodiments, computer 100 includes an HDMI input/output device that permits external HDMI devices (e.g. an HDTV) to be connected to the computer 100. According to one embodiment, completed connections to HDMI devices can trigger a mode change within the computer 100, and alter the way in which content is presented to a user.

The storage system 250 may include a computer readable and writeable nonvolatile storage medium in which instructions are stored that define a program to be executed by the processor. The storage system 250 also may include information that is recorded, on or in, the medium, and this information may be processed by the program. The instructions may be persistently stored as encoded signals, and the instructions may cause a processor to perform any of the functions described herein. The medium may be, for example, a flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage 250 as shown, or in memory system 220. The processor 210 generally manipulates the data within the memory 220, and then copies the data to the medium associated with storage 250 after processing is completed. A variety of mechanisms are known for managing data movement between the medium and integrated circuit memory element and the invention is not limited thereto.

In one embodiment, the computer system does not incorporate mass storage (i.e., a hard drive), instead, the system can be configured to employ RAM and Flash memory storage. The capacity of the flash memory may be significantly less than traditional mass storage options. Thus in some embodiments, traditional features such a download have been configured to operate differently for the computer 100. According to another aspect, various operations provided on conventional systems are adapted for a web optimized device that employs local memory. Some embodiments use the local memory only for caching. In some examples, the web optimized device remotely accesses memory for permanent storage. In one example, operations that require large amounts of computer storage are transformed into remote storage requests. In one embodiment, a web optimized device can be configured to identify local storage requests and transform them into a storage request to an on-line service provider identified in a user and/or device profile. In another embodiment, the system prompts a user to identify a remote storage service provider in response to a local storage request. Various operations may be transformed, including download and print operations, among others.

In some embodiments, a web optimized device can be further configured with additional profile based operations. For example, a check can be performed against a device or user profile to determine that an allotment of time of computer use has not been exceeded. Additional options can include the use of prepaid accounts associated with a device or user profile. The prepaid account can be used to purchase access to specific content to be displayed on the web optimized device. For example a user can purchase a card and access the content it is mapped to, until the user has expended the value in the pre-paid account. Pre-paid accounts can also be used to govern an amount of usage for the device. For example, parents can configure the web optimized device with an allowance for the children as users of the device. The parents can set a total allowance associated with a period of time. Periodically the allowance can be configured to replenish a "piggy bank." The account and its associated configurations can be stored in the cloud based storage location. In one embodiment, local copies of the account and the associated information are caches and the remote location is updated periodically.

The time spent on the web optimized device can trigger a debiting of value from the allowance (and the piggy bank), until nothing remains, and the user receives a message indicating the same. In some examples, the allowance can have real value. A user can purchase access to content over the cloud using the value in the piggy-bank. The device can be further configured for automatic replenishment of the piggy-bank, according to user specified criteria. For example, a parent can set a weekly allowance for a child, which governs computing time and/or content access through the debiting of the allowance based on use. The device can be configured to prevent access in response to a zero balance.

The computer system may include specially-programmed, special-purpose hardware, for example, an application-specific integrated circuit (ASIC). Aspects of the invention may be implemented in software executing on hardware, hardware or firmware, or any combination thereof. Further, such methods, acts, systems, system elements and components thereof may be implemented as part of the computer system described above or as an independent component.

Although the portable computer 100 is shown by way of example as one type of computer system upon which various aspects and functions may be practiced, aspects of the invention are not limited to being implemented on the computer systems as shown in FIGS. 1 and 2. Various aspects and functions in accord with the present invention may be practiced on one or more computers having different architectures or components than those shown in FIG. 2.

Computer system 100 may be programmable using a high-level computer programming language. Computer system 100 may also be implemented using specially programmed, special purpose hardware. The processor 210 and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). In one embodiment, an Internet cloud is maintained on server systems accessible from a plurality of devices (e.g., computer 100). It should be appreciated that the invention is not limited to executing on any particular system or group of systems. Also, it should be appreciated that the invention is not limited to any particular distributed architecture, network, or communication protocol.

According to one embodiment, a web optimized device can incorporate video chat features into user interactions with the computer system/device. Integration includes representing computer based content in visual representations that render computer operations/behavior in a consistent manner, and can also include incorporating video chat displays into the visual representations. These visual representations can be rendered as cards, as discussed in more detail below. Different types of cards can be employed to render different types of available content. For example, web-based content, can be rendered as a web card that is associated with a mapping to web content. Some web cards can map directly to web pages, and in response to selection of the web card by a user, the computer device executes the mapping and displays a web view of the content.

A shell process may be provided that can control the instantiation and display of the cards shown in a user interface. The shell can be configured to provide different views of a card based on a mode of operation and/or a selected view. Other cards may be used to provide interactive displays selectable by a user. Another type of card includes a channel card configured to stream web-based content in a manner that allows for summarization of content, while providing the ability to fully appreciate the summarized content. Web cards and channel cards are building blocks of the user interface managed by the shell to be displayed to an end user on a web optimized device. The views of the cards managed by the shell are configured to permit easy selection of the web-based content associated with the card.

Channel cards can be displayed in conjunction with video chat objects according to aspects and embodiments, and the video chat objects can be presented without impact on the summarized content in the channel card. In another example, the content displayed in any card is altered to integrate the video chat object directly into the displayed content. For example, where a user is viewing a video display of a yoga instructor, a video chat object can be incorporated into the content to display the video chat positioned on the head of the yoga instructor. Other presentation options are available wherein the video chat object is displayed in a predefined portion of a card display, a dynamically determined position within a card display, a content based display position, and a display position based on device configuration or mode of operation. A more detailed discussion of embodiments and examples of a card-based system for rendering computer based content in visual representations is discussed in U.S. patent application Ser. No. 12/416,479, filed on Apr. 1, 2009 and entitled "SYSTEM AND METHOD FOR STREAMLINING USER INTERACTION WITH ELECTRONIC CONTENT," which is incorporated herein by reference in its entirety.

In addition to web cards and channel cards, integration of video chat into the user experience on a web optimized device includes the creation of video chat cards. The video chat cards are visual representations of browser based objects configured to provide access to a cloud based video chat provider and the services the video chat provider makes available. An individual video chat card is typically configured to contain the configurations for initiating and receiving a video chat session through the cloud based video chat provider to another video chat subscriber. Video chat cards can be selected by a user from a card view to initiate a video chat session to the configured subscriber. In one embodiment, and individual video chat card is displayed for a given video chat contact. Video chat cards can be organized into the different views managed by the shell process just as other card types, and the presentation of the video chat card can be configured to be responsive to an associated mode of the device. Specific behavior of the video chat cards in various views and modes is discussed in greater detail below.

Figure 3:
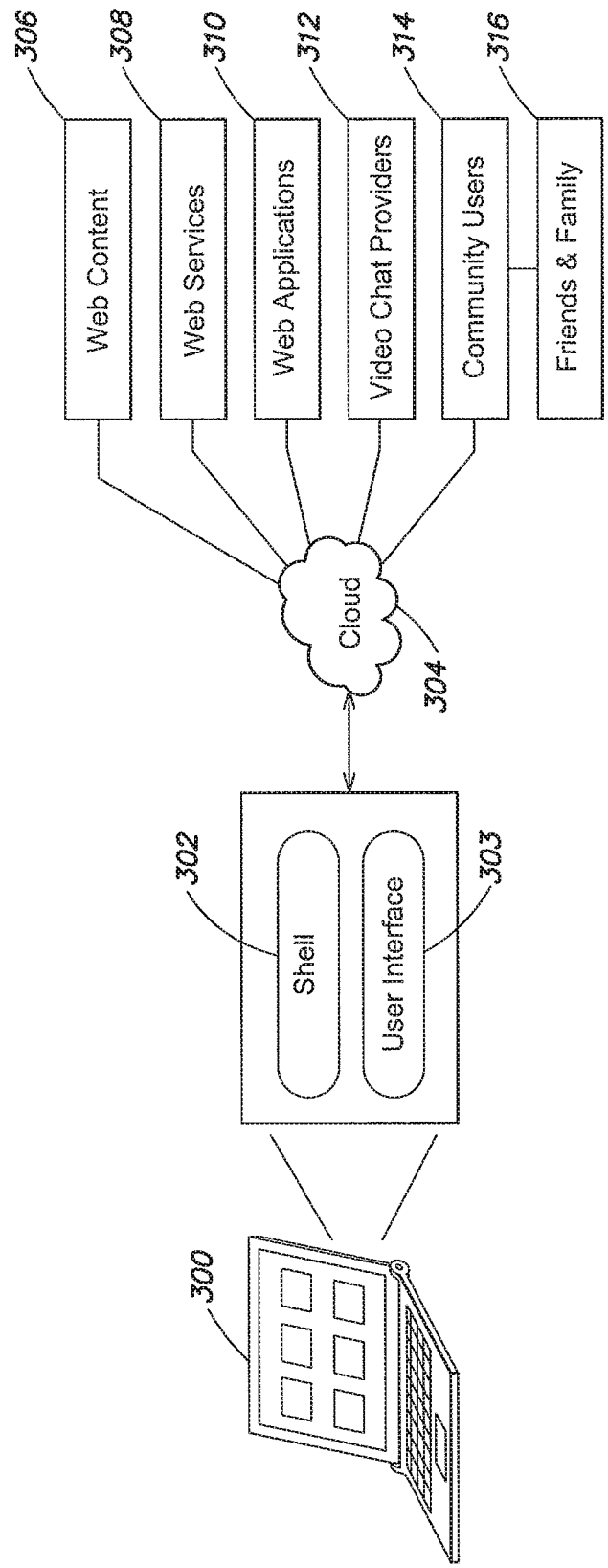
FIG. 3 is a block diagram of one example of an architecture for a computer system, according to aspects of the invention.

Shown in FIG. 3 is a block diagram of one example of an architecture for a web optimized device 300 that incorporates video chat functionality into a user's experience with web-based content. In particular, a shell process 302 controls the display of a graphical user interface 303 on the web optimized device 300. The shell process 302 permits interaction between the web optimized device 300 and cloud based services/content through the user interface. Cloud based services and content typically includes video chat service providers 312, media providers 306-310, and/or any other Internet available content (e.g. entertainment media, such as audio and video—playing music, streaming video, viewing photographs, email, news feeds, etc.). The shell process 302 manages user access to Internet content, services and web-based applications, and permits the user to receive and interact with video chat objects integrated into the displayed content. Further, the shell process 302 can be configured to manage transitions between different content, while generating integrated video chat objects for the user of the device.

The shell process 302 and/or the processes it instantiates manages communication between device 300, the cloud 304 (e.g., the Internet) to permit access to cloud based services and cloud based content to a user of the device 300. As discussed, the cloud based services and the cloud based content accessed can be of any type, including any web-based content at 306. Typically, the cloud based content and cloud based services includes services made available by third party providers, either for free or requiring payments, shown for example at 308. One example of a third party service provider includes e-mail service provider GMAIL. Various content providers can be accessed via the cloud and should be understood to include any Internet available content and/or provider, web-based applications 310, video chat service providers 312, on-line communities 314, and more specifically friends and family communities 316 established by the user of the device 300 and the friends and family the user of the device 300 chooses to associate with, discussed in greater detail below.

The shell 302 can be configured to manage the display of web content through user interface 303, monitor and manage communications between the device and systems that provide the web-based content, manage inter-process communications between the processes instantiated on the device 300 that display the web-based content, and further manage the calls to and from the drivers associated with various cloud based content displayed in user interface 303. In one embodiment the shell 302 can be thought of as and performs the operations associated with a conventional operating system for the device 300. The shell 302 permits the user to interact with all the content displayed on device 300. According to another embodiment, the shell can be configured to execute on a processor that interacts with RAM and Flash memory without access or need of a conventional hard drive or other mass media storage device. The shell employs RAM and Flash memory to access and display web-based content (e.g., 306-316). The shell is further configured to access cloud based storage to provide long term data storage.

Various conventional operations can be transformed to behave differently on a web optimized device based on the optimization of RAM and Flash usage over the use of mass storage devices. In particular, the shell 302 and/or the processes that the shell instantiates can be configured to transform certain operations on the web optimized device. In one example, local storage requests are transformed to remote storage requests. The shell can be configured to identify web-based services the device and/or the user is subscribed to by accessing a device and/or user profile containing information on registered services. Once the shell identifies an appropriate service in the device and/or user profile (e.g., FLICKR to handle photo storage), a save operation can be transformed into an upload operation to store the photo remotely. In one alternative, the content can be transmitted directly from the source of the content to a remote storage location. In another embodiment, the content can be sent from the local memory of the web optimized device.

The shell 302 is further configured to manage display of video chat objects during a user's navigation through the web-based content, regardless of source of the web-based content. In some embodiments, shell 302 can be configured to determine a content type being viewed on the device based on state information. For example, the shell can maintain state information on a displayed content type, a displayed content source, applications being employed to access the content, and user based activity associated with the content and any of the state based information can be used to determine a position for a video chat object within the content display. The shell can also be configured to maintain state information on the type of view being displayed in the user interface, and customize display position of the video chat objects based on the type of view. Further, the shell is responsive to modes of the device, and maintains information on the current display mode. State information on the current mode of the device can be used to modify presentation position and/or behavior of a video chat object displayed to a user.

Figure 4:
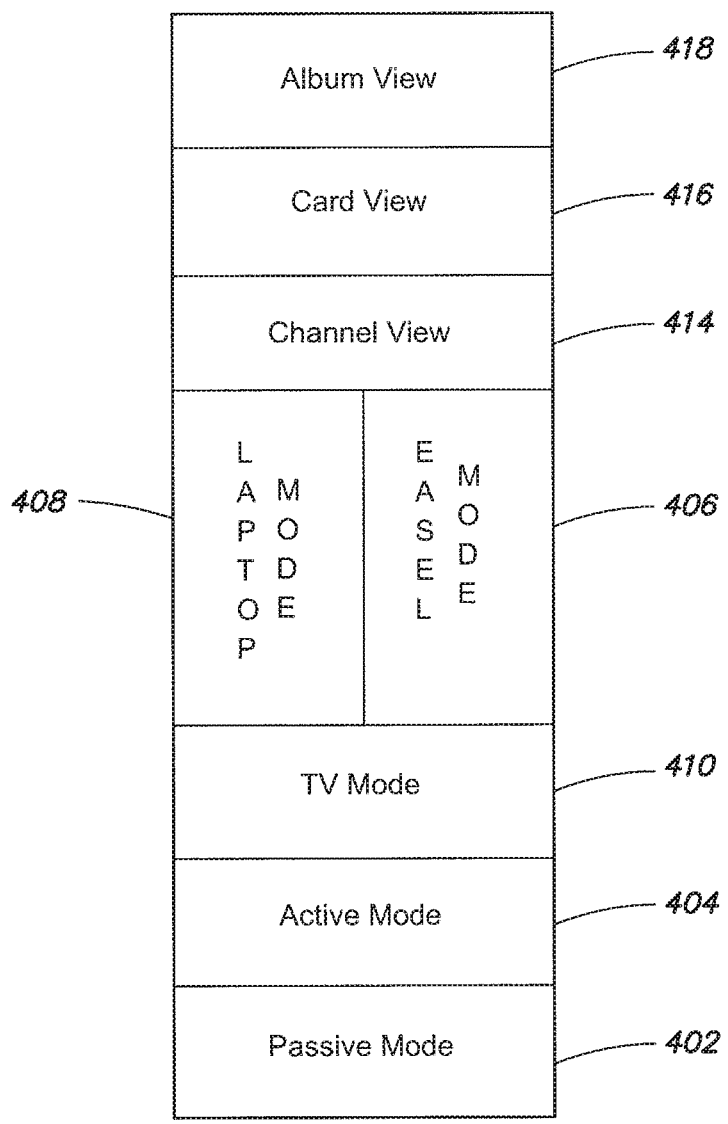
FIG. 4 illustrates a logical block diagram of examples of the plurality modes and plurality of views of web-based content provided on an example computer system, according to aspects of the invention.

Cards, modes of operation, and selected views are defined for the web optimized device to present an easy and intuitive user interface that promotes integration of web-based services, and in particular, video chat functionality. FIG. 4 illustrates a block diagram of some of the modes of operation and views of content presented to a user. In particular, the user interface can be configured to be responsive to the modes of operation of the device, and changes in mode can effect transitions between the views according to the transition.

FIG. 4 illustrates a logical block diagram of examples of the plurality modes and plurality of views of web-based content that can be provided on a web optimized device (e.g., 300). In one embodiment, active mode 404 and passive mode 402 define overarching modes of operation for the web optimized device from which all content can be displayed. Accordingly to one embodiment, a passive mode is provided which is a content viewing mode that is triggered when no user interaction with the device occurs for some predefined period of time. According to one embodiment, the passive mode can be thought of a screen saver mode, however, passive mode 402 maybe specially configured to permit the web optimized device to act as a passive information and/or entertainment device, such as a photo frame or clock, and the display can be configured to provide useful function even when the device is not being actively used. The device may do so, for example, in the in the easel mode without taking up much surface area on a desktop.

Active mode 404 is triggered whenever a user is interacting with the web optimized device. According to one embodiment, the shell is specially configured to manage the transitions between active and passive modes, and manage the content displayed in either. Video chat objects and video chat behavior can also be configured to be responsive to the mode in which the web optimized device currently resides.

In particular, incoming video chat communications can trigger different functionality based off of whether the device is in active 404 or passive mode 402. Additional modes can be provided and managed by the shell, including an easel mode 406, laptop mode 408, and a TV mode 410. Although the invention is not limited to those specific modes and additional modes can be provided. Additional modes can include, for example, a frame mode and a flat mode.

Figure 7B:
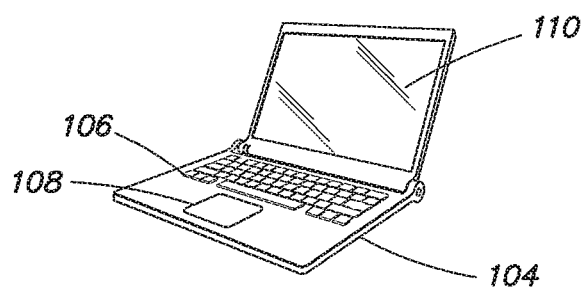
Figure 7C:
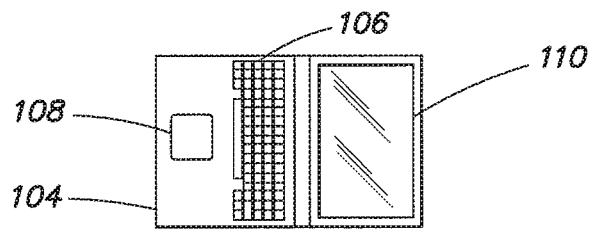
Figure 7D:
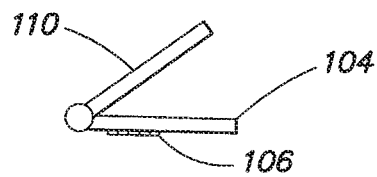

According to one embodiment, the easel mode 406 and laptop mode 408 maybe triggered based on a physical configuration of the web optimized device. In particular, when the base and display of the device form a "V"—See FIG. 7A, the web optimized device can be configured to transition into the easel mode, which can be associated with a default display view. In one embodiment the default display view for the easel mode includes a channel view 414 (shown in greater detail in FIG. 9). Shown in FIG. 7B, is a conventional laptop configuration, which can trigger a transition to the laptop mode 408. The laptop mode can also be configured with a default view, e.g. card view 416 (shown in greater detail in FIG. 10). TV mode can be configured on the web optimized device to be responsive to the presence of HDMI devices or other external display devices. In one example, the web optimized device can be configured to respond to the presence of an HDMI display device (e.g. HDTV) by altering the display format of the web optimized device's user interface. The alterations in the display are configured to optimize presentation of computer content for HDMI devices.

The channel view 414 and the card view 416 are not exclusive to a particular mode, and can be configured to be accessible for example, in either laptop or easel mode. In one example, the device can include an accelerometer within the base, the display, and/or the hinge or other location, that permits the device to determine a degree of rotation of the based with respect to the hinge. The device can trigger changes in mode of operation based on a signal from the accelerometer indicative of the degree of rotation. The changes in mode of operation can also include a change in the view of currently displayed content. For example, mode changes can trigger changes between card and channel views. The card view and channel view maybe configured to organize and display individual user interface objects that can be used to access web-based content. Further any view presented can be modified based on whether the device is in TV mode or not. For example, web cards and channel cards (example user interface objects) and their associated views can be display in different formats based on the device being in TV mode or not.

Different types of cards may be employed to render different types of available content within a given view. For example, web-based content, may be rendered as a web card that is associated with a mapping to web-based content. Some web cards map directly to web pages and in response to selection of the web card the computer device executes the mapping and displays a web view of the content. Other cards may be used to provide interactive displays selectable by a user. In another example, system operations are displayed as system cards, which are associated with mappings to system operations, for example, communications configurations, and may comprise a settings card, for configuring display settings, sounds settings, and device profile information, among other system options. Another type of card includes a channel card configured to stream web-based content in a manner that allows for summarization of content, while still providing the ability to fully appreciate the summarized content.

Figure 5:
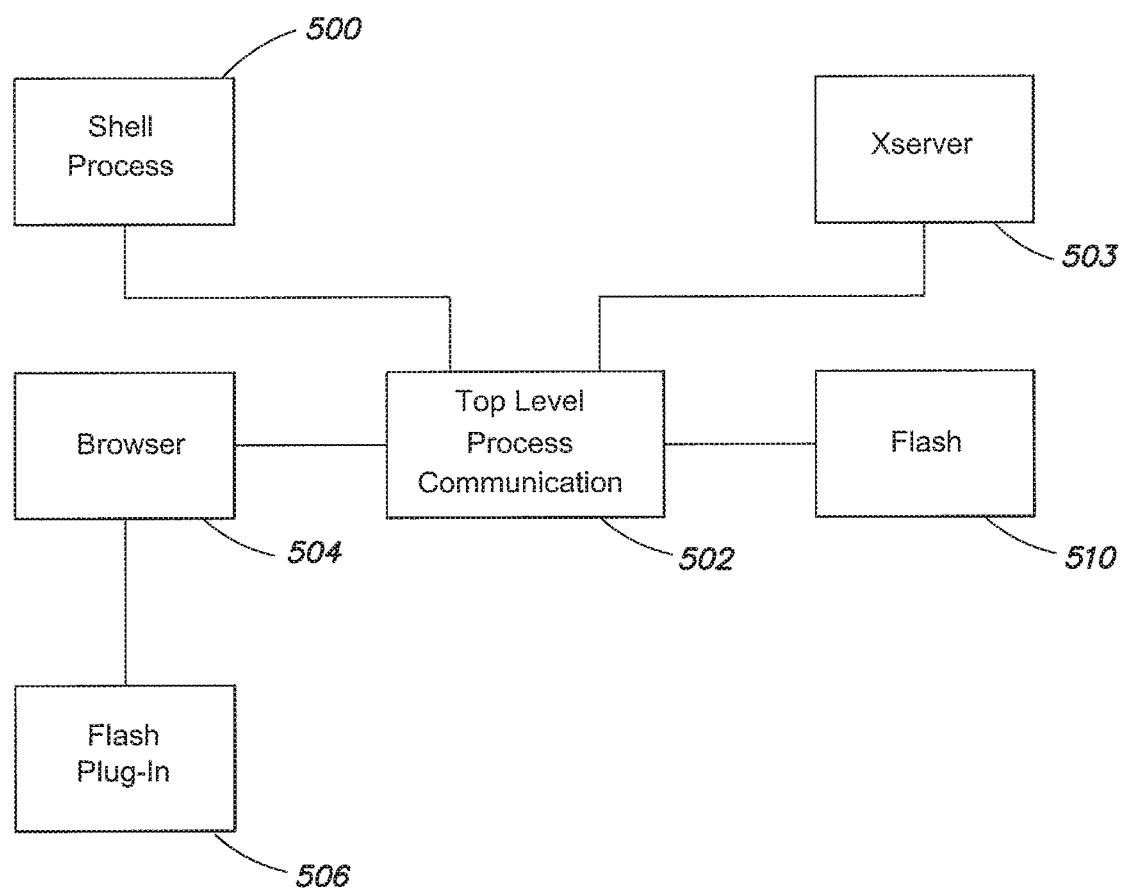
FIG. 5 illustrates an example block diagram of components that operate in conjunction to retrieve web content and render a display of that content on a computer system, according to aspects of the invention.

Each card can be configured to render web-based content via operation of a browser process and any additional plug-in required to display its respective content. In particular, FIG. 5 illustrates an example block diagram of components that operate in conjunction to retrieve web content and render a display of that content in the form of a card. In the illustrated example, a card is presented by operation of a browser engine 504 communicating over a top level communication channel 502 to an xserver process 503 and a shell process 500 which manages the display of the card in a user interface. The shell 500 can be configured to manage the compositing of the content to be rendered by xserver process 503. In some embodiments, shell 500 provides commands to the xserver process to render display controls within the displayed content. In other embodiments, the shell 500 can be configured to composite the browser content with display controls and pass the result to the xserver 503 for rendering. The browser engine 504 can also be configured to execute a flash plug-in 506 to render flash based content, and the browser engine can communicate the combined and/or flash content to be rendered, via the communication channel 502 to the shell 500 and/or the xserver 503.

Alternatively, a flash engine 510 can be executed on its own to present content for compositing by the shell 500 and/or rendering by the xserver 503. In one embodiment, each of the component processes can be executed as its own java script engine, with the top level communication channel 502 configured to permit communication between the components. In another embodiment, each java script engine can be configured with bindings to native code bases to execute the desired functionality. In one example, native C libraries can be exposed to the engines as JScript objects to be executed by the java script engines. According to some embodiments, cards that employ flash plug-ins or utilize a separate flash engine are limited to one invocation of a flash process. In other embodiments, each card can be configured to execute its own flash instance. In some examples, each of the flash instances can be constrained by a memory bound. The memory bound can be configured for each card individually. In other embodiments, the memory bound can be configured by the type of card.

In addition, according to some embodiments, the shell can be configured to receive content directly from a web-based source and pass the content to rendering engine (e.g. xserver 503). Thus, according to some implementations, the content for a card can be entirely controlled within the shell 500. In some examples, functions associated with a browser engine 504 can be embedded within the shell 500 to permit the shell to directly control the content associated with a particular card.

Cards may differ in the type of content displayed and the manner in which it is displayed. In particular, channel cards according to some aspects and embodiments, present summarized content in a manner that permits appreciation and interaction with the summarized content itself. In another example, channel cards are configured to present a streamlined view that cannot only be appreciated and interacted, but may be transitioned from one mode of viewing to another without loss of the ability to appreciate and interact with the streamlined view. Various card-based system, modes of operation and associated views for rendering computer based content in visual representations (i.e. cards) are discussed in U.S. patent application Ser. No. 12/416,479, filed on Apr. 1, 2009 and entitled "SYSTEM AND METHOD FOR STREAMLINING USER INTERACTION WITH ELECTRONIC CONTENT," and detailed treatment of additional views and card content types, including an album view 418, FIG. 4, can be found in U.S. patent application Ser. No. 12/611,282 filed on Nov. 3, 2009 entitled "METHOD AND APPARATUS FOR MANAGING DIGITAL MEDIA CONTENT," incorporated herein by reference in its entirety.

Integrating video chat objects into content displayed to a user of the web optimized device can include the creation, organization and display of video chat cards throughout the modes of operation of the web optimized device, and the respective views of the content. In one embodiment, a shell process controls and starts a plurality of java script engines which are configured to integrate browser based displays in the form of cards, provide inter-process communication engines, and with respect to video chat services, provide for communication with a video chat provider daemon. Each card displayed, whether web, channel, or video chat card, can be rendered by a compositing of whatever content a respective browser process associated with that card renders, and the shell can control the placement of the rendered content on the display screen. Further, the shell can be configured to composite content provided from the browser processes with user interface controls. The shell manages and responds to the displayed controls triggering operations associated with the browser engines. Individual controls, can be provided for browser based operations like back, forward, refresh and can also include search features among others.

Figure 6:
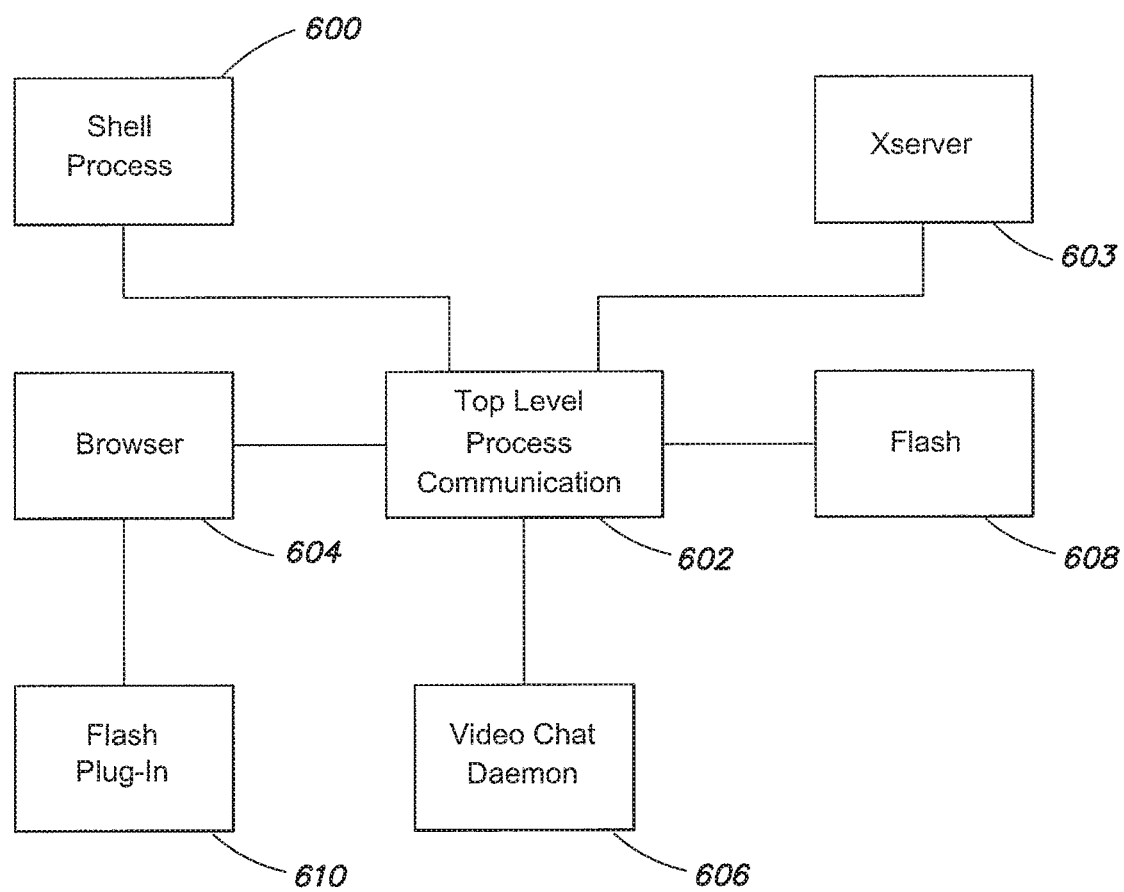
FIG. 6 illustrates an example block diagram of processes executed by a computer system to render a video chat interface, according to aspects of the invention.

As discussed, flash scripts can be executed by a browser process and the content rendered in flash composited with the content rendered by the browser to form the content for a card. In one example, a card is the composite of a canvas generated from the browser process and/or flash plug-in content, plus interface controls managed by the shell and rendered by a rendering engine within a user interface. Shown in FIG. 6 is an example block diagram of processes executed by a web optimized device to deliver a video chat card. The processes include a shell process 600, a top level process communication channel 602 that can be configured to permit communication between the shell 600, an xserver process 603, a browser engine 604, a flash engine 608 and a video chat daemon 606. The video chat daemon 606 can be configured to provide access to the functionality associated with a cloud based video chat provider to the web optimized device. Each of the components can be executed as its own java script engine, with the top level communication channel 602 configured to permit communication between the components. In one example, the browser object 604 can be configured to execute a flash plug-in 610 in order to render video chat content.

Figure 10:
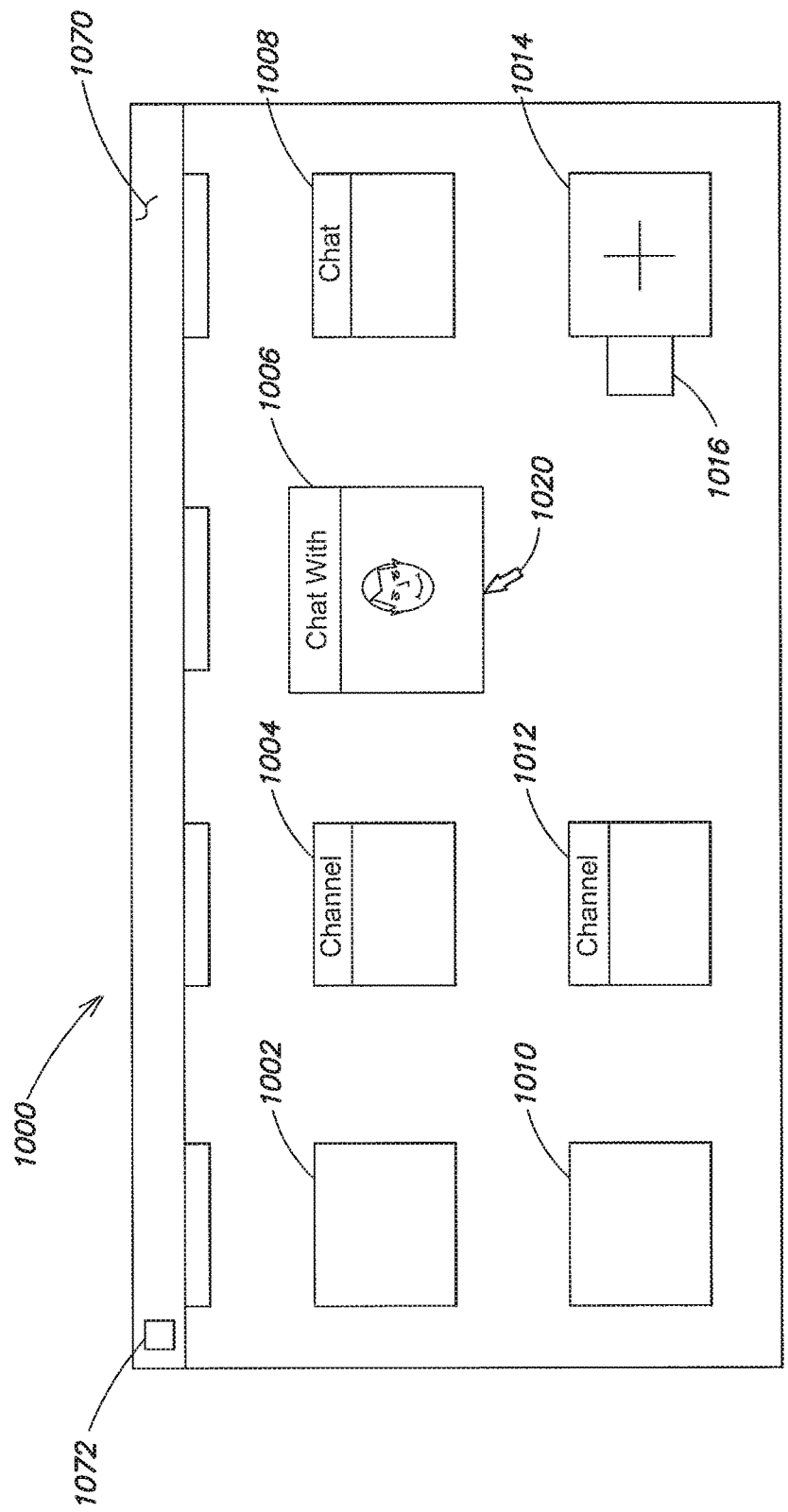
FIG. 10 illustrates an example view of web-based content rendered on a computer system, according to aspects of the invention.
Figure 11:
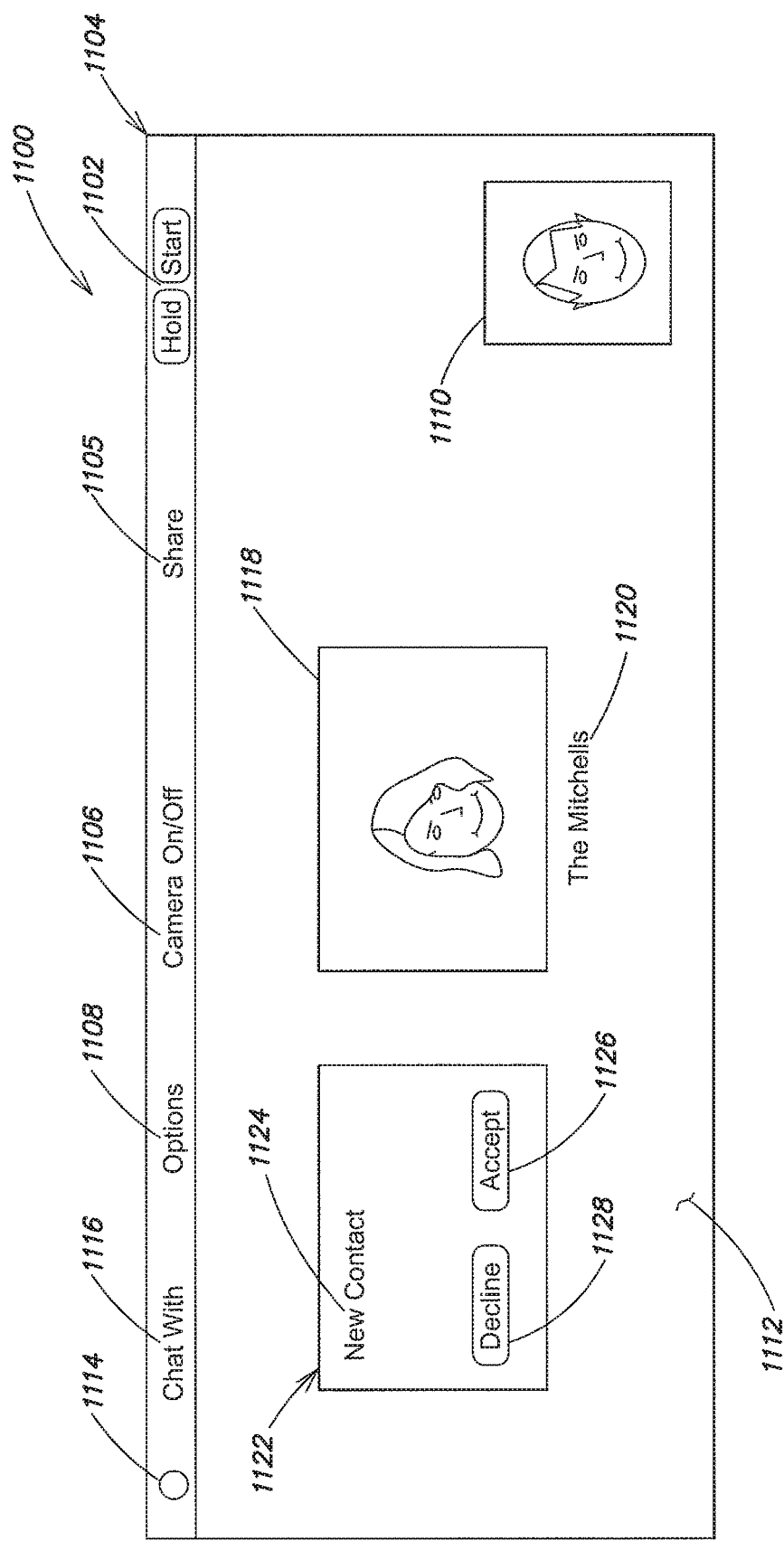
FIG. 11 illustrates an example view of web-based content rendered on a computer system, according to aspects of the invention.

In one example, an incoming chat request can be handled by the video daemon process 606, which identifies and communicates the incoming request to the shell 600. The shell 600 can trigger content and/or context appropriate notifications to the user in whatever display is currently being rendered. For example, the user may be interacting with content displayed in a web card or a channel card and viewing the content associated with either (as rendered by the xserver from content from delivered from browser 604 any flash from plug-in 610 plus any controls from shell 600). While a user can view and interact with content displayed in any of a plurality of views (e.g. FIG. 9—Channel View, FIG. 10—Card View) and any of a plurality of card types, a user can select a particular card and interact with a zoomed in expression of the selected card, which represents a full page view of the associated content. (E.g. FIG. 11—Video Chat Card Full Page View and FIG. 12—Channel Page Full View).

Card displays can be generated from browser processes and flash plug-ins/flash engines to render content in a user interface of a web optimized device. Additionally, some cards and their respective displays can be generated by the shell process without need of the browser engine. In one example, a video chat card is displayed from raw content captured by a video chat daemon 606 communicated to shell 600 and delivered from the shell 600 to xserver 603 for rendering in the user interface. Other cards can be configured to display based solely on the operation of shell 600 and xserver 603. In other embodiments, additional content can be incorporated from a browser engine 604 and any flash plug-ins 610. Alternative embodiments can include the use of a separate flash engine 608, which can be configured to execute its own browser process.

In some examples, cards are configured to execute their own instance of a browser engine which communicates through the top level process communication channel to the xserver and the shell provides and commands to the xserver regarding placement and function of controls displayed in user interface. The shell can manage and respond to controls presented in any card. The controls displayed in the user interface are configured to trigger a response in the shell to perform the requested operation. For example, browser buttons, search windows and other functions can be displayed in a header of a card, and their selection is communicated to the shell which manages the execution of the requested function. Back, Forward, Search, are some examples of displayed functions in a header portions of a card.

For example, shown in FIG. 11 is a full page view of the content associated with a video chat card. Full page view 1100 includes content controls 1102 displayed in a header 1104 of the full page view 1100. Content controls 1102 can include for example a hold control and a start control, each configured to trigger an operation in a display management module (e.g. shell 500) for executing functionality associated with a video session. In response to user selection of the start control at 1102, a video session will be executed by the computer device. The hold control can be displayed but "grayed out" until a video session is active. Once active, a user can place a video session on hold by selecting the hold control at 1102. Other controls can be presented to a user in the full page display 1100. For example, a share control 1105 can be displayed in the header 1104, which permits a user to share the video chat card with another user of a computer device (e.g. portable computer 100 and/or web optimized device 300). The shared card can be configured with the settings for permitting another user to initiate a video session with the contact specified in the video chat card. At 1106, a user can turn their camera on or off as desired. Display 1110 in the body 1112 of the view, provides a thumbnail display of the content being captured by the user's camera. Toggling the camera on and off at 1106, will affect the display 1110, by blacking out the display for a camera turned off, and generating thumbnail display 1110 when on. Navigation icon 1114 permits a user to navigate to other content views in response to selection. In one example, selection of 1114 triggers navigation to a card view (e.g., 1000, FIG. 10). A title 1116 is shown in the header 1104 for the current full page view 1100.

Within the body 1112 of the full page view 1100, shown is a still image 1118 of a contact requesting a video session. The body 1112 includes a display for the contact's name at 1120. The full page view can be configured to display a notification message at 1122 reflecting the request for the video chat session. Notification message 1122 can be configured to identify the requestor as a new contact at 1124. Further, notification message 1122 can include content controls configured to permit the user to accept 1126 or decline 1128 the request video session.

Figure 12:
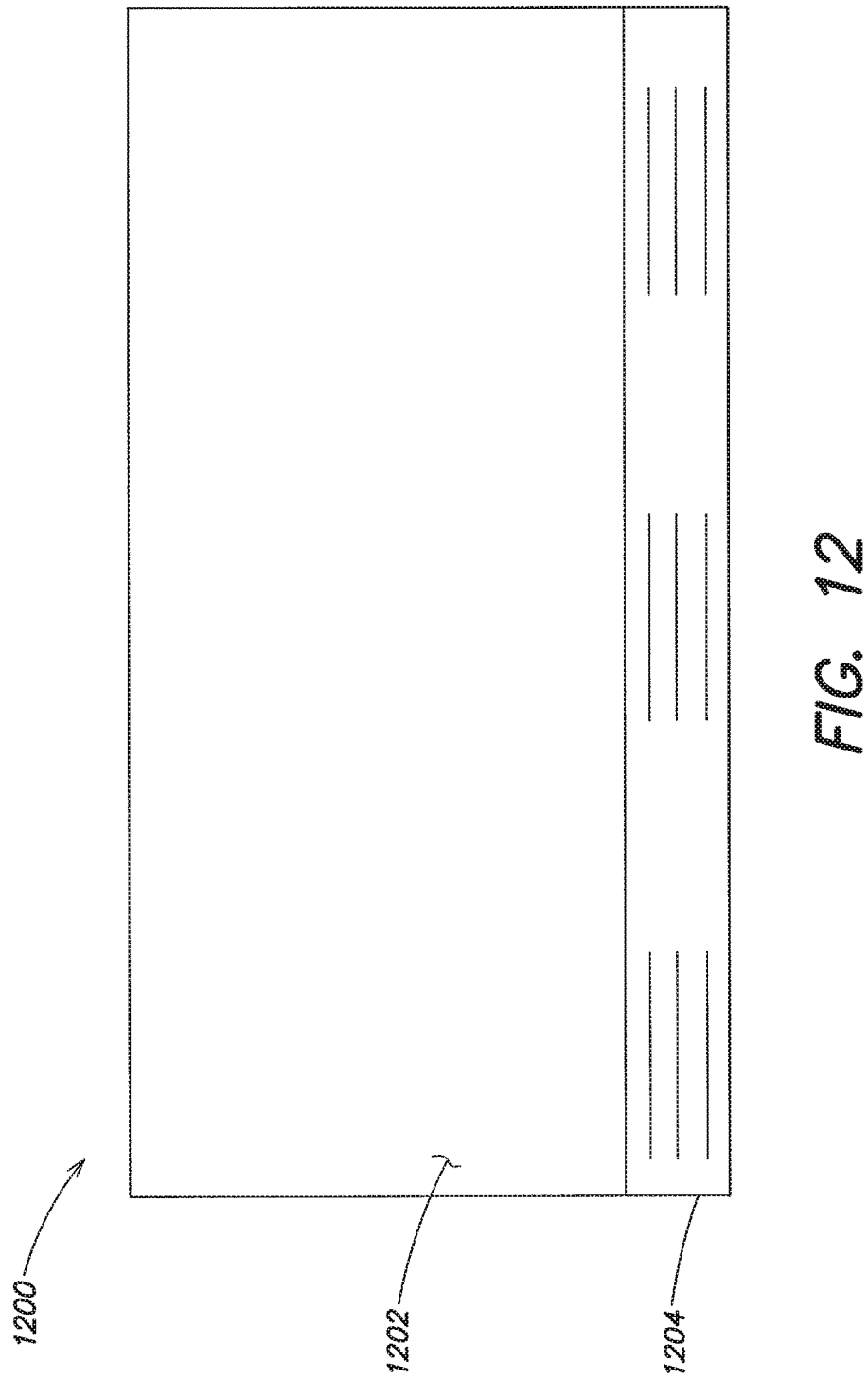
FIG. 12 illustrates an example view of web-based content rendered on a computer system, according to aspects of the invention.

Shown in FIG. 12 is a full page view 1200 of a channel card. Channel content is displayed at 1202 reflective of web-based content associated with the channel card. The full page view can be configured to include content menu 1204, configured to permit user selection from a plurality of content associated with the channel card. In one example, a channel card can be associated with news feed content, and content from an individual article or story can be displayed at 1202. Content menu 1204 can be configured to permit selection of additional articles or stories by selection within content menu 1204.

Figure 9:
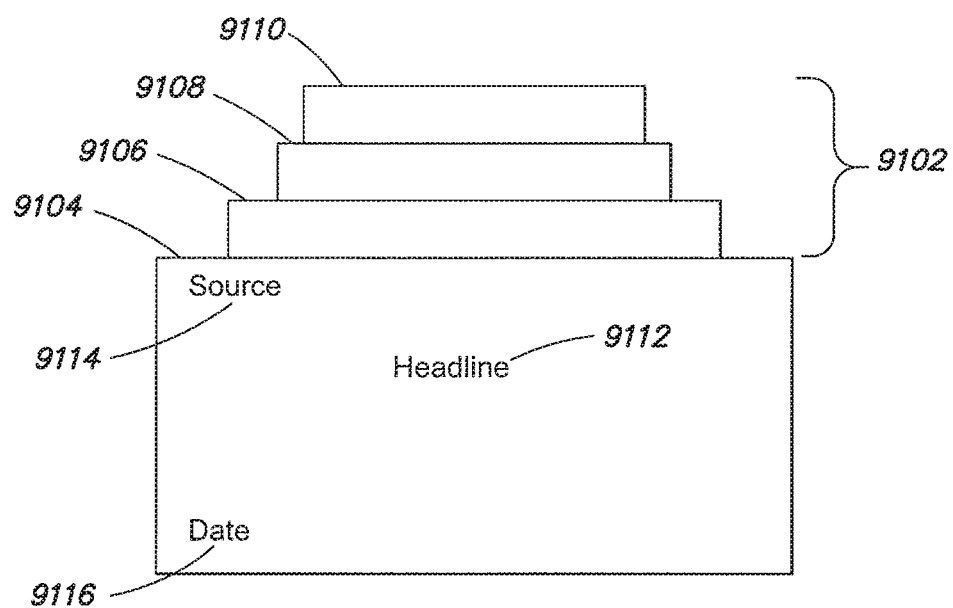
FIG. 9 illustrates an example view of web-based content rendered on a computer system, according to aspects of the invention.

According to some embodiments, cards (e.g., channel, web, chat, system, etc.) can be organized into a plurality of views. The views can be configured to organize the cards displays to insure accessibility. Further, the views can be organized to insure a user is not overwhelmed with options for selection. FIG. 9 illustrates a channel view presented within the user interface of the web optimized device. Shown at 9104-9110 are multiple channel cards, displayed as overlapping channels in a selector view 9102. In one embodiment, the content of the first displayed channel is readily perceived in the user interface, with content from other channels being mostly obscured. For example, channel card 9104 can be configured to display news information at 9112 (e.g., a headline from a news story) obtained from an rss new feed provided by a rss feed source displayed at 9114. The display at 9112 can be configured to present headline material within the display additional information from a particular story can be displayed. In some embodiments, summary information is display directly under the headline material. In some examples, other information can be included, for example, the date of the story at 9116. Channel cards can be configured to display content dynamically from a particular source. In one example, the source associated with a channel card can be the well-known NEW YORK TIMES. The channel card can be configured to rotate through displays of news stories provided, and further can be tailored to reflect information provided through and rss feed. Channel Cards 9104-9110 can each be associated with a different source, and in response to activation of a channel selector, the displayed channel cards can change position responsive to a direction of activation of the channel selector. A forward rotation of the channel selector (e.g., embedded scroll wheel 132) results in channel 9106 advancing to the forward position of the display with page 9104 being displayed at the back end of the available channel cards. A reverse rotation of the channel selector results in channel 9104 returning to the forward position, and returned the device to the display shown in FIG. 9.

FIG. 9 illustrates one content view in which headers are not visualized. Header visualized views can also be incorporated. Illustrated are four channel cards, however, in other embodiments, the number of channel cards may only be limited by the number of channel cards installed on a given device. In some settings, the number of displayed cards is limited, and card that are not currently shown in the display, will be shown in the selector view upon operation of a channel selector. Accordingly, channel cards can enter and exit the channel selector view in response to operation of a channel selector.

In one embodiment, if the user presses a menu button (e.g. 704 FIG. 7A) while looking at a particular item, a content menu for the channel to which that item belongs is displayed, as shown in FIG. 12. In one example, the content menu 1204 can be configured to be responsive to manipulation of the embedded scroll wheel 132 discussed above. Manipulation of the scroll wheel 132 progress through the displayed content menu 1204, and in response the system displays the selected content in the full view with preview text appearing below. Manipulation of the scroll wheel 132 can be configured to cause the system to scroll through the content for the current channel. In one embodiment, the content menu 1204 transitions between selections by rendering the apparent movement of the entire content menu either to the left of the right depending upon the orientation of the manipulation of the scroll wheel 132. Alternatively, the content menu 1204 is also responsive to arrow keys on the keyboard 106. Depressing an arrow key causes the system to display the apparent movement of the content menu 1204 to the next item. In one example, pressing and holding the menu button 704 may cause a content menu to be displayed, allowing the user to scroll through and select a particular album. The anatomy of other cards, and in particular a video chat card, is discussed in greater detail below, with respect to FIGS. 13A-B and 16 (video chat cards).

Notifications can be displayed in any view or accessed card to permit the user of the web optimized device to accept an incoming video call. In some settings, the context and/or content that is currently active will dictate what form the notification message takes and its placement within the user interface by a display manager. In some examples, a shell process performs the operations associated with the display manager. The display manager can be configured to maintain state information on the current display and configure notifications to the user as reflected by the current state. In one example, a limit can be enforced of only one video call at a time, and in response to receiving an incoming call during another chat session the notification can be configured to include information that accepting the incoming call will terminate the existing video chat session. Upon accepting a video chat request, the web optimized device can be configured to transition the current content view into a full page view of the particular video chat. In particular, the display manager can be configured to determine an appropriate action to take based on current context (including mode) and/or current content, and may invoke a transition between views of content displayed on the web optimized device. In another embodiment, the display manager can instantiate a video chat object in response to an incoming chat request, and the shell can determined a context and/or content specific display to render within or over a current display. Further, the display manager can be configured to dynamically integrate video chat content directly into currently viewed content.

Configuration of Chat Provider

In some examples, integration of video chat services into the operation of a web optimized device can be accomplished via the interaction of the shell, video chat daemons, and the browser processes that provide content for the user interface objects, i.e. cards, however, integration of video chat services for the web optimized device extends beyond integration into the shell. Integration of video chat services is further configured to provide for improvement in the user's experience by simplifying the process of configuring and registering for video chat services. Further simplifying the process of establishing video chat services improves adoption of the technology. In some embodiments, the web optimized device is constructed and arranged without conventional mass media storage. In some other embodiments, the local memory provided via Flash and RAM is used primarily to cache information, and thus, according to those embodiments, the web optimized device is required to integrate cloud based services to provide functionality that could otherwise be installed as a standalone application in a conventional setting (i.e. a computer system having hard drives).

Figure 8:
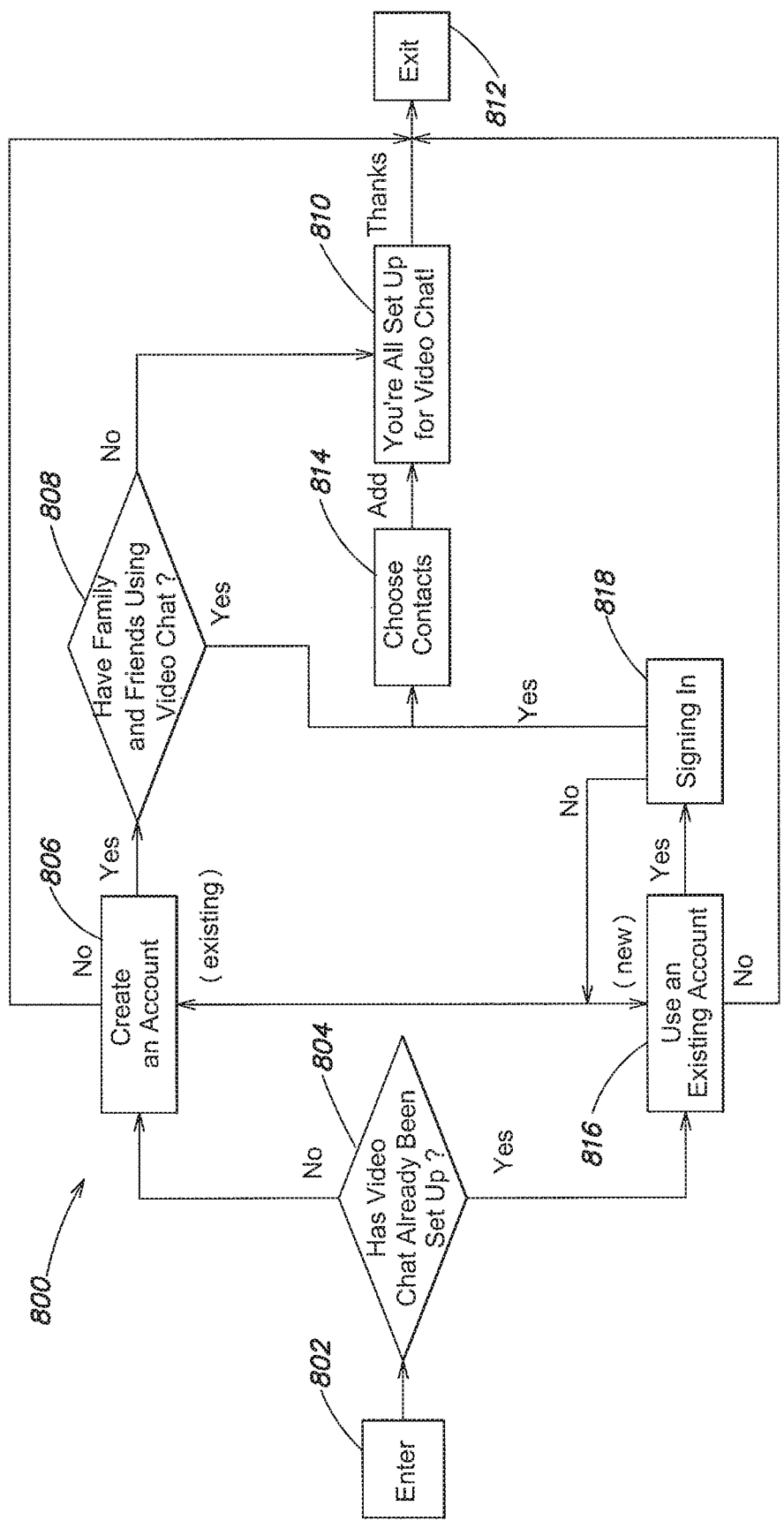
FIG. 8 illustrates an example process for registering a web optimized device for video chat services, according to aspects of the invention.

The web optimized device can be configured to trigger a process for registering and/or activating a video chat account. Illustrated in FIG. 8 is an example process flow 800 for registering a web optimized device for video chat services. Process 800 beings at 802, for example, in response to a first boot of the web optimized device. Additionally, the web optimized device can be configured to initiate process 800 in response to the web optimized device recognizing an attempt to access a video chat feature that has no corresponding video chat service. Other state information associated with the device can prompt a request that the user configure video chat services, including for example, generating a request in response to a certain period of uptime having past without video chat configuration, or in response to failed request for video chat sessions from other users. Various events can be configured to initiate a process for configuring video chat services.

A user interface is displayed on the web optimized device. The interface can be configured to prompt the user to enter information for an existing video chat provider, if they already have an account set up 804(YES). If the user does not have an account with a video chat service provider 804(NO), the web optimized device can be configured to generate an account for the user at 806. At 806, the device can be configured to automatically register the user with a video chat service provider depending on user selection. At 806, the system can register the user with a default video chat service provider. In one alternative, the user can select from a list of video service providers, and in another, enter a video service provider of their own choosing. Further, the user may elect not to register for a video service provider 806(NO) exiting the configuration process 800 at 812. Various third party providers are available for integration with a web optimized device. In one example, the user interface displayed to the user on configuration can display a selection from a number of known providers, and in addition can provide for entry of new service provider information, e.g., at 806. A new account is then created which can be based on user selection. In one alternative example, a default account can be created at 806. Entry of service provider information can include designation of a particular web site associated with the service provider. In another example, information provided during purchase of a web optimized device can be used to automatically register the user for a third party video service provider. In another example, the entry of a web site triggers the user interface to access the web site and display it the user to complete registration.

In one embodiment, a preferred video chat service provider has been established for the web optimized device. For example, a video integration module can be configured to communicate with the well known SKYPE service as the default video service provider to establish a user account at 806. Use of the default service provider has additional advantages in the simplicity of set-up, as the device itself can generation an account name, leaving the user the task of creating a password. At 806 the user enters a password, completing the initial account setup. Once the initial account is configured, additional processing is available and the web optimized device can request information on contacts the user may know as part of account. Process 800 can continue at 806(YES) if the user has additional information to enter as part of the setup and/or creation of a video service account. In some examples, a user can still elect to use an existing account from a user interface display. In some examples, process 800 can proceed from 806 through 806 (existing) to 816 if the user elects to enter an existing account in the interface displayed at 806. In another example, process 800 continues through 806(YES) where the user wishes to enter additional information, including for example, contacts and/or friends and family. In one example, a web optimized device user can have friends and family users identified as part of their user profile associated with the user and/or device. The identified friends and family are treated as if trusted from the perspective of the web optimized device. For example, video chat requests from contacts on the friends and family list can be automatically accepted. At 806 the user is given the option of creating an account later, and if the user does not wish to create an account 806 (NO), the process can terminate at 812.

In some embodiments, the process 800 will be executed again later if no account has been configured. In other embodiments, process 800 can sleep for a period of time and re-execute upon the expiration of the time, or in another example, if triggered by access to video service functions. Additionally, if the user has no friends or family 808(NO), or wishes to identify contacts at a later time, the user interface displays a message indicating the user is set up for video chat at 810 and process 800 concludes at 812.

At 808 the user is presented with a user interface for entering additional information about their video service account. In some examples, the user is given the option of selecting from contacts captured from the user's profile. In one example, the user has friends and family identified in the user's user profile, that information can be captured and displayed in the user interface at 808. Each of the identified friends and family can be displayed with an option for selection. Process 800 can proceed from 806 with the user selecting friends and family 808(YES) to 814 where the user is given options to select contacts in additional to any friends and family. For example, the user may search at 814 for additional contacts at the registered service provider. In other examples, the user may be presented an interface asking if the user wishes to identify friends and family contacts at 808. If the user indicates in the user interface that the user wished to set up and/or there are friends and family using video chat 808 (YES) the user is presented with a display for selecting contacts at 814. Once the user identifies the contacts s/he wishes to add (814), the user interface displays a message indicating the user is set up for video chat at 810 and process 800 concludes at 812.

Returning to 804(YES) for the users who already have a video shat service provider a user interface can prompt the user to enter information on the existing account at 816. If the user wishes to configure the system at a later time, the user can leave the configuration 816(NO), and process 800 concludes at 812. In one example, process 800 will resume upon a later event. At 816(YES) the user provides existing account information for their video service provider and the device will login to the account at 818. In some embodiments, the device can retrieve chat contacts from existing accounts. In one example, 818 signing in can optionally include additional further steps. For example, 818(YES) can be followed by step 814 to allow a user to choose contacts from existing account, and/or to add contacts to an already existing video service account. In one embodiment, process 800 can execute steps 814, 810, and 812 after successfully signing in at 816(YES). In one example, existing contacts can be displayed in conjunction with the option to choose additional contacts at 814 from 818 (YES). In response to a selection by the user that they are finished with contact setup the user interface displays a message indicating the user is set up for video chat at 810 and process 800 concludes at 812.

If the account information provided by the user results in failure to access an account 818(NO), process 800 can include additional attempts to login at 818, before returning to 816 to ask the user to re-verify and/or re-enter the existing account information. Further, the user can be presented options at 816 to create a new account causing process 800 to proceed from 816 (new) to step 806 for registration and/or creation of a new video service account. Process 800 can be configured to proceed through 816 (new) if multiple failures to signing occur as 818(NO) based user supplied information.

Video Chat Providers

Once a video chat provider has been established, the device can be configured to integrate video chat functionality into various aspects of the user interface. To facilitate the user's interaction with video chat functionality, the web optimized device is further configured to minimize any interactions required with the video service provider to enable video chat. In particular, the web optimized device minimizes the maintenance and configuration tasks associated with typical video service providers.

Third party video service provider typically require authentication in order to access video chat services. The web optimized device can be configured to minimize any requirements associated with authentication with the video service provider. In particular, once an account is established the web optimized device can be configured to maintain a connection with the video chat provider. Some video chat providers require re-authentication in order to maintain a connection. The device can be configured to employ authentication tokens generated for and/or provided by the video service provider to maintain the connection. Upon expiration of such a token, the user of the device can be required to re-enter login information. In some embodiments, passwords can be maintained as part of a device profile, and the device can be configured to automatically re-enter login information to maintain a current video chat session with the service provider.

Contact List

Some video chat service providers employ contact lists to initiate/receive video chat calls. The web optimized device is further configured to minimize the need to manage such a contact list. In particular, the web optimized device creates and manages video chat cards, which are configured to be a one-click visual representation of a video chat contact on such a contact list. Thus, a user can maintain video chat cards for frequently called contacts. The chat cards are configured to be readily accessible in a plurality of views by a single click on the video chat card without needing to access the contact list directly.

Figure 14:
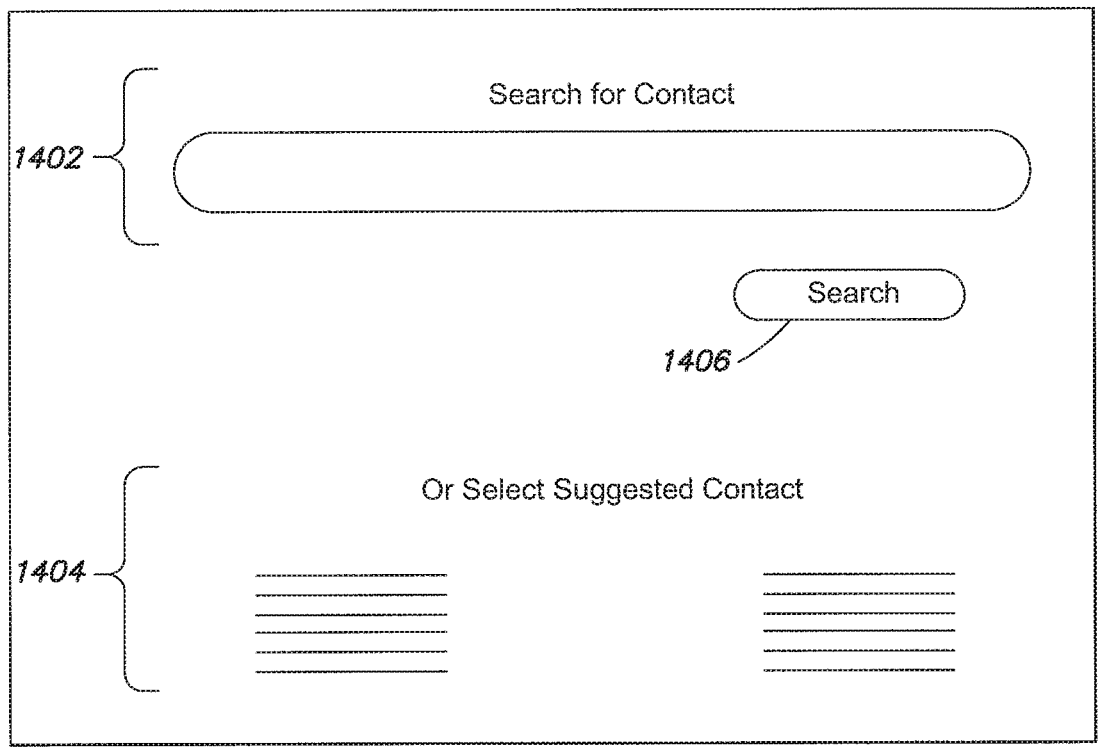
FIG. 14 illustrates an example user interface display for creating a video card to connect to a video contact, according to aspects of the invention.

The contact list for the video service provider is still accessible through the user interface of the web optimized device. In particular, the user can access the contact list during creation of new chat cards. In response to a user selection to create a new card, the user interface displays the current contact list. In one example, the contact list is displayed in the form of a suggested contact list compiled from a number of sources. The suggested contact list can include contacts already on the contact list with no associated chat card, and can also include contacts lists in a user maintained friend and family list. In one example, all contact with which the user and/or the device have engaged in a chat session can be listed (excluding block contacts in some examples). FIG. 14, illustrates an example user interface displayed in response to user selection of a control configured to create a new chat card. At 1402 a user can search for a contact who is also subscribed to the video service provider. Once the user enters information associated with the contact at 1402, the user can select search at 1406 to execute the search of the video chat provider's registered users.

Alternatively, the suggested contact list shown at 1404 includes all of the user current contacts which can be selected to create a new chat card. In some embodiments, the suggested contact list can include the other participants in any video chat in which the user participated, and any users listed in the user maintained family and friends lists. The suggested contact list can be filtered to remove any participants for which a chat card already exists.

Once the user selects a contact either from the suggested contacts at 1404 or a contact returned from an executed search, a new video chat card is generated for that contact. According to one embodiment, the creation of a new video chat card can be animated within the card view. Shown in FIG. 10, is an example user interface that provides visual access to content on the device. In some embodiments, the content that is available can be access through visual displays rendered within content views. In one example, web cards 1002, 1008 and 1010 for accessing traditional web-based content can be displayed with channel cards 1004 and 1012 for accessing channel based content and video chat cards 1006-1008 for accessing video service features to provide easy access to any desired content, and in particular video chat features. New video chat card 1016 is shown during a portion of the animation associated with new card creation. A new card is displayed as sliding out from behind 1014, to take its place in within the display of the other content cards 1002-1012. Card 1014 is a system display card, which in some examples allows a user to create a new unassigned card by selecting 1014. The new card type can be unassigned until the content it is associated with is identified.

Simplifying the management of the contacts lists for the video chat services providers can require additional activities on the part of the user to actually remove contacts from the contact list. Typically, deletion of a video chat card eliminates the card, but does not affect the contact list for the service provider. This features permits improved interaction with video service providers that operate with contact lists reflective of users who have accepted requests to participate in video chat sessions. Although, in one embodiment, if a particular contact has been blocked in the contact list, deletion of the video chat card associated with that contact will trigger the system to delete the contact from the contact list.

Messaging

Figure 17:
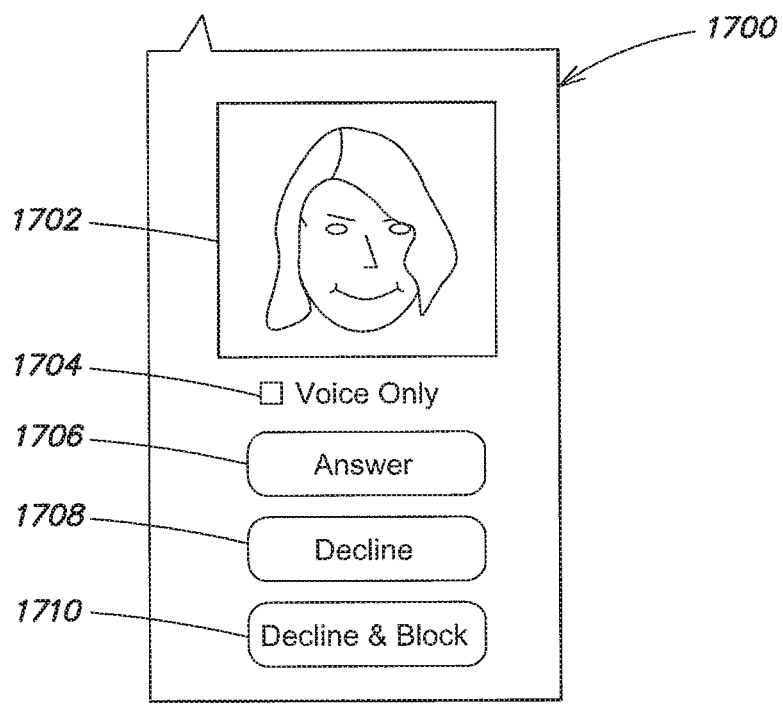
FIG. 17 illustrates an example message window for an incoming video session, according to aspects of the invention.
Figure 24:
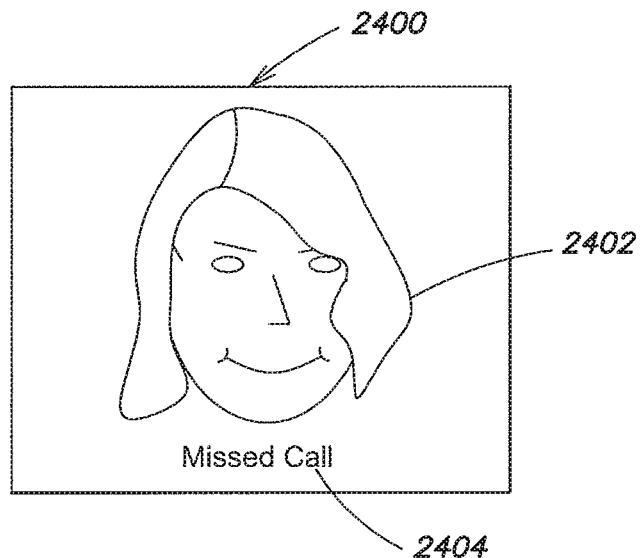
FIG. 24 illustrates an example view of a full page notification for a missed video session, according to aspects of the invention.
Figure 25:
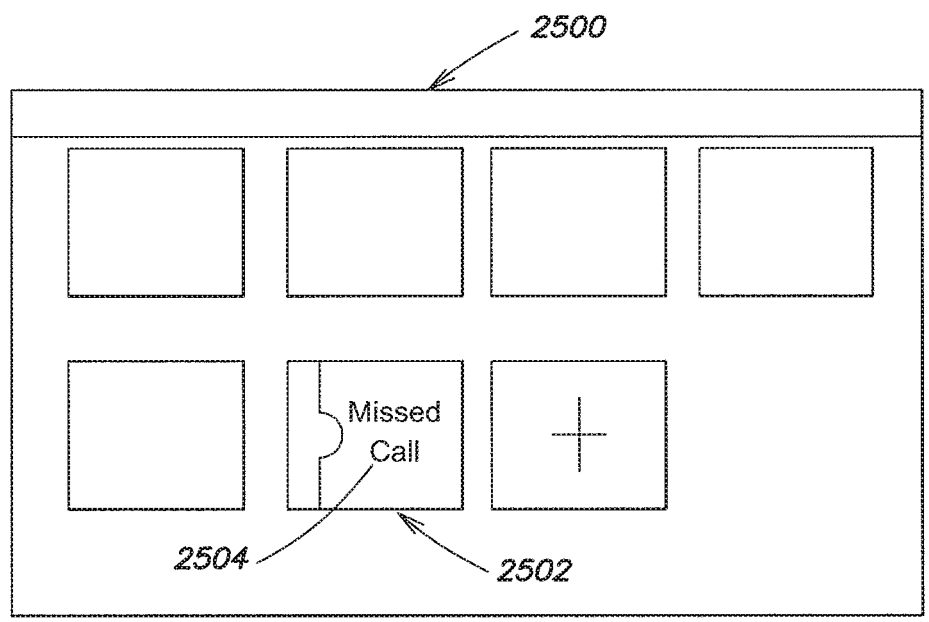
FIG. 25 illustrates an example view of a missed video session notification displayed in an example card view, according to aspects of the invention.

According to another embodiment, when a new video chat request is delivered to the web optimized device a message window is displayed asking the user to determined if they will accept the request. In some embodiments, the system can be configured to automatically add the incoming contact to the users contact list. For example, in situations where the contact appears in the user's friends and family list, the contact is viewed as trusted and is added to the user's contact list automatically. Where the contact is new or unknown, user input can be required to determine appropriate action. Shown for example in FIG. 17, is a message window that can be displayed in response to a chat request, discussed in greater detail below. If the user is unwilling or unavailable to respond when the message is delivered, the web optimized device can be configured to create a new chat card that presents the chat request to the user at a later time. Shown for example in FIG. 25, is a new chat card displayed in the card view 2500. The new chat card can be configured to display a missed call message at 2504. The missed call message can include additional information. For example, the missed call message can indicate the time of the call, a number of missed calls among other options. Selection of the chat card 2502, permits the user to respond to the chat request and determine whether to accept, decline, and in the case of new contacts decline and block the contact. Accepting the request when the contact is unavailable causes the system to add the contact to any contact list and leave the new chat card in the card view for later access. FIG. 24 illustrates an example of a full channel view 2400 of a video chat card including a missed call display. The missed call display includes an image 2402 of the contact, if available, and a display message 2404 indicating a call has been missed.

Video Chat Card and Views

The display of a created video chat card is dependent upon the view in which it is rendered. For example, shown FIG. 10 is a home/card view 1000. View 1000 includes header 1070 and navigation icon 1072 (upon selection navigation icon 1072 returns a user to the last content view accessed by the computer system). While in the card view, 1000, moving a pointing device 1020 over the video chat card 1006, causes the card to appear in a focused view. The focus view is an enlargement of the unfocused view, show for example in FIG. 13A (unfocused) and FIG. 13B (focused view). In addition to the increase in the size of the display, the focused view causes the visualization of controls associated with the video chat card. Displayed at 1306 is the header of the video chat card. Within the header portion of the card in focused view, FIG. 13B, at 1302 is a control configured to permit the user to delete the video chat card. At 1304 the user is also provided with the option of sharing the chat card. An example pointing device for the user interface is shown at 1307. The processes associated with sharing cards are described in U.S. patent application Ser. No. 12/416,479, filed on Apr. 1, 2009 and entitled "SYSTEM AND METHOD FOR STREAMLINING USER INTERACTION WITH ELECTRONIC CONTENT."

Figure 13A:
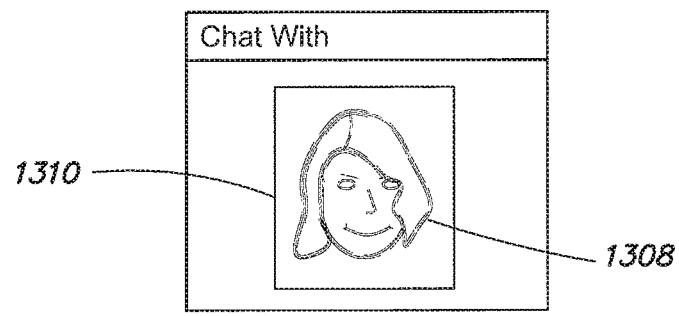
FIGS. 13A-B illustrates an example view of web-based content rendered on a computer system, according to aspects of the invention.
Figure 13B:
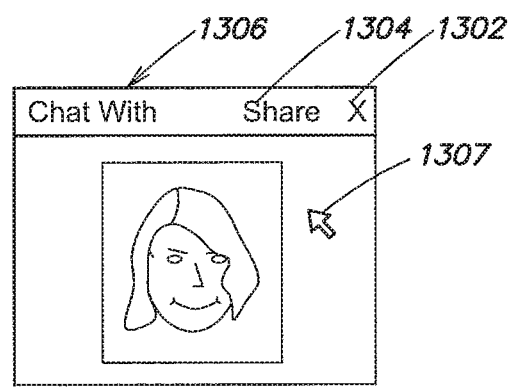
Figure 15:
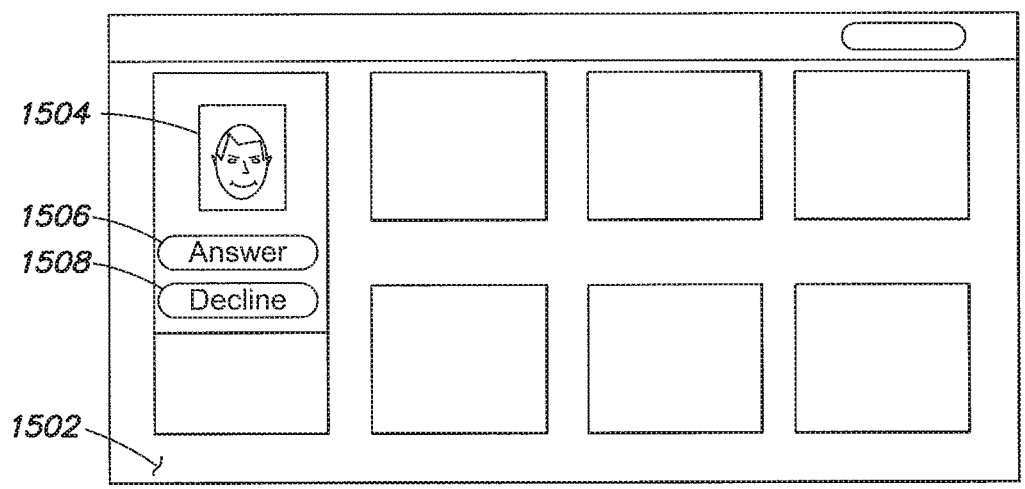
FIG. 15 illustrates a block diagram of an example video session notification message, according to aspects of the invention.

The video chat card can be configured to display a visual indication of an incoming call. Shown in FIG. 13A is a border 1310 around a video chat display image 1308 that can be configured to pulse in response to an incoming chat request. In some embodiments, the user may be prompted to accept or decline a call in order to participate in the video chat session. In one example, a user may click on the video chat card, which triggers a transition to a full page view of the chat request. In one embodiment, a message window is displayed over the card view, as shown by example, in FIG. 15. Message window 1502, includes an image of the video chat requestor at 1504 where an image for the requestor exists, otherwise a generic image is provided at 1504. At 1506, the user can indicate acceptance of the incoming call, or the user may decline the chat request at 1508.

If the user accepts the request, a new chat card can be created for contacts that are not already represented by a chat card. In some embodiments, accepted contacts who are not listed on the user's contact list can be added automatically in response to user acceptance of the requested chat session. According to one embodiment, the user interface can be configured to transition to a full page view of the video chat session in response to the user's acceptance of the chat request.

Figure 16:
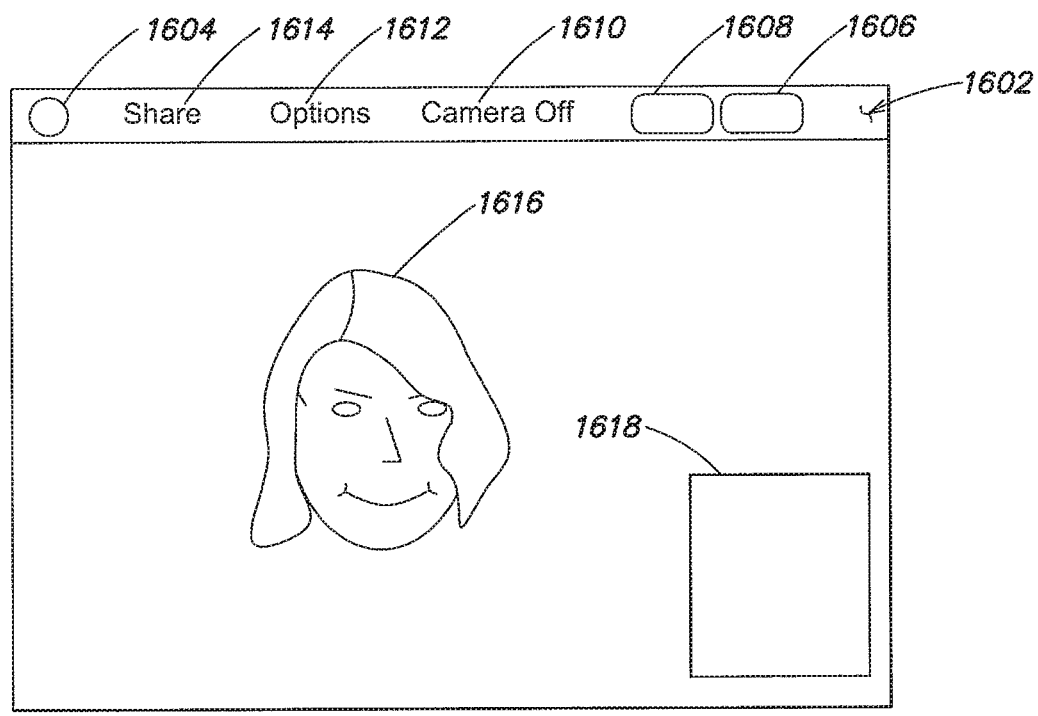
FIG. 16 illustrates an example full page view of a video session user interface rendered on a computer system, according to aspects of the invention.

Shown in FIG. 16, is an example full view of a video chat in progress. The full view includes header 1602. Within the header are display a first call action button 1606. The first call action button displays differently based on the state of the video chat session. If a chat session has not been started 1606 indicates "Start Call" and selection of the first action button will initiate a call to the contact. If a chat session is in progress, the first action button can read "Hang Up" and selection terminates the video chat. In one embodiment, the second action button 1608 indicates "Hold Call" if a video chat session is active or not, if however the session is not active, the second action button appears grayed-out and cannot be selected. If the user places the video chat on hold, the second action button can be configured to read "Resume Call" and selection will re-establish the video chat.

Other options can be presented to the user in the full view interface. At 1610, the user can turn on/off her camera depending on its current state. At 1612 the user can select options to access additional features associated with the video chat card. In particular, selection of the options control gives the user the ability to block the contact. At 1614, a user can share a video chat card with another user of a web optimized device. Sharing of the card passes along the configuration information for the card, permitting the new user to easily place and receive video chat requests from the first user's contact. At 1604, a navigation button is displayed in the header 1602. Selection of the navigation button transitions the user interface to the card view. Shown at 1616 is the video content rendered by the contact's video device. At 1618, the user sees a reduced size view of the content their camera is transmitting. In the event that the user selects 1610 to turn off their camera, 1618 can display an indicator that no image is available.

In some embodiments, the web optimized device can be configured to further enhance a user's video chat session. For example, a display manager can perform smart zoom operations on the content displayed in the user interface. The display manager can be configured to auto-crop the displayed video content to in effect zoom into the display of the video content. In some embodiments, the display manage can be configured to determine from the video content what areas of the video feed should be zoomed. In one embodiment, the display manager can be configured to identify specific objects within displayed video content. In one example, the display manager can be configured to identify a person displayed in the video feed, and in other examples the display manager can be configured to identify the person's head. The display manager can be configured to automatically zoom into the identified portions of the video feed. The zoomed in display can be configured to permit improved interaction between a user and the video content. Further, the zoomed in displays can assist in interactions with computer content from greater distances than the conventional distance employed in laptop and user interaction.

In other embodiments, a display manager can be configured to perform auto-zoom operations on other content accessed through a web optimized device. For example, web-based content accessed through the cloud can be cropped for a zoomed in display which focuses on identified portions within the content.

In some embodiments, a web optimized device can be further configured to integrate video chat into any content and/or activity performed on the web optimized device. A display manager can be configured to analyze active content being viewed on the device, and further configured to present additional content and/or other media sources within the active content based on the active content. For example, a user viewing web-based content can be delivered video sources associated with the web based content.

The web optimized device can track content accessed on the web optimized device building a user profile for a user and/or the web optimized device. Each view of content, each configuration of a channel, including any channel created or deleted can be a source of information to be used in delivering user and or device customized content. Further, the information delivered by the accessed channels and/or the content viewed can also be incorporated into the user and/or device profile, allowing for richer aggregation of information on the device, the users of the device, and even the content that has been delivered to the web optimized device.

Shown in FIG. 17 is another example message window 1700 that can be presented in the different views of content provided by the user interface. At 1702 an image of the requestor is shown where available, otherwise a generic user image is displayed at 1702. A user is given the option of answering a video chat request with voice only by selecting box 1704. If box 1704 is not checked a full video chat session will be displayed upon selection of 1706. At 1708, the user is provided with the option of declining the video chat request. At 1710, an optional display is presented for new chat requests for which there is no contact on the contact list. If the web optimized device is in passive mode, the notification message for an incoming call can be displayed differently.

Figure 18:
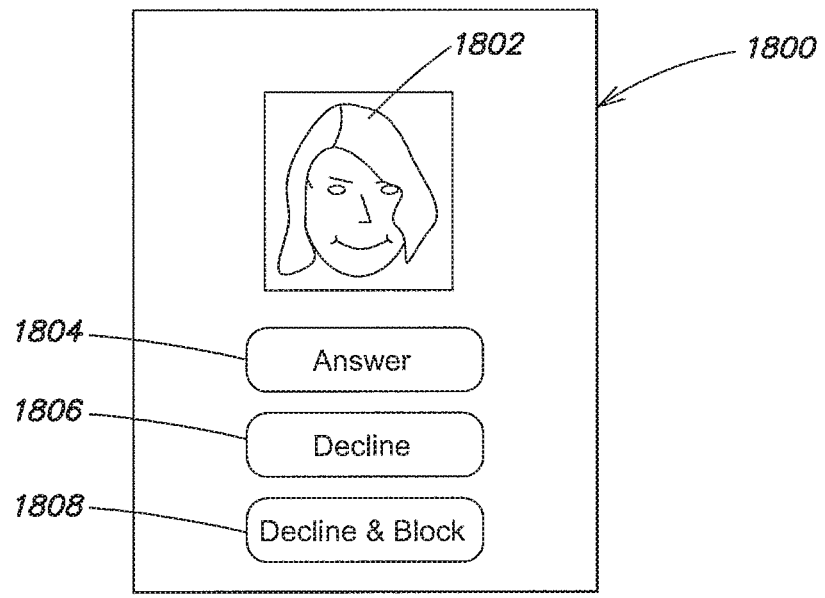
FIG. 18 illustrates an example full screen notification display, according to aspects of the invention.
Figure 19:
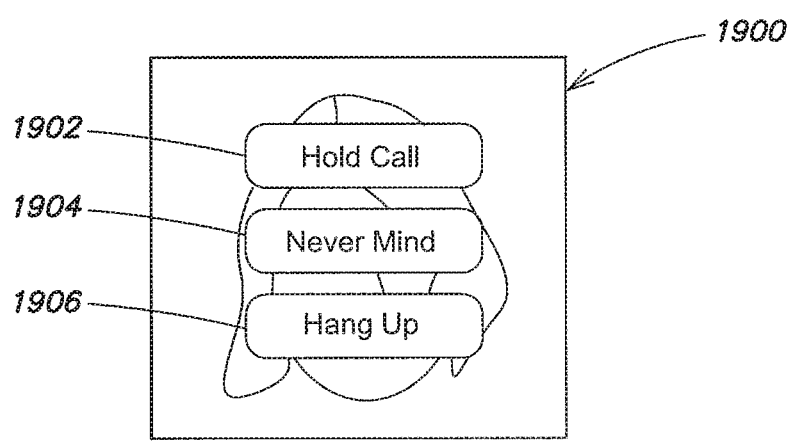
FIG. 19 illustrates an example display of a video chat session viewed in an easel mode of operation, according to aspects of the invention.

In particular, the passive mode notification is designed to attract attention of a user who could be far away from the device. Shown in FIG. 18, is an example notification display 1800, which occupies the full screen of the web optimized device, and is typically displayed in bright color. In addition to the display, audio notifications can be employed. In one example, audio based alerts can be provided in response to chat requests instead of or in addition to visual displays. At 1802 an image of the chat requestor is displayed if available, otherwise a generic image for the requestor is displayed. At 1804 the user can accept the incoming chat request or decline the request at 1806. 1808 illustrates an optional action, decline an block. Typically, the decline and block option is only presented if the user has not chatted with the requestor before. FIG. 19 illustrates an example display 1900 of a video chat session viewed in easel mode. While in easel mode no header is displayed, instead the user selects the menu button, (FIG. 7A, 704) on the side of the device to display a contextual menu. Upon selection of the menu button, a contextual menu is displayed over the current video chat session, permitting the user to select 1902, hold call—to place the current video chat session on hold, 1904, never mind—to return to the video chat session, and 1906, hang up—to end the chat.

Video chat card displays can be further configured to reflect a state associated with the contact they represent. In particular, video chat cards can be configured to reflect the connection status of the contact. On-line, off-line, unavailable, on hold, blocked, etc. are some of the states that can trigger different displays on the video chat card. In one example, a video chat card can be displayed as "grayed-out" to indicate that the contact is not available.

Navigation with Video Chat

Integration of video chat features into the web optimized device presents significant advantages to the end user in terms of user experience. Additionally, video chat integration can enable video based services to be integrated into a plurality of web-based applications with little overhead and no cumbersome programming while imposing little burden on the device itself. According to one embodiment, once a video chat session has been established the user can continue to browse web-based content, access web-based applications, and even participate in gaming applications with a video chat contact participating in the experience through the video chat session. Chat participants can watch a movie together and be permitted to observe each other's reaction to the movie as it is being viewed.

In one embodiment, video chat sessions are maintained during transition of the web optimized device between modes and/or between views of content. As the user navigates through the available views and accesses available content, a thumbnail view of the live video conference can be displayed in the headers of accessed displays. According to one aspect, a visual indication of an active chat session is rendered in any content display presented to the user. Navigation to successive content displays results in video chat object that follows the user through the displayed content. In some embodiments, the device can tailor each view of the video chat object for each of the content views displayed to the user. Further, the device can also specifically tailor the view of the video chat object based on the content within each of the content views.

In one example, a video integration module permits the web optimized device to integrate the video chat displays throughout the content displays accessed by the user. In one example, a shell process can be configured to composite content controls with content obtained from a browser engine and with video chat content passed to the shell process from a video chat daemon configured to handle communication with a third party video chat service provider. The shell can be configured to pass the composite to a rendering engine (e.g. an xserver) for rendering in the user interface. Alternatively the rendering engine can be configured to handle the compositing of video and web-based content with content controls displays in the user interface. The rendering engine can be configured to accept commands from the various components directly.

According to some embodiments, a video chat daemon can be configured to communicate directly with the shell, and any video chat content is first processed by the shell for rendering in the user interface.

According to one embodiment, the processes operating in conjunction function as a video integration module. However, in some embodiments, the integration can be performed by one or more of the processes operating and passing processed content to a rendering engine. The example logical block diagrams shown in FIGS. 5 and 6, illustrate elements (individually and in groups) that can also be employed as part of, or work in conjunction with, a video integration module for rendering integrated video chat displays in a user interface to be displayed to the user.

Figure 20A:
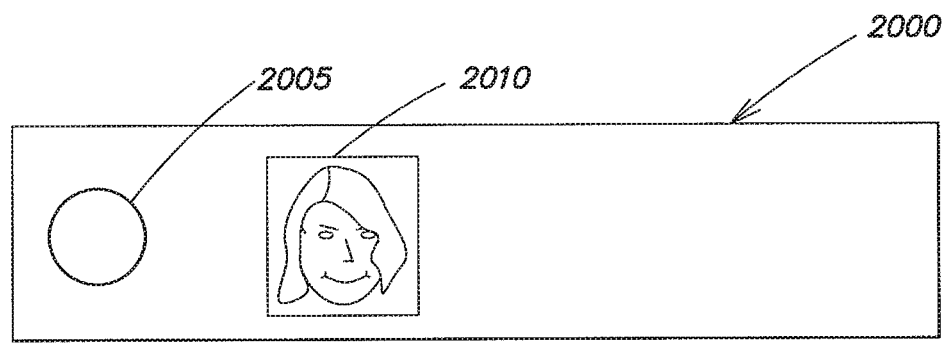
FIGS. 20A-C illustrate example header displays shown as headers in some content views, according to aspects of the invention.
Figure 20B:
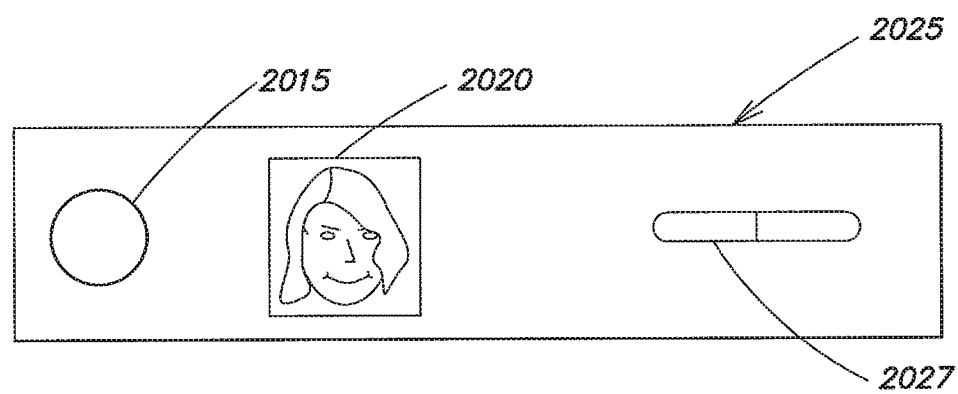
Figure 20C:
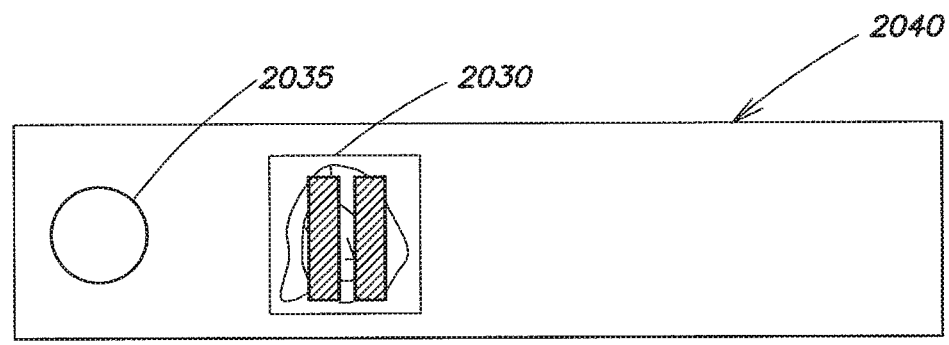

Shown in FIG. 20A, is an example header display that can form part of any content view that visualizes a header (e.g. card view 1000, full page view 1100, chat card view FIG. 13B, FIGS. 16, 23 and 25). Header 2000, includes navigation icon 2005 configured to transition the current view displayed on the device to the card view. At 2010 a thumbnail view of the video chat session is integrated into the current content display. Placement of the integrated video chat content in the header permits visualization of the active chat session without impinging on the content view that is displayed in the body of the view (not shown). FIG. 20B, illustrates another example header, user in conjunction with a digital media display (for example an album view—FIG. 4, 418). Header 2025 includes navigation icon 2015 and video chat display 2020, as well as additional controls at 2027 that are displayed as part of the digital media view. FIG. 20C illustrates an example view an integrated video chat content display. Header 2040 includes navigation icon 2035 and integrated video chat display 2030. Display 2030 can be configured to reflect the current state of the video chat session. In particular, the video chat daemon can communicate the state of the video chat session or a change in state causing the display of a different visualization of the video chat session based on the received state information. In the example shown, display 2030 illustrates a double bar over the video chat content display 2030 to reflect the state of the chat. The video chat session can be paused by either party, and the double bar display reflects that state. Other states for the video chat can be reflected in the display. Other states can include unavailable, disconnected, among others, and each state can include additional visualizations.

Figure 21:
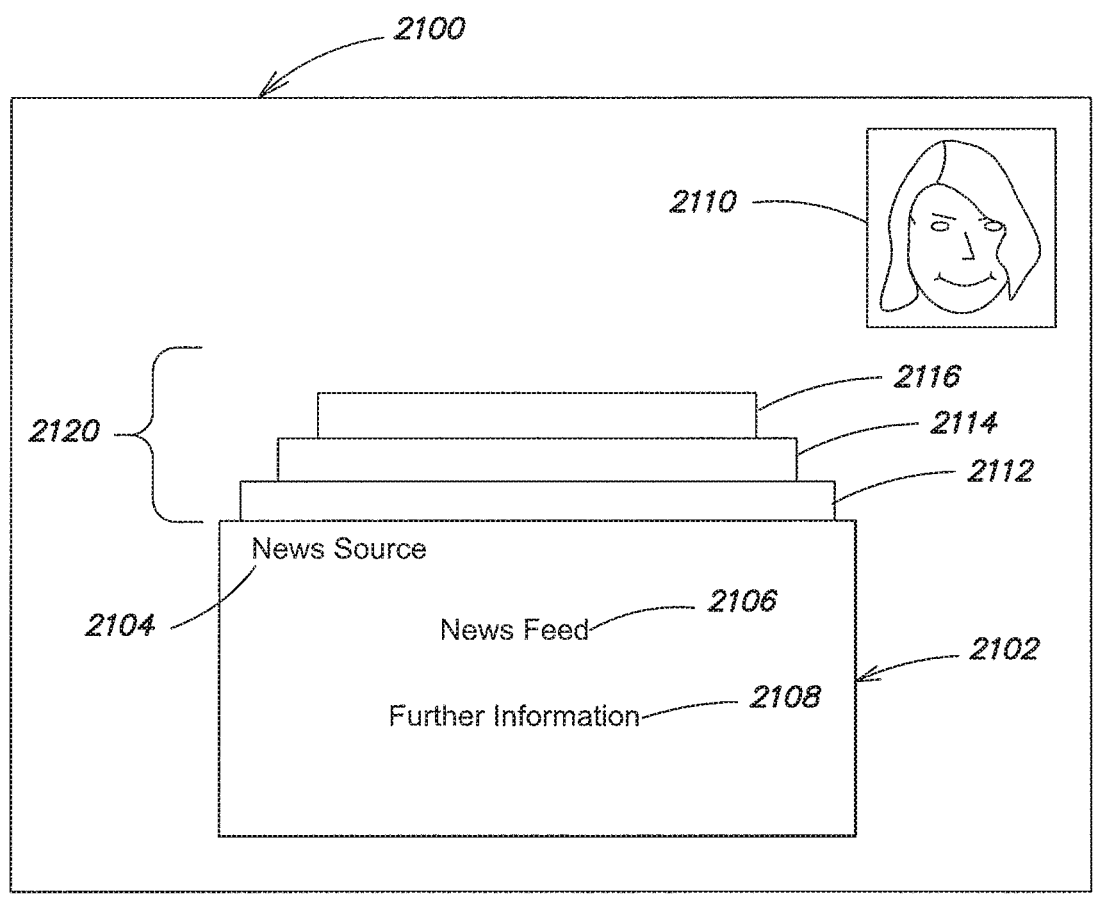
FIG. 21 illustrates an example channel view including an integrated video session display, according to aspects of the invention.
Figure 22:
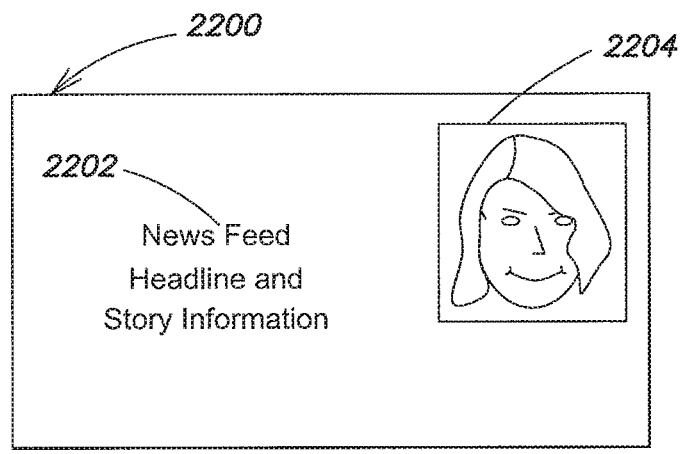
FIG. 22 illustrates an example full page channel view including an integrated video session display, according to aspects of the invention.

FIG. 21 illustrates a channel view presented within the user interface of the web optimized device. Video chat display 2110 is integrated into the current content view 2100. Shown at 2102, and 2112-2116 are multiple channel cards, displayed as overlapping channels in a selector view 2120. In one embodiment, the content of the first displayed channel is readily perceived in the user interface, with content from other channels being mostly obscured. For example, channel card 2102 can be configured to display news information at 2106 obtained from an rss new feed provided by a rss feed source displayed at 2104. The display at 2106 can be configured to present headline material and at 2108, additional information from a particular story, for example, can be displayed. FIG. 21 illustrates one content view in which headers are not visualized. The web optimized device and/or the video integration module can be configured to select an appropriate location within a content display to integrate video chat display 2110. In some examples, the position for a view can be predetermined, for example at the upper right corner of the display screen as shown in FIG. 21. Other predetermined positions can be employed, and can include the lower right corner of the display. According to one embodiment, the video integration module can be configured with a predetermined location for each content view, and a different position can be established for each of the views. FIG. 22 illustrates a full view 2200 of a channel card. Rss feed information is displayed at 2202 and the video chat display is integrated at 2204. Not shown in FIG. 22, the full channel view can include navigation options in the lower portion of the display to permit the user to navigate within rss items received from the same source (for example, content menu 1204, FIG. 12).

In some embodiments, the video integration module can be further configured to dynamically select a position within a content display in which to render the display of the video chat session, also referred to as a video chat object. Dynamic selection of position can include content based analysis to identify an appropriate position. For example, background identification techniques can be employed to identified portions of content that are not as relevant to the current view as foreground material. The video integration module can be configured to identify and place a video chat display based on background analysis. Further, user activity with respect to the displayed content can be analyzed to determine a position. For example, active user interaction with portions of the display can be identified and placement of a video chat display positioned away from actively accessed portions of the display. In another example, window focus in various positions of a display can also indicate active use, and video chat objects can be placed accordingly.

Figure 23:
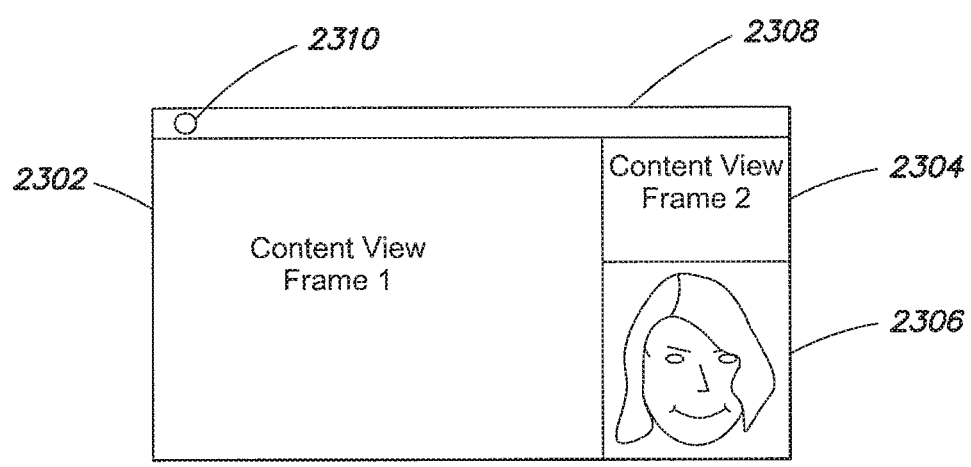
FIG. 23 illustrates an example view of web-based content including an integrated video session display, according to aspects of the invention.

In other embodiments, formatting information associating with content can be analyzed to determine position for a video chat object. Shown in FIG. 23 is an example view of web-based content. The web-based content shown includes formatting information, in this example frames for the displayed content 2302 frame 1 and 2304 frame 2. Based on the formatting information a video integration module can be configured to place video chat object 2306 in one frame. Alternatively, the video integration module can alter the framing to permit integration of 2306 in the display. In one example, video integration module adds an additional frame to display. In another example, the video integration module automatically selects a frame to integrate content. The frame can be selected based on having a portion of content that does not change and/or does not change often. The video integration module can be configured to automatically select areas of a display frame that would be least likely to include important content based on the present display.

In some embodiments, a header 2308 can be displayed in conjunction with frames 2302 and 2304. The header can be configured to operate as discussed herein (e.g., as discussed with respect to FIGS. 20A-C). In other embodiments, the header can include operation controls, for example a navigation icon, 2310 that permits selection of content views. In one example, the device is configured to return to the last content view upon selection of 2310. In others, 2310 can be configured to execute a transition to a default content view. In another example, 2310 is configured to execute a transition to a home view upon selection.

According to some embodiments, a video chat object can also be configured to dissolve upon a hover state. Hover state refers to the presence, in the user interface, of a pointing device located within the display boundary of the video chat object. When the user positions the displayed pointer over the video chat object, the video chat display can become transparent. Rendering the video object transparent permits the user to better view and access any content displayed under the video chat object. In some embodiments, the video integration module can be configured to transition the display of video chat objects between a normal display and a transparent display. In some examples, the transition is responsive to a position of a pointing device displayed in the user interface.

According to one embodiment, a video integration module can be configured to provide video chat persistence throughout displays of content in a user interface. The module can be configured to permit a user to browse cloud based content and applications while still active in a video chat session. A video chat object representative of the video chat session can be redrawn based on the current computing context of the device. Further, the video chat object can be configured to dissolve on mouse over and/or a hover state to permit any content that is not visualized because of the video object display to be accessible. The video integration module can be configured to determine context of current view to provide for context tailored displays. Context determination can include for example a determination on what current content view or mode is operational. (E.g. Active/Passive Mode, Channel View, Card view, Card Page View, Channel Page View, etc.). The video integration module can include a display management component configured to manage cards and card browsers (in some examples the card's browser can include flash, java, active x objects, etc.).

Dynamic Content Integration

According to another aspect, a video integration module can be further configured to analyze the content being display in the user interface in order to deliver video chat content into the content being displayed. Similar to the process of identifying dynamically a position to display a video chat object, the video integration module can be configured to analyze delivered content to identify objects within the delivered content. Further, the identified objects can be removed and replaced with video chat content. The process can be thought of as introducing a "green screen" into for example, a web-based content display. To continue the green screen analogy, the device can then project video content displays into the green screen portions of the original display.

Figure 28A:
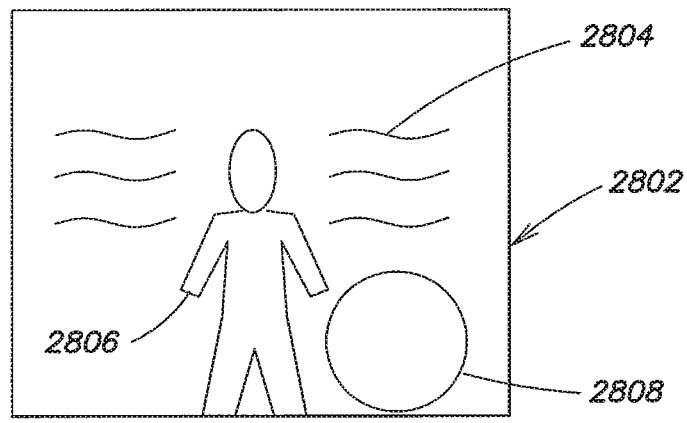
FIGS. 28A-B illustrate example user interfaces for displaying web-based content, according to aspects of the invention.
Figure 28B:
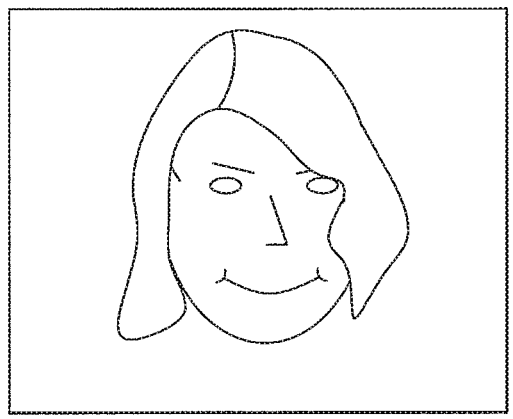
Figure 28C:
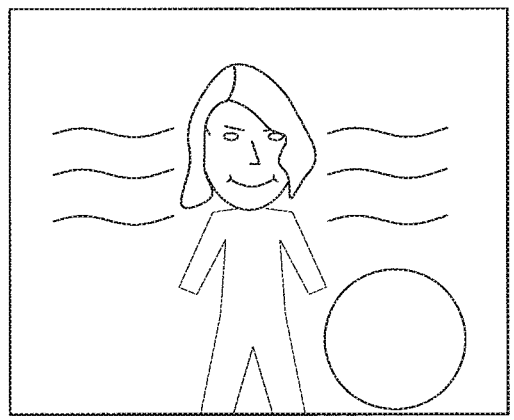
FIG. 28C illustrates and example user interface displaying content integrated web-based content and live video content.

FIG. 28A illustrates a display of web-based content. The web-based display illustrates a video feed of a yoga session at 2802. The background of the display is shown at 2804, the yoga instructor 2806 and a yoga ball 2808 are shown in the foreground. Shown in FIG. 28B is an incoming video chat request received on the device displaying the yoga session. As discussed, the user may received a notification message or be transitioned from the current view FIG. 28A to the view of the video chat session FIG. 28B. In embodiments that employ dynamic content integration, a video integration module can be configured to adapt the video content that would normally be presented in a separate video chat display into a composite of the incoming video chat signal displayed with the yoga session content. For example, in FIG. 28C, the yoga instructor display has been removed and replaced with the content from the video chat feed. As shown, the yoga session background and other objects remain the same, but the yoga instructor now appears to be the chat contact's video display. The integrated chat content display can further be configured to follow the positions that the yoga instructor would have occupied within the original content display. In other words, the video chat contact will be rendered as if they were performing the yoga poses from the original content display.

The video integration module can be configured to analyze incoming content displayed in the user interface. In response to a received video chat request, the video integration module can be configured to execute a processes for dynamically replacing displayed content with content from a video chat feed. In one embodiment, the original web-based content is analyzed using a background subtraction process to identify relevant portions of the content display. In one alternative, object identification and image segmentation processes can be executed on the web-based content to identify objects within a content display that can be replaced with content from a video chat session.

In one embodiment, a shell process can be configured to execute the analysis of the web content for identification of a candidate replacement area(s). The shell can further be configured to handle the display of the content in a user interface through a rendering engine. Once a candidate area has been identified the shell and the rendering engine can be configured to modify the display window of the original content to exclude the candidate area, and integrate a video chat display to occupy the excluded area. In another embodiment, the content signals of the original content and the video session can be interleaved so as to produce a composite of the content. In one example, the background content comes from the original web-based content and the replacement area comes from the video chat content.

Default Video Chat Provider

In some embodiments, a default video service provider is to be preferred. In other embodiments, a web optimized device user can be required to use the default video chat service provider. According to one embodiment, employing one video chat service provider can facilitate adoption and provide for a larger video chat community. In some examples, a homogenous service can help establish an application base that provides for consistency through the same installation and execution. One well-known video chat service provider is SKYPE. A specific video chat daemon can be installed on the web optimized device to provide for integration with the SKYPE service. A daemon specific to SKYPE can be employed for example in a video integration module as discussed herein, and further can be employed as part of system for providing dynamically loaded video chat services. The SKYPE daemon can be used instead of another video chat daemon, shown for example, in FIG. 6.

Skype employs contact lists to manage connections between users. As discussed above, the web optimized device can simplify the management of the SKYPE contact list and provide user interfaces for searching through registered SKYPE users to find new contacts. SKYPE also maintains its own user profile that could conflict with a user/device profile for the web optimized device. The device can be configured to resolve the conflict based on whether the user has a pre-existing SKYPE account or not. If there is no existing account, the user/device profile and any associated images are used for video chat displays, which are synchronized to the SKYPE profile. If there is an existing account, both profiles are maintained separately without synchronization.

Figure 26:
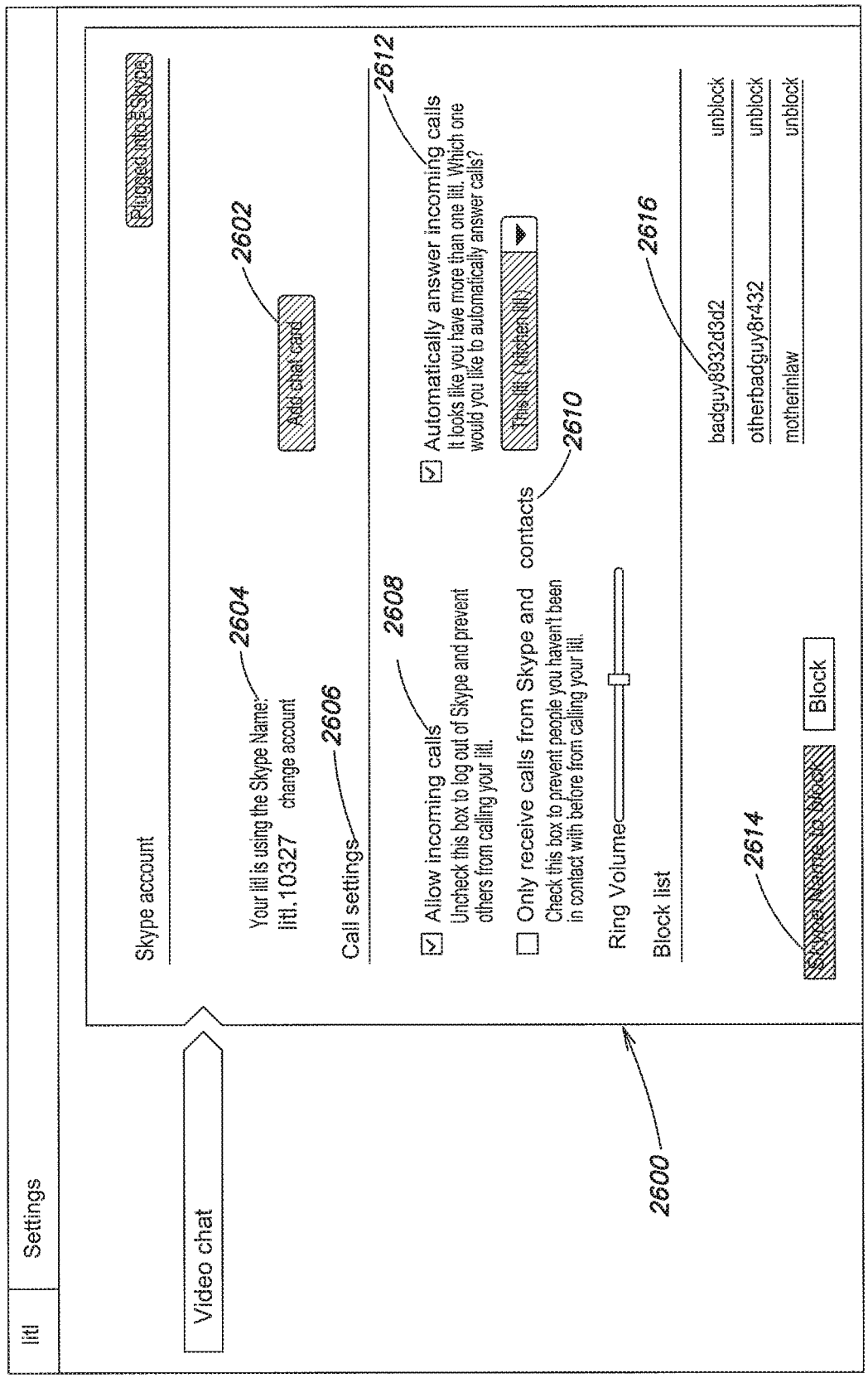
FIG. 26 illustrates an example user interface for accessing video service provider settings, according to aspects of the invention.

SKYPE generates authentication tokens for maintaining active connections. However, the tokens do expire, which can trigger the device to request the user to re-authenticate. In some settings, caching and/or saving the user name and password (locally in cache or to a remote user profile) can be an option. In some embodiments, various user interfaces can be specifically configured to integrate SKYPE functionality. In particular, a user interface can provide easily selectable options in the form of check boxes to activate or deactivate specific SKYPE functions. Shown in FIG. 26 is an example user interface 2600. The user can create new chat card by selecting 2602. At 2604, the SKYPE user name is displayed. The user can tailor the behavior of the video chat interaction using call settings at 2606, allow incoming calls at 2608, or limit calls to SKYPE and contacts at 2610. Further the user can designate specific web optimized devices to receive video chat calls at 2612, should the user have more than one device. Additionally, the user can configure blocked callers with the user interface 2600 by entering the contact's information in 2614. A list of the block callers can be displayed at 2616.

It should be appreciated that other video chat service provider can be employed to integrate video chat functionality. Additionally, in some embodiments, the web optimized device can be employed to handle any video chat service provider, and a video chat handler can be configured to manage multiple video chat service providers.

Video Chat Handler

Regardless of the video chat service provider selected and/or configured, the web optimized device can be specially configured with a video chat handler configured to dynamically load a web-based video chat service over the internet. In some embodiments, the web optimized device can define a system for providing dynamically loaded video chat services. An example system includes a video chat daemon configured to receive raw video chat data over a communication channel from the video service provider. In one embodiment, the video chat daemon can be configured to communicate the chat data over a top level communication channel to a shell engine which can be configured to process the video chat content, invoking embedded video and audio control for rendering the video chat in a user interface. The rendering of the user interface can be controlled by a rendering process tied to the shell process via the top level processes communication channel. In one example, an xserver process is used.

The shell process can be further configured to provide and manage content control displays through the user interface. The content control displays can be configured based upon a current view of the content. For example, content controls rendered in a video chat card shown in a card view (e.g. FIG. 10) can provide different functionality than the controls rendered in a full page view of the video chat (e.g. FIG. 11). State information, as discussed herein, can also alter the display and/or functionality provided.

In some settings, the shell can handle and process incoming video chat data received from a video chat daemon and pass along the data for display in a user interface. In other settings, the shell can be configured to work with a browser process to receive and process video chat data. Further, the browser process can also be configured to communicate with the video chat daemon directly to access and dynamically load video chat services onto the web optimized device. In one alternative, a browser process can communicate directly with the video provider without need of a specific video chat daemon.

The capability to load video chat service dynamically from the cloud is especially significant for the embodiments of the web optimized device that are constructed without hard drives. Further the video chat handler permits the web optimized device to integrated video chat services directly from the cloud without cumbersome and computationally expensive execution.

Figure 27:
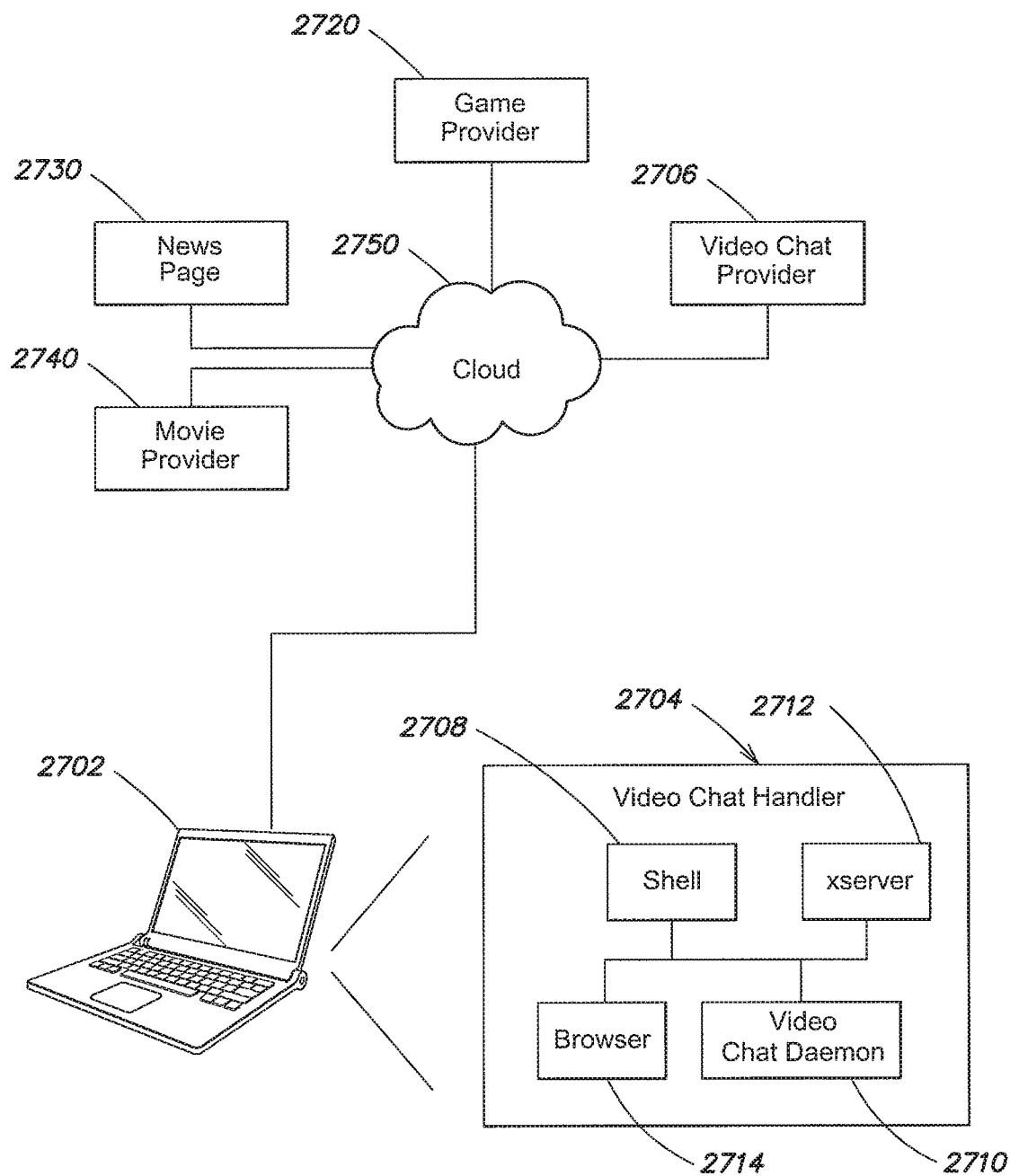
FIG. 27 illustrates an example block diagram of an architecture for a video service handler for dynamically loading video services, according to aspects of the invention.

Shown in FIG. 27, is an example of a video chat handler configured to access a video chat service provider to dynamically load video chat services. Device 2702 executes the processes that comprise one example of the video chat handler 2704. The video chat handler can be configured to establish a connection to a video chat service provider 2706, through operation of a plurality of engines, including a shell engine 2708 for processing video data received from a video chat daemon 2710 which can execute embedded video and audio controls for rendering the chat session in a user interface on device 2702. The rendering of the user interface can be controlled by xserver 2712. Further the video chat handler may include browser engine to perform some of the operations associated with establishing a connection to the video chat provider 2706, authenticating with the chat provider, maintaining a connection, and accessing content. Additionally, browser engine 2714 could be invoked during search operations performed with the video chat provider, namely when the user of the device 2702 is looking for contact to connect to using the video chat services.

Additionally, browser process 2714 can be employed to access web-based content outside of the video service provider, and the video chat handler can be configured to integrate displays of the video chat content into the accessed web-based content. For example, the device's user can access game provider 2720 through the cloud 2750 to access web-based game applications. The video chat handler can be configured to integrate the video chat content into the web-based game. Further the type of web-based content does not limit the ability to integrate video chat service. Device 2702 can be connected to 2730 New Page, 2740 Movie Provider and each service and the content they deliver can be integrated with video chat functionality.

In some embodiments, a chat handler can be specially tailored to specific video chat service providers. In some settings, specially configured device drivers can be required to receive a raw video chat signal from a specific service provider. The shell process can be configured to operate with specific video chat drivers and daemon processes as well as ones that can be more generally applied and integrated with multiple video chat providers. Additionally, the video chat handler can be configured to communicate and receive video chat sessions to multiple video chat providers and in some embodiments can bridge video chat sessions between providers. In some embodiments, a video chat handler for each service provider can be instantiated. In one example, any number of video chat handlers can be configured to communicate with each other enabling video chat sessions to be bridged across providers. In other examples, each of the providers can even include their own proprietary communication requirements handled by multiple instantiations of video chat handlers. A web optimized device can be configured to manage contacts across disparate providers, maintaining in some examples, master contact lists with configuration information indicating which provider is associated with which video chat contact.

Device Profile

According to another aspect, a web optimized device and its associated settings can be reflected in a device profile maintained in a remote storage location. Any cards created by the user of the device, and device settings, arrangements of the user interface, bookmarks, etc. can all be stored as part of the device profile. In the event of system failure, the web optimized device can be restored with little effort, once a connection has been made to the remotely stored profile, the web device can be configured to operate seamlessly from the last known settings. The web optimized device can be configured to maintain a cached copy of the device profile locally to speed an initial boot sequence. The web optimized device can be configured to update the device profile as changes to the device's settings are made. For example, if a user organizes the display order of cards in their card view, those settings will be maintain even in the event of system failure. Additionally, newly created cards and the settings required to access the associated content will likewise be maintained.

According to one embodiment, all activity on the web optimized device can be integrated into the device profile to provide for a fully portable device profile that provides the same experience to the end user regardless of the web optimized device s/he is operating. The optimized device can also be configured to employ the information available in the device profile to deliver targeted web-based content the end user. For example, relationships between accessed content may be established based on use information associated with a device and/or stored in a device profile. For example, content accessed in sequence by a user may be identified as related. Further content accessed via links from other content can also be identified as related. In one embodiment, upon accessing a portion the content that has an identified relationship, content derived from and/or associated with the related content can be presented to the user. In some embodiments, information embedded within accessed content can become a source of information on the end user accessing that content. For, example social networking web sites allow users to create pages of contacts, post pictures, identify interests, among other options. The information represented and/or available on such pages can be used to develop information on the device user, and analyzed to deliver targeted content based on the analysis of the information. In another example, any information entered and/or posted by a user can be used to develop a better understanding of the user's behavior and/or interests. Further, analysis of the accessed content can extend beyond the individual user to any information contained on the accessed content. For example, information on other computer users available through the accessed content may provide a source of targeted content recommendations based on the information obtained on those users.

According to another embodiment, the web optimized device can be configured to provide additional profile based operations. In one example, a user account can be established as part of the device profile. The user account can be configured to permit or deny access to the web optimized device based on whether the account is empty or has available resources. In one example, the account can operate as a content controller, limiting access by a user to content they can "pay" for using their account. In another example, the account can operate as a usage manager. For example, the web optimized device can be configured to debit the account based on a time of use. Once the account has been emptied, the user is notified that they can no longer use the device until the account is replenished. In some examples, the account can be configured to auto-replenish on, for example, a specified time line (e.g. week, month, day, etc.). In some embodiments, a user can configure computer operations to be associated with a particular value in the account. In one example, the computer operations can be assigned a value based on content. In another example, value can be assigned based on time. In some embodiments, a parent can configured the device to permit use of the device for a longer period of time based on the days of the week. For example, a parent can configure the device to "cost" more during the week and/or schooldays, while the cost of use is reduced during weekends. Additionally, specific cards displayed in the user interface can be configured to require purchase in order to access their associated content. The cost of access can be configured based on the content presented. A gaming channel can be configured to require more resources from an account, whereas an educational channel can be configured to require less resources from an account.

Accounts values can also reflect monetary value. In some embodiments, the account can be configured to replenish from a credit card, bank account, or other monetary source.

TV Mode

According to one aspect, a web optimized device can be configured to operate in a TV mode in response to a connection to an external display device. Various aspects of example computing devices configured with a TV mode are discussed in co-pending application U.S. patent application Ser. No. 12/910,324 filed on Oct. 22, 2010 entitled "COMPUTER WITH TV MODE," incorporated herein by reference in its entirety.

In TV mode user interface displays can be modified to improve user perception of content displayed on the external device. In particular, connected TVs are typically much further away from the user who is viewing the content. Accordingly, the displays can be configured to account for an increased viewing distance. In some embodiments, displayed content can be further configured based on the settings of the external display device. According to one embodiment, a portable computer 100 can be configured as a web optimized device. Further, portable computer 100 can be configured to operate in a TV mode in response to a connection to an external display device to make interaction with content displayed from the portable computer 100 more easy. TV mode can also provide for improved interaction with video integrated content by enhancing the user's ability to interact with content displays on the external display devices. Further, displays of web-based content and integrated video content can be manipulated in TV mode to provide for better visualization, especially when viewed from a distance. For example, as discussed herein, signals intended to be displayed on a conventional computer screen, may not transition well to being displayed on a television (especially when the television is intended to be viewed from a distance). As such, according to some embodiments, in TV mode, the signals sent by the portable computer 100 to the television may be modified. It is to be appreciated that the portable computer 100 may operate in TV mode regardless of the configuration portable computer 100. For example, the portable computer 100 may operate in TV mode which modified the displays from both easel mode (FIG. 7A) and laptop mode (FIG. 7B).

Many conventional televisions designed for displaying broadcast video content use a technique called "overscan" to crop the edges of the picture region, which historically contain artifacts not intended to be seen by the viewer. According to some examples, televisions may have an overscan region of up to 7.5% per side. While some televisions provide a way to turn overscan off when viewing content from a computer source, others do not. In order to reduce the need for the manual adjustment of television settings, to provide the best viewing experience possible and the maximize the use of the television screen while minimizing content lost beyond the edges of the television screen, the portable computer 100 may perform overscan correction.

According to one embodiment, once the portable computer 100 is connected to a television, the portable computer 100 enters TV mode. In TV mode, the portable computer 100 receives television identification information from the television. For example, according to one embodiment, if the television is connected to the portable computer 100 via an HDMI connection, the portable computer 100 receives television identification information through Extended Display Identification Data (EDID). In one embodiment, EDID is a data structure which may include such information as the manufacturer's name, the television's serial number, the product type of the television, the timings supported by the television, display size of the television, pixel mapping data etc. Through the use of the EDID, the portable computer 100 determines if it has been connected to that specific television before. If the portable computer 100 has not been connected to the specific television before, the portable computer 100 initiates an overscan wizard and the user interface of the portable computer 100 displays the overscan wizard (on the television).

Figure 29:
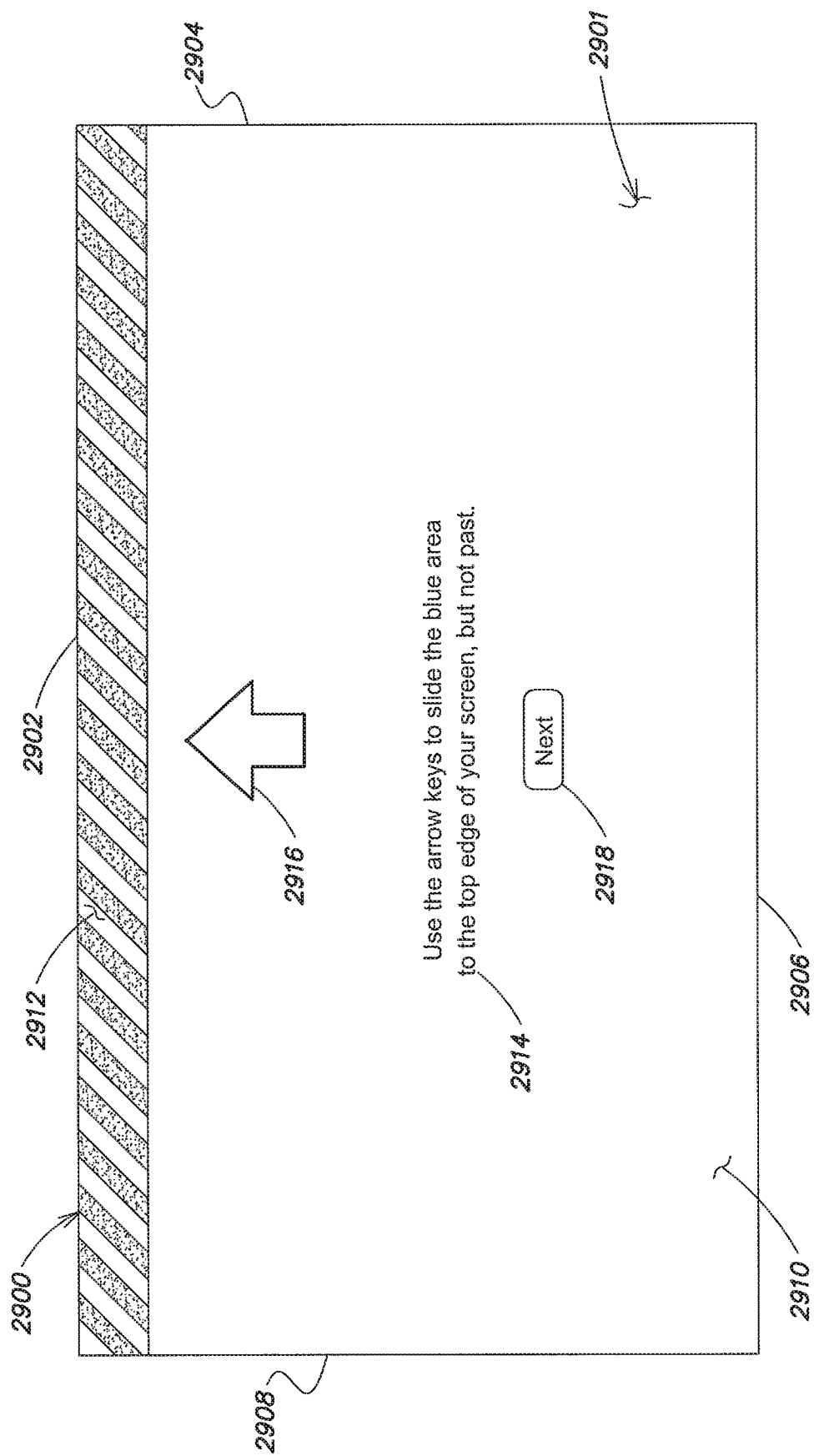
FIG. 29 illustrates an example user interface for configuring an external display device, according to aspects of the invention.

According to one embodiment, in TV mode, the portable computer 100 performs overscan correction through the use of the overscan wizard. FIG. 29 illustrates a screen shot 2900 of the overscan wizard interface 2901 displayed on the television by the portable computer 100 upon activation of the overscan wizard. The overscan wizard interface 2901 includes a top edge 2902, a right edge 2904, a bottom edge 2906, and a left edge 2908. The overscan wizard interface 2901 also includes a first portion 2910 and a second portion 2912. According to one embodiment, the second portion 2912 is 15% of the entire interface 2901; however, it is to be appreciated that the second portion 2912 may begin as any portion of the interface 2901.

In one embodiment, the overscan wizard asks a user to identify the location of each edge of their television screen. According to one embodiment, the overscan correction wizard prompts the user to identify each edge 2902, 2904, 2906, 2908, one at a time, beginning with the top edge 2902 and moving clockwise; however, it is to be appreciated that the overscan correction wizard may start with any edge and may progress in any order.

According to one embodiment, the overscan wizard interface 2901 prompts the user (i.e. with text 2914, diagrams, sound etc.) to move the first portion 2910 of the interface 2901 to the appropriate edge of the screen as indicated by a large arrow 2916, thus eliminating the second portion 2912 of the interface 2901. In one embodiment, a user may use the controls on the portable computer 100 (i.e. touch pad, keyboard) to move the first portion 2910.

In one embodiment, with each additional control movement intended to move the first portion 2910 closer to one of the edges, 2902, 2904, 2906, 2908, the arrow 2916 flashes briefly and the first portion 2910 slides in the indicated direction, covering up more of the second portion 2912. In one embodiment, the first portion 2910 moves in intervals of 1.25% of the interface 2901 (or 9 pixels vertically or 16 pixels horizontally). According to another embodiment, a continuous control movement (i.e. a key held down) will cause the first portion 2910 to continuously slide near the edge. A user may then finesse the position of the first portion with discrete control movements as needed. Once a user has finished aligning the first portion 2910 with the desired edge, the user may advance the overscan wizard by pressing an enter key (i.e. on the keyboard 106), or using the touchpad 108 to control a cursor to select the "next" button 2918. In one embodiment, an option to return to a previous step (i.e. edge) may also be provided should the user advance by mistake.

As a user advances through the overscan wizard and configures the wizard for each edge 2902, 2904, 2906, 2908, the settings corresponding to each edge are stored (i.e. in local memory or in a network cloud) for later use (i.e. to move forward and backward through the overscan wizard so as not to repeat the process from the beginning). In one embodiment, each edge setting is stored in an account associated with the user. In another embodiment, the edge settings are also associated with a unique identifier for the television on which the overscan wizard was performed. Storing the edge settings with an associated television identifier may allow the portable computer 100 to automatically recall the edge settings the next time the portable computer is connected to the same television. This way a user may not need to use the overscan wizard each time they connect to the same television. In addition to edge settings (through the overscan wizard), a user may also define other display settings such as contrast and brightness. The additional display settings may also be stored and associated with a specific television, to be recalled by the portable computer 100 when the portable computer 100 is reconnected to the specific television and applied by a rendering engine and/or display drivers of the portable computer 100.

Upon completion of the overscan wizard, according to one embodiment, the overscan edge settings are communicated to the display drivers of the portable computer 100. Utilizing the overscan settings, the display drivers may ensure that all information displayed by the portable computer 100 is maintained within the available screen area determined by the overscan wizard.

Figure 30:
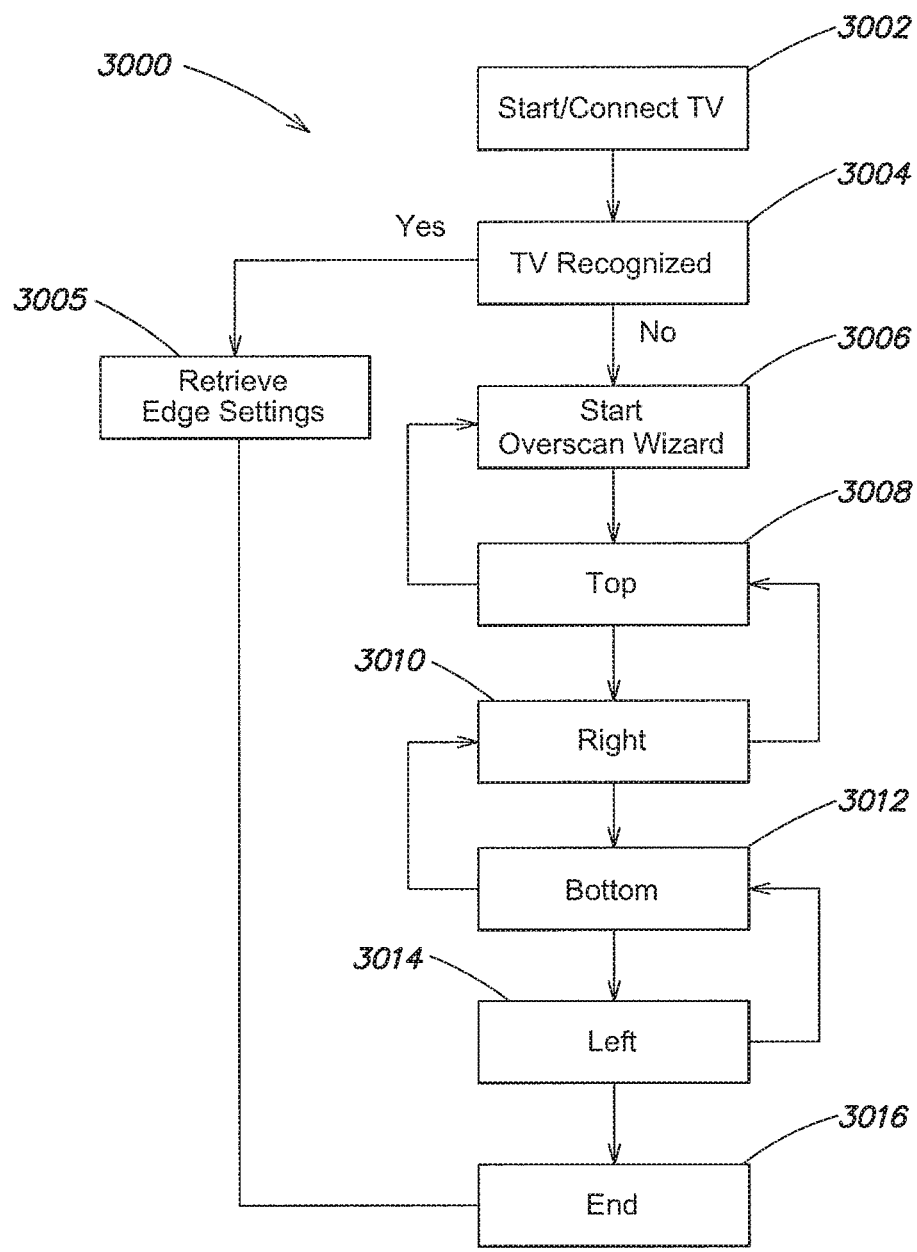
FIG. 30 illustrates an example process for configuring an external display device, according to aspects of the invention.

FIG. 30 illustrates a flow chart 3000 of the overscan wizard in TV mode according to one embodiment of the present invention. At block 3002, a portable computer 100 is connected to a television. As discussed above, according to one embodiment, the portable computer 100 and television are connected via an HDMI connection. At block 3004, the portable computer 100 receives television identification information from the television and compares the identification information to identification information of different televisions it has been connected to before. A determination is made whether the television currently connected to the portable computer 100 has been connected to the portable computer 100 before.

In response to a determination that the television currently connected to the portable computer 100 has been connected to the portable computer 100 before, at block 3005 the portable computer retrieves from memory (i.e. from local memory or from a network cloud storage location) previously stored overscan setting information associated with the television and the user, and adjusts the display configuration of the portable computer 100. At block 3016, the overscan wizard exits.

In response to a determination that the television currently connected to the portable computer 100 has not been connected to the portable computer 100 before, at block 3006, the overscan wizard initiates. At block 3008, the user configures the overscan wizard to the top edge of the screen, as discussed above. From block 3008, the user may choose to store the top edge overscan setting and move on to block 3010 or he may choose to go back to the start of the overscan wizard, at block 3006.

Upon accepting the top edge overscan setting, at block 3010, the user configures the overscan wizard to the right edge of the screen, as discussed above. From block 3010, the user may choose to store the right edge overscan setting and move on to block 3012 or he may choose to go back to the top edge configuration screen, at block 3008.

Upon accepting the right edge overscan setting, at block 3012, the user configures the overscan wizard to the bottom edge of the screen, as discussed above. From block 3012, the user may choose to store the bottom edge overscan setting and move on to block 3014 or he may choose to go back to the right edge configuration screen, at block 3010.

Upon accepting the bottom edge overscan setting, at block 3012, the user configures the overscan wizard to the left edge of the screen, as discussed above. From block 3014, the user may choose to store the left edge overscan setting and move on to block 3016 or he may choose to go back to the bottom edge configuration screen, at block 3012. At block 3016, the overscan wizard exits. It is to be appreciated that blocks 3008 to 3014 may be configured in any order In addition to compensating for potential overscan issues, in TV mode the portable computer 100 may also adjust the overall layout of the portable computer's 100 user interface. According to one embodiment, each piece of information (i.e. cards, channels, applications, icons etc.), displayed by the portable computer 100, can be configured with a flexible layout allowing it to be adjusted as needed to maximize the available screen area. For example, according to one embodiment, using the screen edge information retrieved by the overscan wizard and knowing that the display capabilities of the television are oftentimes different than that of a conventional computer screen (i.e. many HD televisions have an HD standard aspect ratio of 16:9—either 1280×720 or 1920×1080), a rendering engine and/or the display drivers of the portable computer 100 can be configured to rearrange the information displayed in user interface (i.e., cards, icons, applications, channels etc.) for display on the television to ensure that pixel waste is limited and that no content or controls extend beyond the edges of the screen, interfering with the intended interaction.

In one embodiment, each piece of information displayed on the user interface of the portable computer 100 is defined with a pixel specification. According to one embodiment, each pixel specification includes a combination of springs and struts to indicate how a certain piece of information may be modified and/or scaled. For example, the springs and struts may define the relationship between the piece of information, other pieces of information and the user interface.

Based on the available information (i.e. overscan information, display settings of the television etc.) about the display capabilities of the television and the pixel specifications of the information intended to be displayed on the television, in TV mode the rendering engine and/or display drivers are configured to modify and arrange the desired information so that the pieces of information are adequately displayed on the available display area of the television.

Figure 31:
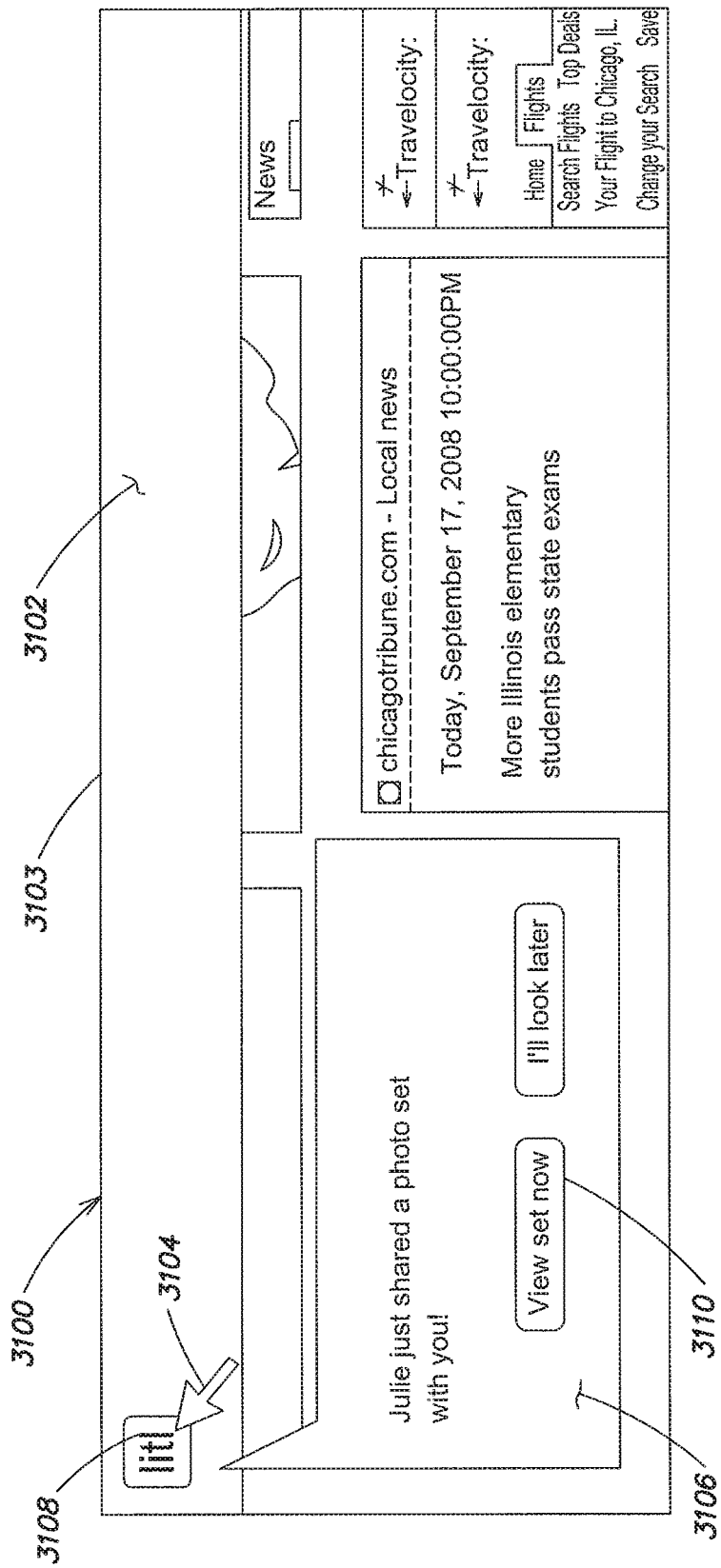
FIG. 31 illustrates an example user interface display, according to aspects of the invention.

In addition to arranging the user interface so as to provide all of the desired information on the television, in TV mode the display drivers of the portable computer 100 may also specifically manipulate components of the user interface. For example, according to one embodiment, when the portable computer 100 is coupled to the television, header portions of the user interface, are hidden, so that the user interface may take advantage of every available pixel on the television for desired content. As illustrated in FIG. 31, a header portion 3102 is typically located at the top edge 3103 of the user interface 3100 and may include operational information related to the content displayed on the user interface (i.e. search tools (not shown), system messages 3106, navigation buttons 3108 etc.).

According to one embodiment, once the portable computer 100 is coupled to the television, the header portion 3102 is hidden until its use is required. For example, in one embodiment, when the header portion 3102 is hidden, a user who requires the use of the header portion 3102 may move the cursor 3104 to the top edge 3103 of the screen (i.e. at the topmost row of pixels). Once the cursor 3104 is at the top edge 3103 of the screen, a thin bar (not shown) appears across the topmost row of pixels, indicating the presence of a hidden header portion 3102. In one embodiment, if the user maintains the cursor 3104 at the top edge 3103 of the screen for a predetermined period of time, the header portion 3102 appears. In another embodiment, in addition to maintaining the cursor 3104 at the top of the screen, in order for the header portion 3102 to reappear, movement of the cursor 3104 must remain below a minimum threshold. According to one embodiment, movement of the cursor 3104 is calculated as a linear moving average of the last quarter of a second. In one embodiment, the minimum threshold speed is 80 pixels per second. However, it is to be appreciated that the movement of the cursor 3104 may be calculated in any way and the minimum threshold may be defined as any amount of time. In addition, according to another embodiment, a user may activate the header portion 3102 by clicking on the thin bar at the top of the screen (i.e. with the touchpad 108).

According to one embodiment, the header portion 3102 slides into the user interface 3100, pushing the rest of the displayed information downward and causing the information at the bottom of the user interface 3100 to move off of the screen. In another embodiment, the header portion 3102 slides over the displayed information at the top edge 3103 and does not displace any of the other information. According to one embodiment, once the header portion 3102 is activated, it remains visible while it is being used. For example, the header portion 3102 remains visible when a text field (i.e. of a search or URL box) is active, when a drop down menu within the header portion 3102 is currently open, or when a system message 3106, requiring action by the user, is displayed.

According to one embodiment, once the cursor 3104 is no longer located within the header portion 3102 and the header portion has been inactive for a pre-determined period of time, the header portion 3102 slides off screen When in certain modes of operation (i.e. passive mode), the portable computer 100 may hide the cursor 3104 as the user operates the user interface mainly through use of the touchpad 108 (i.e. by automatic scrolling). However, in some embodiments, while operating the portable computer 100, a user may still have a need for the use of the cursor 3104 (i.e. when making a selection in active or laptop mode). For example, in certain configurations as described above, a user may operate a touchpad 108 to manipulate a cursor 3104 in order to interface with the user interface of the portable computer 100. However, when connected to the television and operated from a distance, the use of a cursor may become more difficult. Therefore, according to one embodiment, in addition to overscan protection and flexible layouts, in TV mode the portable computer 100 may also be configured to modify a cursor 3104 when the portable computer 100 is coupled to the television and is configured in active or laptop mode.

According to some embodiments of the current invention and as illustrated in FIG. 31, a cursor 3104 operated by a user to interface with a portable computer 100 may be modified to be more easily operated by a user operating the portable computer 100 from a distance (via a television). In one embodiment, in addition to configuring the user interface of the portable computer 100 to be confined to the available display output of the television, as discussed above, the display drivers of the portable computer 100 may also constrain a cursor 3104 to the same available display output. In this way, the cursor may be prevented from becoming lost beyond the edge of the television screen and information near the television screen edges (i.e. header buttons and scrollbars) may be more easily used.

In conventional computer systems, cursors are traditionally small. However, while this may be adequate when a user is operating the computer system from a short distance directly in front of a computer screen, the small cursor may be difficult to follow when a user is operating the computer system from a distance (i.e. from the other side of a room). Therefore, according to at least one embodiment of the current invention, once the portable computer 100 is coupled to a television, the display drivers of the portable computer 100 may increase the size of cursor 3104. For example, in one embodiment, the cursor 3104 is increased by 50%; however, it is to be appreciated that the cursor 3104 may be increased by any amount.

In order to prevent the increased size cursor 3104 from interfering with the display content of the portable computer 100 (i.e. while a user is attempting to view online video content on the television), according to one embodiment the display drivers of the portable computer 100 hide the cursor 3104 after a period of inactivity. For example, in one embodiment, the cursor 3104 is hidden after a 10 second period of inactivity; however, it is to be appreciated that the period of inactivity may be defined as any amount of time.

Because of the relatively limited use of the cursor 3104 and the potential hiding of the cursor 3104 after a period of inactivity, a user may lose track of the cursor 3104 (i.e. especially when operated from a distance). According to one embodiment, in order to prevent a user from losing track of the cursor 3104, the display drivers of the portable computer 100 may highlight the cursor 3104 briefly upon the cursor 3104 being initially moved. For example, according to one embodiment, when the cursor 3104 is first moved, an animated wave-like effect, emanating from the cursor 3104, may be displayed, indicating to the user the position of the cursor 3104. It is to be appreciated that any highlighting effect may be used to signal the position of the cursor 3104.

When a user is operating the portable computer 100 in TV mode via the user interface displayed on the television, certain messages 3106 from the portable computer 100 may be displayed on the television. In some embodiments, these messages 3106 may require action by the user. For example, while operating the portable computer 100, a message 3106 (i.e. via a dialogue bubble) may appear on the screen informing the user that, for example, another user is requesting a video chat. When a user is viewing the content from the portable computer 100 on the television and is not actually interacting with the portable computer 100, it may be a difficult and time consuming process for the user to stop what they are doing and deal with the message 3106.

For instance, if a user is mainly viewing content on the television (i.e. online video content) without actually interacting with the portable computer 100, the cursor 3104 may be hidden (as discussed above). If a message 3106 then appears on the screen, requiring a response from the user, not only will the video content be interrupted, but the user will have to determine the location of the cursor 3104 and operate the cursor 3104 to deal with the message 3106. Therefore, according to at least one embodiment of the current invention, a hidden cursor 3104 can be configured to automatically jump (warp) to the location of any messages 3106 from the portable computer 100 displayed on the television. In addition, in at least one embodiment, not only will the hidden cursor 3104 jump to the location of the message 3106, but the cursor 3104 will be located in such a position that a single operation by the user will dismiss the message 3106.

For example, as illustrated in FIG. 31 and according to one embodiment of the current invention, content being viewed by the user is interrupted by a message 3106 from the portable computer 100 informing the user that a friend has shared their photo set and inquiring whether the user wishes to view the set now or look at it later. In response the hidden cursor 3104 automatically positions itself at the location of the message 3106, the cursor 3104 is highlighted (as discussed above), and the cursor 3104 is automatically positioned over a button 3110, which when pressed, indicates to the portable computer 100 that the user wishes to view the photo set. In this way, by making a simple operation (i.e. pressing on the touchpad 108 or pressing an "Enter" key on the keyboard 106), the user can respond affirmatively to the message and quickly dismiss the message 3106. In another embodiment, once the cursor jumps to the message from the portable computer and is highlighted, a user may press a different key (i.e. an "Escape" key on the keyboard 106) to respond negatively to the message and also quickly dismiss the message 3106.

It is to be appreciated that according to one embodiment, only hidden cursors 3104 will automatically jump to messages 106 from the portable computer 100, so as not to interfere with a non-hidden cursor 3104 currently being used by the user. However, in other embodiments, all cursors 3104 may be configured to automatically jump to the location of a system message 3106.

Inputting text to the portable computer 100 from a distance (via the keyboard 106) can be difficult without adequate feedback. For example, a user may need to continuously change their gaze by looking up at the screen and then down at the keyboard 106 while typing, in order to ensure the accurate input of the text. This may be a time intensive, inefficient and even frustrating process Therefore, according to at least one embodiment of the current invention, in TV mode the display drivers of the portable computer 100 are configured to display large and immediate feedback for as much text input as possible, thereby making it relatively easy to see the characters that have just been typed and making it possible to more easily confirm typographical errors. For example, as illustrated in FIG. 32 and according to at least one embodiment, when a text field 3202 in the user interface 3200 is selected by a user and the user begins to enter text, an overlay 3204, containing recently typed characters 3206 appears. The overlay 3204 is transient, appearing immediately when a character is typed, and disappearing again after a predetermined period of time without any additional input or upon movement of the cursor (not shown). According to one embodiment, the overlay 3204 disappears after two seconds without any additional input; however, it is to be appreciated that the overly 3204 may be configured to disappear after any amount of time without additional input.

According to one embodiment, even when the overlay 3204 disappears (i.e. because of inactivity), the text previously entered into the overlay 3204 will not clear and will continue to be displayed when the overlay 3204 is again displayed. In one embodiment, the overlay 3204 will only clear when whitespace is entered by the user, or when any other form of input alters the position of the cursor. As a result, until a space or other input clears the overlay 3204, a "backspace" key of the keyboard 106 may be used to make corrections as needed.

According to one embodiment, the overlay 3204 appears in the lower middle area of the user interface 3200, where it is least likely to obscure the selected text field 3202 and where it is relatively easy to view by a user glancing up from the keyboard 106. As a user enters text, the overlay 3204 grows as necessary. In one embodiment, the overlay 3204 will display an ellipsis at the beginning should the input exceed the width of the screen. According to one embodiment, any characters entered into the overlay 3204 are mirrored within the text field 3202. In one embodiment, the characters entered into the overlay 3204 are mirrored instantly into within the text field 3202. It is to be appreciated that, according to one embodiment, the overlay 3204 may be utilized in TV mode whenever a user wishes to enter text into a text field 3202.

As discussed above; cursors, text, search and URL boxes may all be enlarged by the display drivers of the portable computer 100 to improve their ease of use while the portable computer 100 is being operated from a distance. In addition, according to one embodiment, while in TV mode, the display drivers of the portable computer 100 may also zoom into the entire layout of a desired page. For example, in order to take advantage of all the available pixels available on a television, the display drivers of the portable computer 100 zooms pages, using full page zoom, to fit the width of the screen.

According to one embodiment, pages are zoomed as much as possible without requiring horizontal page scrolling, up to a maximum of 150% of their native size. However, it is to be appreciated that the display drivers may be configured to zoom into the pages at any level. In one embodiment, zooming into the page increases the size of the text on the page, so that it is readable at a distance. In addition, according to one embodiment, zooming into the page also increases the relative size of any links on the page, making the links easier to read and easier to navigate when using the touchpad 108. According to another embodiment, the user may still be able to manually control the level of zoom displayed in the user interface (i.e. via shortcut keys on the keyboard 106 or actual controls displays in the user interface).

According to another embodiment, smart zooming features can also be implemented with a TV mode of operation. For example, the portable computer can be configured to crop displayed content, permitting an enlarged view of, for example, a video chat session. A display manager can be implemented on the portable computer configured to identify objects within content. The display of the content can be cropped to present an enlarged view of the object. In one embodiment, background subtraction processing can be employed to identify the object. In another, automated object identification can be used. Automated object identification can be used to identify a figure of a person, a head of a person, among other examples. Once the object is identified, an enlarged view of that portion of the content can be presented.

In one example, the smart zoom operations can be configured to analyze currently displayed content and present enlarged views of the content based on the current display. In one example, the display is zoomed into a view of a video chat participant's head while they are talking. In another example, the display manager can also be configured to zoom back out to the original display when the video chat participant stops talking. The smart zoom features can be employed with any web based content. Objects for "zooming" within web-based content (e.g. web pages) can be identified based on user activity within a display screen. The display manager can be configured to track window focus, typing location, cursor location, among other examples to identify a portion of a display to enlarge.

As discussed previously, through an HDMI connection and the EDID data structure, the portable computer 100 may receive information about the television. In addition to using the information to identify televisions connected previously to the portable computer 100 (as discussed above), according to one embodiment of the present invention, the information sent from the television may also be used to adjust settings in the portable computer 100.

For example, according to one embodiment, when the portable computer 100 is connected to the television (via an HDMI connection), the portable computer 100 enters TV mode. The portable computer may receive display capabilities from the television (i.e. overscan area, pixel settings, refresh rate, brightness and contrast settings etc.) and configure the video output display signals sent from the portable computer 100 to the television based on the display capabilities. For example, in one embodiment, if the television sends overscan information to the portable computer 100, the portable computer 100 can configure the layout of the user interface without running the overscan wizard. In another embodiment, if the television sends resolution and pixel information to the portable computer 100, the portable computer 100 can configure the layout of the user interface to best utilize all of the available pixels. It is to be appreciated that the portable computer 100 may receive any type of display information from the television and may adjust its display settings to provide the best display possible on the television.

According to one embodiment, in addition to display capabilities of the television, in TV mode the portable computer 100 may also receive content type display information over the a network associated with the type of content that is currently being displayed on the television. For example, in one embodiment, the content type display information received by the portable computer 100 may indicate what the user is currently viewing. In response to the content type display information, the display drivers of the portable computer may adjust the display settings of the portable computer 100 accordingly. For example, if the content type display information indicates to the portable computer 100 that the user is watching online video content, the display drivers of the portable computer 100 may adjust the brightness and contrast settings of the portable computer 100 along with the layout of the user interface to provide the most efficient and best quality video signals possible to the television. It is to be appreciated that the user interface of the portable computer 100 may be configured in any way in response to any type of content type display information.

According to another embodiment, in TV mode the portable computer 100 may also receive content subject matter display information over a network associated with the subject matter of the content that is currently being displayed on the television. In one embodiment, in response to the subject matter display information, the display drivers and controller of the portable computer 100 present related material to the user. For example, in on embodiment, the portable computer 100 may receive information over the network that the user is currently viewing sports related material in the web browser. In response to such signals, the portable computer 100 may display additional sports related content or sports related advertising that the user may be interested in. In another example, the portable computer 100 may receive information that the user is currently viewing a certain television program (i.e. either through online video or other broadcast means such as cable or satellite television). In response, the portable computer 100 may display additional content or advertisements related to the television program.

According to one embodiment, while in TV mode, the portable computer 100 may provide audio feedback for certain actions taken by the user and/or the portable computer 100. This helps the user to better appreciate their interaction with the portable computer. For example, in one embodiment, the portable computer 100 plays a sound when a new system message 3106 is displayed, when the cursor 3104 is highlighted, or when a new text box is opened. However, it is to be appreciated that the portable computer 100 may be configured to play any defined sound for any action. Through the sounds, the user may quickly be able to determine what action the portable computer 100 has just taken and/or what actions the user must perform.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A video integration device, comprising:
a display; and
at least one processor configured to execute an operating system, the operating system comprising:
an application execution service configured to execute a plurality of applications;
a communication service configured to access web-based content in response to a request for the web-based content from at least one of the plurality of applications;
a user interface service configured to display the web-based content on the display in a first view of the at least one of the plurality of applications; and
a video handler separate from the plurality of applications and configured to integrate a video service into the first view at least in part by:
establishing a communication with a video service provider using the communication service;
retrieving video content from the video service provider via the communication service; and
causing the user interface service to modify the first view to render the web-based content and the video content retrieved by the video handler on the display simultaneously,
wherein the video handler does not form any part of any of the plurality of applications,
wherein the video handler is configured to integrate the video service into the first view regardless of which of the plurality of applications is in the first view, and
wherein the video handler comprises a shell process configured to, responsive to one or more user interactions received from user interface controls presented to a user, trigger one or more operations associated with the at least one of the plurality of applications.

2. The video integration device of claim 1, wherein rendering the web-based content and the video content on the display simultaneously comprises integrating the video content into a view of web-based content rendered on the display.

3. The video integration device of claim 1, wherein the shell process is configured to:
composite the web-based content with the user interface controls; and
cause to render the user interface controls in a user interface.

4. The video integration device of claim 1, wherein the shell process is further configured to:
composite the video content with video chat controls;
cause to render the video chat controls in a user interface; and
responsive to one or more user interactions received from the video chat controls, trigger one or more video chat operations.

5. The video integration device of claim 1, wherein the shell process is configured to retrieve the video content from the video service provider via a video chat provider daemon.

6. The video integration device of claim 1, wherein the video handler is configured to cause the user interface service to modify the first view to render the web-based content and the video content on the display simultaneously, by:
allocating a first portion of the display to a first view of the web-based content;
allocating a second portion of the display to the video content; and
causing to render the first view of the web-based content in the first portion of the display and render the video content in the second portion of the display.

7. The video integration device of claim 6, wherein video handler is further configured to:
modify a second view of the web-based content to generate the first view that fits within the first portion of the display to accommodate the second portion of the display.

8. The video integration device of claim 7, wherein modifying the second view of the web-based content to generate the first view comprises reducing a size of the second view, such that the first view is a scaled-down version of the second view, to fit within the first portion of the display.

9. The video integration device of claim 7, wherein the second view of the web-based content is a full screen view.

10. The video integration device of claim 6, wherein the second portion of the display is positioned adjacent the first portion of the display.

11. The video integration device of claim 1, wherein the video handler is configured to:
execute a transition from a first view of the web-based content to a second view of the web-based content; and
cause to render the second view of the web-based content simultaneously with rendering the video content on the display.

12. The video integration device of claim 1, further comprising one or more of a keyboard, a microphone, a touchpad, and a touch screen.

13. The video integration device of claim 1, wherein the video integration device is operative in a plurality of modes corresponding to respective physical configurations, the plurality of modes comprising:
a first mode in which a keyboard of the video integration device is positioned at an angle less than or equal to 180 degrees with respect to the display of the video integration device about an axis parallel to at least one of a height dimension and a length dimension of a display screen of the display; and
a second mode in which the keyboard is positioned at an angle greater than or equal to 180 degrees with respect to the display screen of the display about the axis.

14. The video integration device of claim 13, wherein the plurality of modes include at least two of: a laptop mode, an easel mode, a frame mode, and a flat mode.

15. The video integration device of claim 1, wherein the web-based content comprises web-based game content.

16. A computer implemented method for providing integrated video features throughout digital content displayed on a computer device, the computer implemented method comprising, by at least one processor of the computer device, executing an operating system, the executing of the operating system comprising:
executing, using an application execution service of the operating system, a plurality of applications;
accessing, using a communication service of the operating system, over a communication network, web-based content in response to a request for the web-based content from at least one of the plurality of applications;
displaying, using a user interface service of the operating system, the web-based content on a display in a first view of the at least one of the plurality of applications; and
executing a video handler of the operating system, wherein the video handler is separate from the plurality of applications and configured to integrate a video service into the first view, the executing of the video handler comprising:
  establishing, using the communication service, a communication with a video service provider;
  retrieving video content from the video service provider via the communication service; and
  causing the user interface service to modify the first view to render the web-based content and the video content retrieved by the video handler on the display simultaneously,
wherein the video handler does not form any part of any of the plurality of applications,
wherein the video handler integrates the video service into the first view regardless of which of the plurality of applications is in the first view, and
wherein the executing of the operating system further comprises triggering, by a shell process of the video handler, responsive to one or more user interactions received from user interface controls presented to a user, one or more operations associated with the at least one of the plurality of applications.

17. The computer implemented method of claim 16, wherein executing the video handler further comprises retrieving the video content from the video service provider via a video chat provider daemon.

18. The computer implemented method of claim 16, wherein rendering the web-based content and the video content on the display simultaneously comprises integrating the video content into a view of web-based content rendered on the display.

19. The computer implemented method of claim 16, wherein causing the user interface service to modify the first view to render the web-based content and the video content on the display simultaneously comprises:
  allocating a first portion of the display to a first view of the web-based content;
  allocating a second portion of the display to the video content; and
  causing to render the first view of the web-based content in the first portion of the display and the video content in the second portion of the display.

20. A non-transitory computer-readable medium having computer-readable signals stored thereon that define instructions that, as a result of being executed by a computer, instruct the computer to perform a computer implemented method for providing integrated video features throughout digital content displayed on the computer, the computer implemented method comprising executing an operating system, the executing of the operating system comprising:
  executing, using an application execution service of the operating system, a plurality of applications;
  accessing, using a communication service of the operating system, over a communication network, web-based content in response to a request for the web-based content from at least one of the plurality of applications;
  displaying, using a user interface service of the operating system, in a user interface of a display of the computer, the web-based content in a first view of the at least one of the plurality of applications; and
  executing a video handler of the operating system separate from the plurality of applications to integrate a video service into the first view, the executing of the video handler comprising:
    establishing, using the communication service, a communication with a video service provider;
    retrieving video content from the video service provider via the communication service; and
    causing the user interface service to modify the first view to render the web-based content and the video content retrieved by the video handler on the display simultaneously,
  wherein the video handler does not form any part of any of the plurality of applications,
  wherein the video handler integrates the video service into the first view regardless of which of the plurality of applications is in the first view, and
  wherein the executing of the operating system further comprises triggering, by a shell process of the video handler, responsive to one or more user interactions received from user interface controls presented to a user, one or more operations associated with the at least one of the plurality of applications.

21. The non-transitory computer-readable medium of claim 20, wherein executing the video handler further comprises executing a video chat provider daemon to retrieve the video content from the video service provider.

22. The non-transitory computer-readable medium of claim 20, wherein rendering the web-based content and the video content on the display simultaneously comprises integrating the video content into a view of web-based content rendered on the display.

23. The non-transitory computer-readable medium of claim 20, wherein causing the user interface service to modify the first view to render the web-based content and the video content on the display simultaneously comprises:
  allocating a first portion of the display to a first view of the web-based content;
  allocating a second portion of the display to the video content; and
  causing to render the first view of the web-based content in the first portion of the display and the video content in the second portion of the display.

24. A computer implemented method for providing integrated video features throughout digital content displayed on a computer device having a memory, the computer implemented method comprising, by at least one processor of the computer device, executing an operating system, the executing of the operating system comprising:
  executing, using an application execution service of the operating system, a plurality of applications;
  accessing, using a communication service of the operating system, over a communication network, web-based content in response to a request for the web-based content from at least one of the plurality of applications;
  displaying, using a user interface component of the operating system, in a user interface of a display of the computer device, the web-based content in a first view of the at least one of the plurality of applications; and
  executing a video integration component of the operating system to interact with the memory of the computer device, without accessing a local hard drive of the computer device, to integrate video content into the first view by:
    establishing a communication with a video service provider using the communication service;
    retrieving the video content from the video service provider using the communication service; and
    causing the user interface component to modify the first view to render the web-based content and the video content retrieved by the video integration component on the display simultaneously, wherein the video integration component does not form any part of any of the plurality of applications, wherein the video integration component integrates the video content into the first view regardless of which of the plurality of applications is in the first view, and wherein the executing of the operating system further comprises triggering, by a shell process of the video integration component, responsive to one or more user interactions received from user interface controls presented to a user, one or more operations associated with the at least one of the plurality of applications.

\* \* \* \* \*